United States Patent
Honsho et al.

(10) Patent No.: US 8,432,477 B2
(45) Date of Patent: Apr. 30, 2013

(54) CAM FRAME STRUCTURE, LENS BARREL STRUCTURE, SHAKE COMPENSATION DEVICE AND IMAGING ELEMENT UNIT

(75) Inventors: Hironori Honsho, Hyogo (JP); Masanori Yoshikawa, Osaka (JP)

(73) Assignee: Panasonic Corporation, Osaka (JP)

( * ) Notice: Subject to any disclaimer, the term of this patent is extended or adjusted under 35 U.S.C. 154(b) by 342 days.

(21) Appl. No.: 12/829,401

(22) Filed: Jul. 2, 2010

(65) Prior Publication Data

US 2011/0001872 A1  Jan. 6, 2011

(30) Foreign Application Priority Data

Jul. 6, 2009  (JP) ................... 2009-159759

(51) Int. Cl.
*G02B 13/16* (2006.01)
*G02B 15/14* (2006.01)

(52) U.S. Cl.
USPC .......................................... 348/335; 359/704

(58) Field of Classification Search ............... 359/704
See application file for complete search history.

(56) References Cited

U.S. PATENT DOCUMENTS

| | | | |
|---|---|---|---|
| 5,818,647 A | 10/1998 | Nishio et al. | |
| 6,008,954 A * | 12/1999 | Shintani et al. | ............... 359/704 |
| 6,952,526 B2 | 10/2005 | Nomura | |
| 6,959,148 B2 | 10/2005 | Nomura | |
| 6,963,694 B2 | 11/2005 | Nomura | |
| 6,965,733 B1 | 11/2005 | Nomura | |
| 6,978,088 B2 | 12/2005 | Nomura | |
| 6,987,930 B2 | 1/2006 | Nomurai | |
| 7,302,175 B2 * | 11/2007 | Tsuji | ............... 396/542 |
| 7,463,824 B2 | 12/2008 | Yumiki et al. | |
| 7,663,825 B2 * | 2/2010 | Matsumoto | ............... 359/826 |
| 7,689,110 B2 | 3/2010 | Yumiki et al. | |
| 2002/0135889 A1 | 9/2002 | Nomura et al. | |
| 2004/0095657 A1 * | 5/2004 | Takanashi et al. | ............. 359/822 |
| 2006/0182432 A1 | 8/2006 | Yumiki | |
| 2008/0180812 A1 * | 7/2008 | Honsho et al. | ............... 359/700 |
| 2009/0091850 A1 | 4/2009 | Yumiki et al. | |
| 2011/0103783 A1 * | 5/2011 | Tsutsumi et al. | ............... 396/55 |

FOREIGN PATENT DOCUMENTS

| | | |
|---|---|---|
| JP | 07-191249 | 7/1995 |
| JP | 2002-277709 | 9/2002 |
| JP | 2004-085932 | 3/2004 |
| JP | 2005-037971 A | 2/2005 |
| JP | 2005-128188 A | 5/2005 |
| JP | 2005-234259 | 9/2005 |
| JP | 2008-185786 | 8/2008 |
| JP | 2009-128596 A | 6/2009 |

OTHER PUBLICATIONS

Office Action for the corresponding Japanese Patent Application No. 2009-159759, dated Nov. 6, 2012.

* cited by examiner

*Primary Examiner* — Albert Cutler
(74) *Attorney, Agent, or Firm* — Shinlyu Global IP

(57) ABSTRACT

The lens barrel includes a lens frame and a cam frame. The lens frame has a body supporting a lens element in the optical system, at least three through-holes formed in the lens frame body, at least three cam members arranged on the lens frame body and at least one protruding member that protrude from the lens frame body. The cam frame has a body, at least three projection members extending from the cam frame body and inserted through the through-holes, at least three cam grooves formed in the cam frame body and the projection members to guide the cam members and to movably support the lens frame with respect to the cam frame body. The cam frame also has at least one auxiliary groove to guide the protruding member. One end of the auxiliary groove is disposed in the circumferential direction between two adjacent projection members.

26 Claims, 38 Drawing Sheets

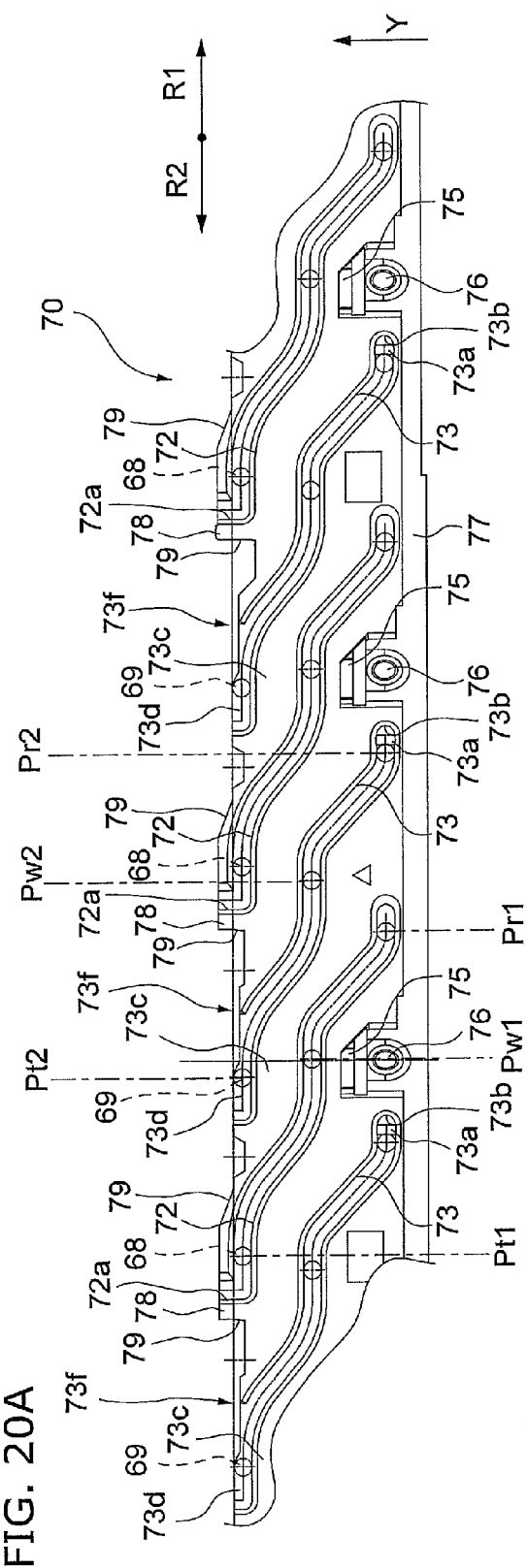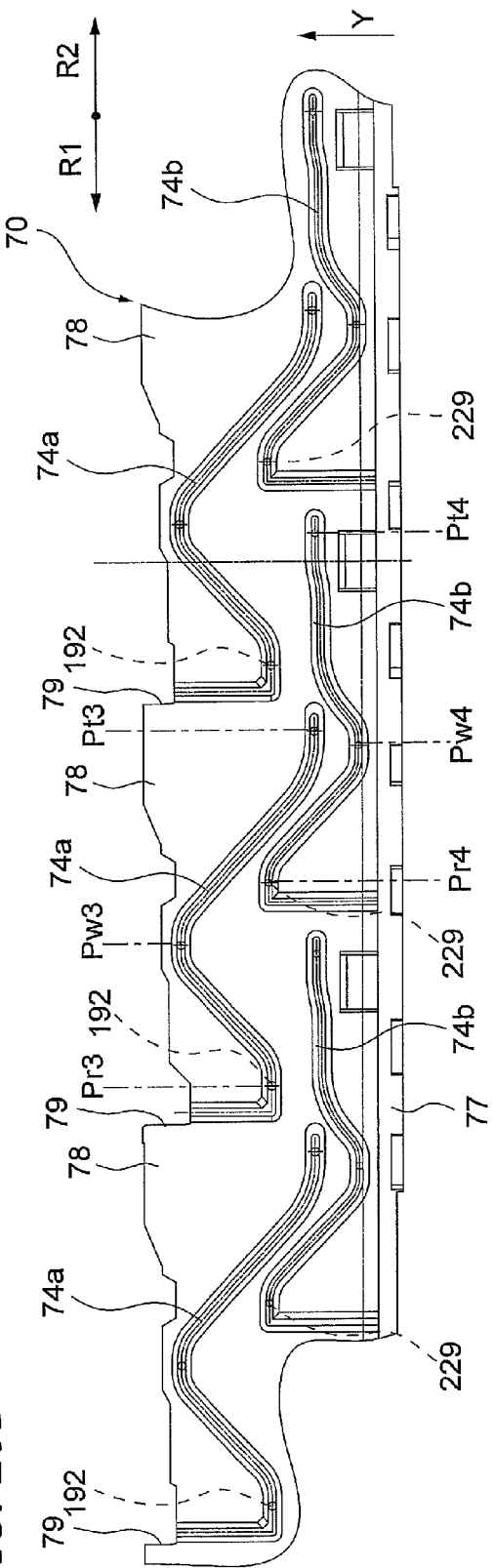

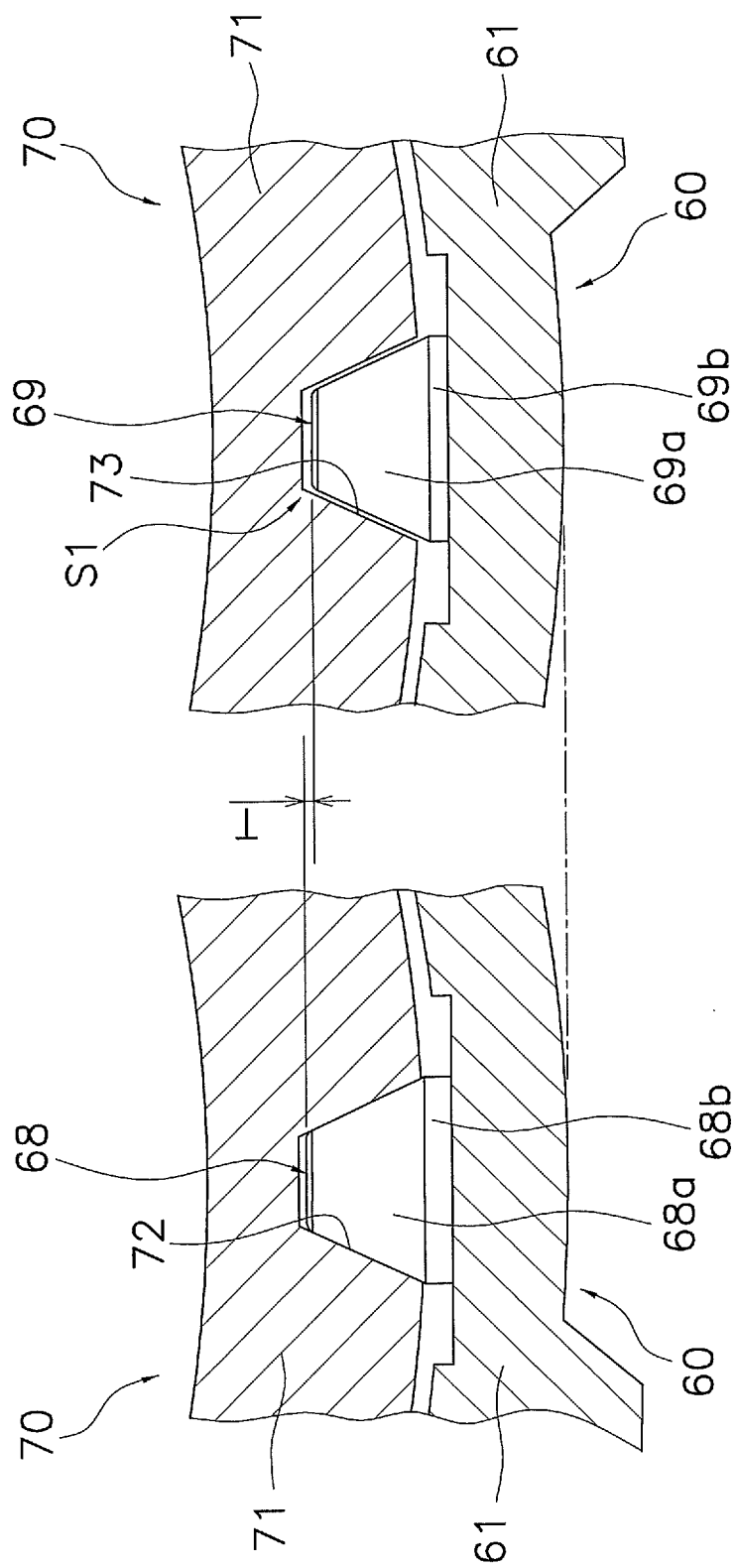

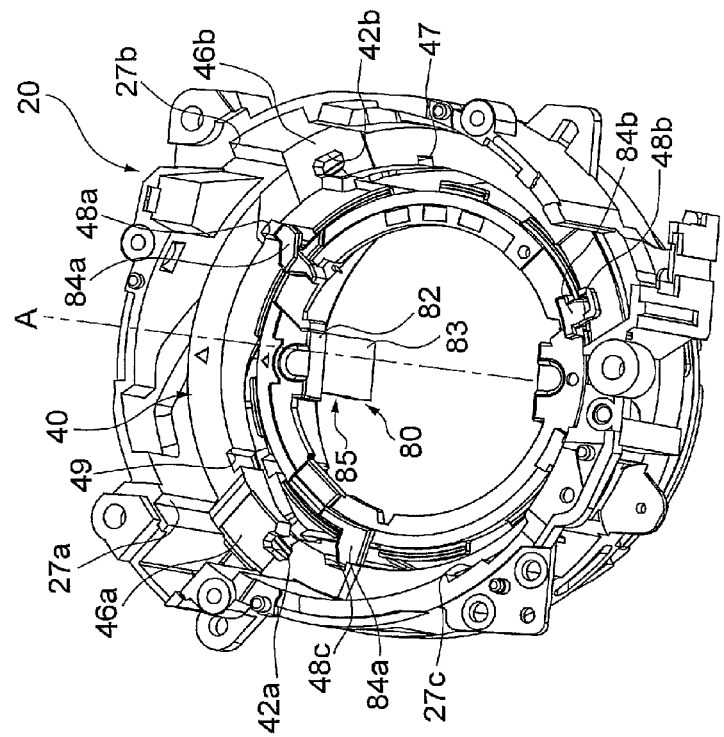
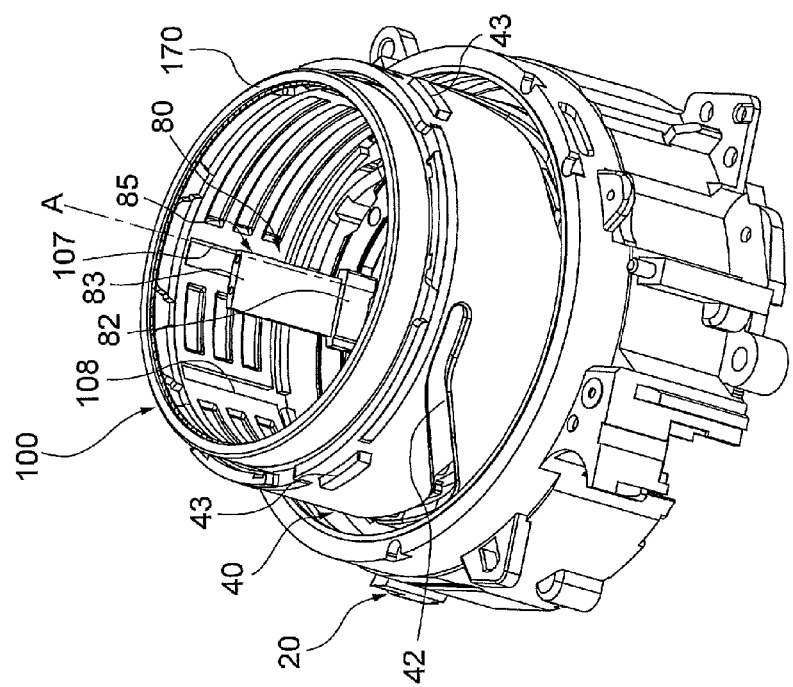
FIG. 25B
FIG. 25A

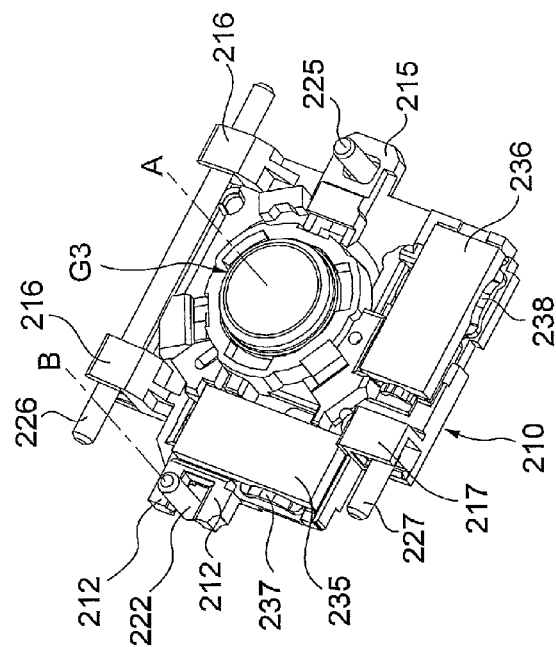
FIG. 29A
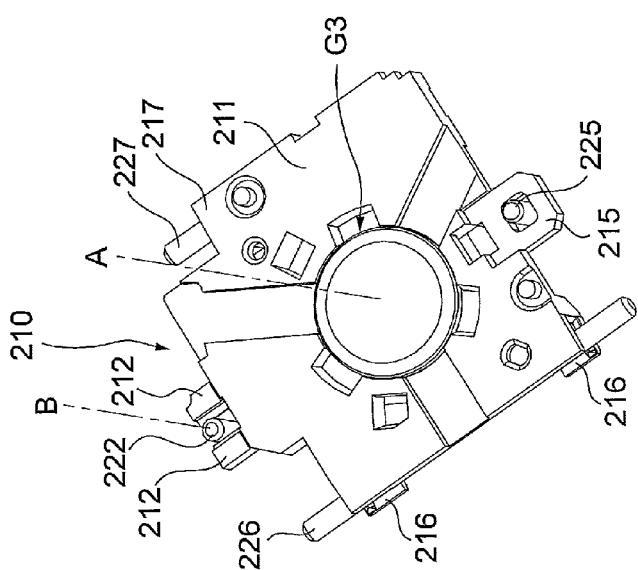
FIG. 29B
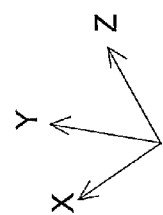

CAM FRAME STRUCTURE, LENS BARREL STRUCTURE, SHAKE COMPENSATION DEVICE AND IMAGING ELEMENT UNIT

CROSS-REFERENCE TO RELATED APPLICATIONS

This application claims priority under 35 U.S.C. §119 to Japanese Patent Application No. 2009-159759 filed on Jul. 6, 2009. The entire disclosure of Japanese Patent Application No. 2009-159759 is hereby incorporated herein by reference.

BACKGROUND

1. Technical Field

The present invention generally relates to a cam frame structure, a lens barrel structure, a shake compensation device and an imaging element unit.

2. Background Information

In recent years we have witnessed a growth in the popularity of digital cameras that use imaging elements such as a Charge Coupled Device sensor or a Complementary Metal Oxide Semiconductor sensor to convert an optical image into an electrical signal and then digitize and record this electrical signal.

With such digital cameras, there is a need not only to increase the number of pixels produced by the Charge Coupled Device or Complementary Metal Oxide Semiconductor sensor but also a need to improve the performance of the lens barrel that forms the optical image for these sensors. More specifically, there is a need for a lens barrel that is equipped with a high-power zoom lens system.

Moreover, it would be beneficial if the camera body for these digital cameras were made more compact so that the cameras are more portable. Therefore, there is also a need to reduce the size of the lens barrel, which is believed to contribute to reducing the overall size of the camera body.

SUMMARY

To achieve a more compact design with conventional lens barrels, the size of the lens barrel has to be reduced in the direction of the optical axis. However, it has been discovered that if the cam frame is made smaller in the direction of the optical axis, this smaller size will affect the design of the cam grooves formed in the cam frame. As a result, it becomes difficult to make the lens barrel more compact. In addition, because of this smaller size, if an external force is exerted on the lens barrel, there is a possibility that the cam followers or other members of the lens barrel will be damaged.

Accordingly, in view of the state of the known technology, one aspect of the disclosure herein is a lens barrel structure that comprises a lens frame and a cam frame. The lens frame includes a lens frame body configured to support a lens element of an optical system, at least three through-holes formed in the lens frame body in the direction of the optical axis of the optical system, at least three cam members and at least one protruding member formed on and protruding from the lens frame body.

The cam frame includes a cam frame body, at least three projection members extending from an end of the cam frame body in the direction of the optical axis and insertably disposed through the through-holes of the lens frame, and at least three cam grooves formed in the cam frame body and the projection members. The cam grooves are configured to guide the cam members and movably support the lens frame with respect to the cam frame body. The cam frame also includes at least one auxiliary groove formed along the circumferential direction of the cam frame body. The auxiliary groove is configured to guide the protruding member. The end of the auxiliary groove formed near the end of the cam frame body with the projection members is disposed between two adjacent projection members.

BRIEF DESCRIPTION OF DRAWINGS

Referring now to the attached drawings which form a part of this original disclosure:

FIG. 20A is a development (outer peripheral face) of a rotary cam frame;
FIG. 20B is a development (inner peripheral face) of a rotary cam frame;
FIG. 24A is a cross section of the area around a first cam pin;
FIG. 24B is a cross section of the area around a second cam pin;
FIGS. 25A and 25B are oblique views of a fixed frame, a camera cam frame, a first rectilinear frame, and a second rectilinear frame;
FIGS. 29A and 29B are oblique views of a correcting lens frame.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

1: Overview of Digital Camera

Figure 1:
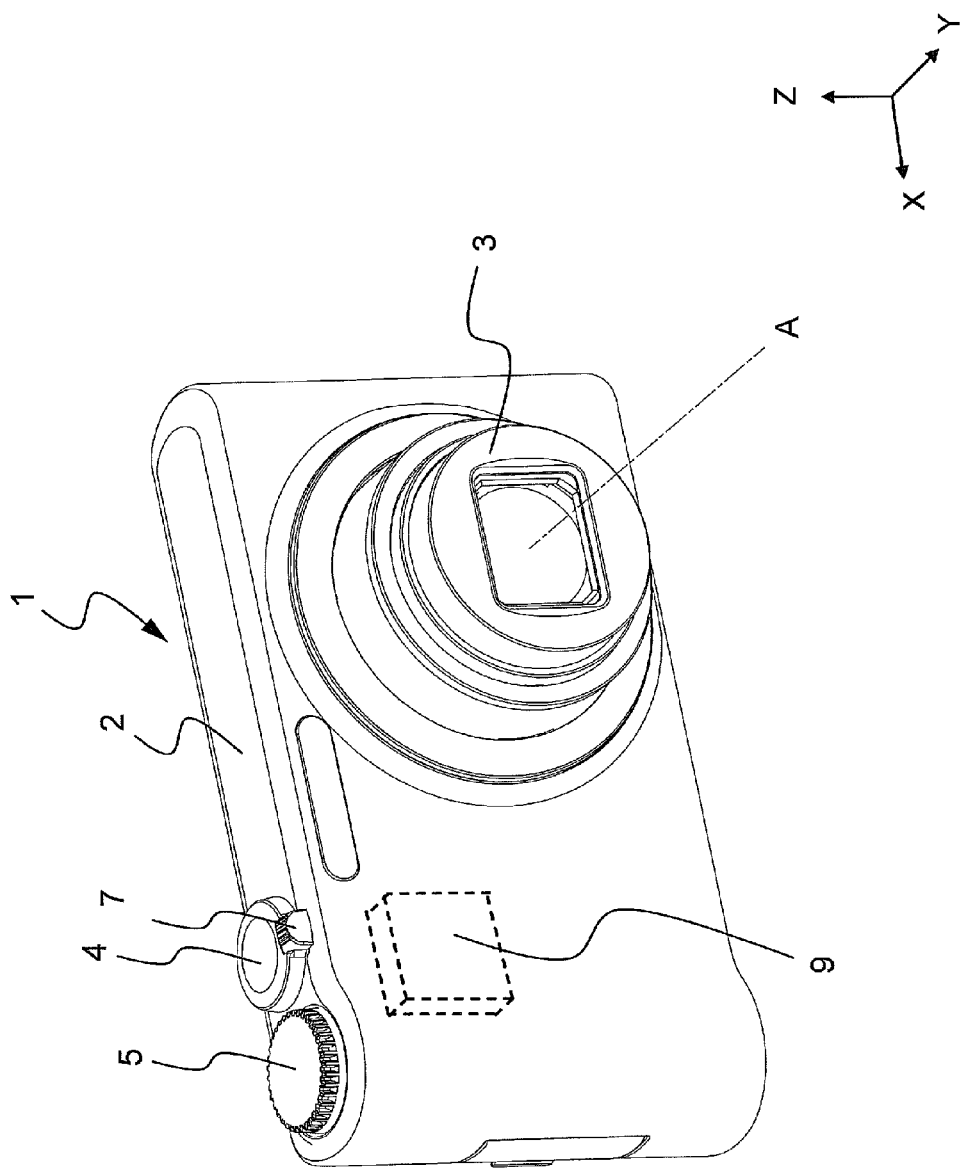
FIG. 1 is a simplified oblique view of a digital camera.
Figure 2:
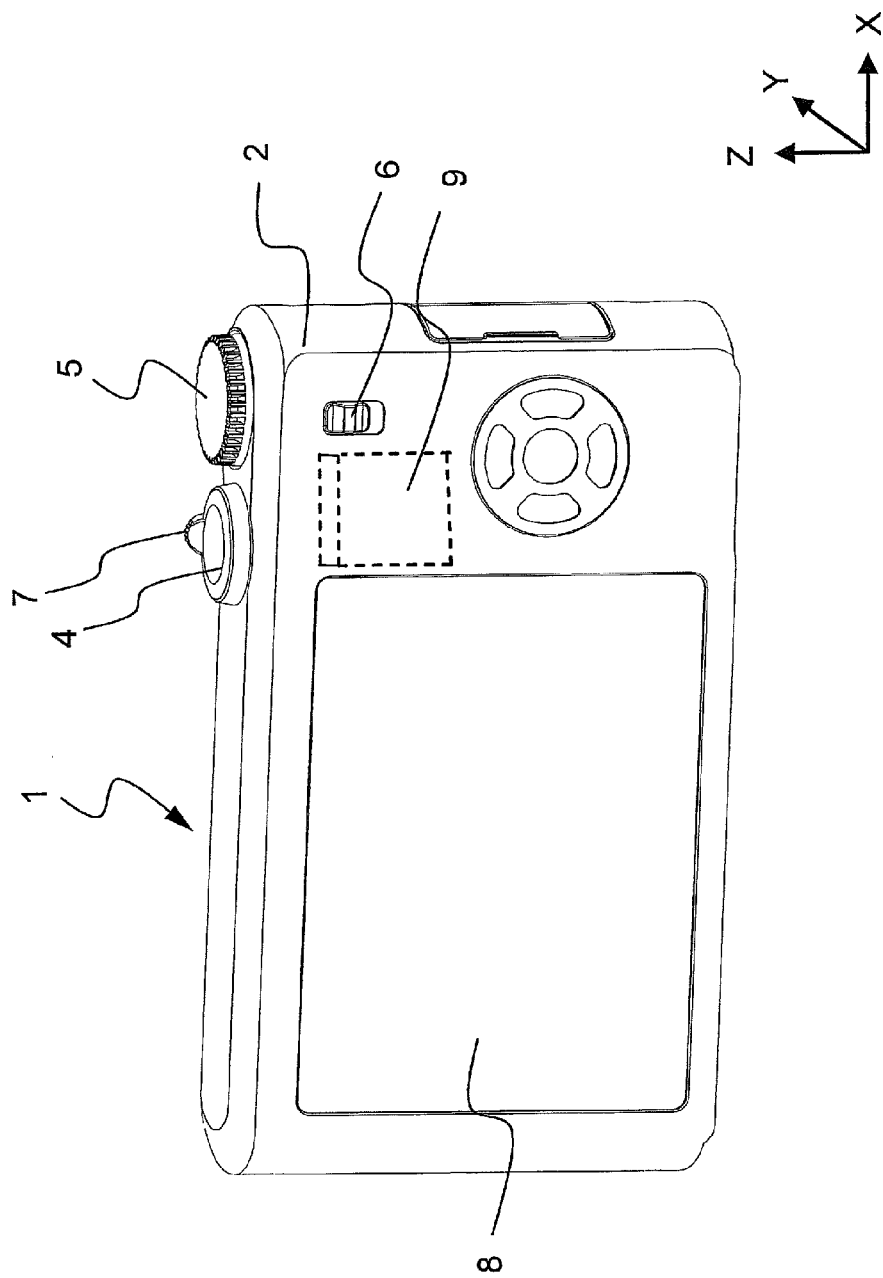
FIG. 2 is a simplified oblique view of a digital camera.

Referring initially to FIGS. 1 and 2, a digital camera 1 is illustrated in accordance with a first embodiment. FIGS. 1 and 2 are simplified oblique views of the digital camera 1. FIG. 1 shows the situation when a lens barrel 3 is in its imaging state (wide angle state).

The digital camera 1 (an example of an imaging device) is a camera for acquiring an image of a subject. A multi-stage retractable lens barrel 3 is installed in the digital camera 1 to afford a higher zoom ratio and achieve a compact size.

In the following description, the six sides of the digital camera 1 are defined as follows.

The side facing the subject when an image is being captured by the digital camera 1 is called the front face, and the face on the opposite side is called the rear face. When an image is captured such that up and down along the vertical direction of the subject coincide with up and down along the short-side direction of the rectangular image being captured by the digital camera 1 (the aspect ratio, i.e. the ratio of long to short sides, is generally 3:2, 4:3, 16:9, etc.), the side facing upward in the vertical direction is called the top face, and the opposite side is called the bottom face. Further, when the an image is captured such that up and down in the vertical direction of the subject coincide with up and down in the short-side direction of the rectangular image being captured by the digital camera 1, the side that is on the left when viewed from the subject side is called the left face, and the opposite side is called the right face. The above definitions are not intended to limit the usage orientation of the digital camera 1.

Based on the above definitions, FIG. 1 is an oblique view illustrating the front face, top face, and right face.

The same definitions apply not only to the six sides of the digital camera 1 but also to the six sides of the various constituent members disposed in and on the digital camera 1. Specifically, the above definitions apply to the six sides of the various constituent members in the state in which those members have been disposed in or on the digital camera 1.

As shown in FIG. 1, a three-dimensional perpendicular coordinate system is defined as having a Y-axis perpendicular to the optical axis A of an optical system O (discussed below).

Based on this definition, the direction facing the front face side from the rear face side along the optical axis A is called the Y-axis positive direction, the direction facing the left face side from the right face side perpendicular to the optical axis A is called the X-axis positive direction, and the direction facing the top face side from the bottom face side and perpendicular to the X and Y-axes is called the Z-axis positive direction.

The drawings will be described below using this XYZ coordinate system as a reference. In other words, the X-axis positive direction, the Y-axis positive direction and the Z-axis positive direction each refer to the same respective direction in the various drawings.

2: Overall Configuration of Digital Camera

As shown in FIGS. 1 and 2, the digital camera 1 generally comprises a housing 2 that accommodates various units, the optical system O that forms an optical image of a subject and the lens barrel 3 that movably supports the optical system O.

The optical system O is made up of a plurality of lenses and a plurality of lens groups, which are aligned in the Y-axis direction. The lens barrel 3 is a multi-stage retractable type lens barrel. More specifically, it is a three-stage retractable type lens barrel in which three kinds of frame are deployed along the Y-axis direction from a fixed frame 20 (discussed below) that serves as a reference. The lens barrel 3 is supported by the housing 2. The plurality of lens groups is movably supported by the lens barrel 3 in the Y-axis direction. The configuration of the optical system O and the lens barrel 3 will be described in detail below.

The housing 2 contains a Charge Coupled Device (CCD) image sensor 141 (an example of an imaging element) that performs opto-electrical conversion on an optical image and an image recorder 9 that records images acquired by the CCD image sensor 141. As shown in FIG. 2, a liquid crystal monitor 8 is arranged on the rear face of the housing 2. The liquid crystal monitor 8 displays images acquired by the CCD image sensor 141.

A release button 4, a control dial 5, a power switch 6 and a zoom adjusting lever 7 are arranged on the top face of the housing 2. The release button 4 is used by the user to input the exposure timing. The control dial 5 is used by the user to adjust various settings related to the imaging operation. The power switch 6 is used by the user to turn the digital camera 1 on or off. The zoom adjusting lever 7 is used by the user to adjust the zoom ratio. The zoom adjusting lever 7 is rotatable around the release button 4 within a specific angular range.

3: Configuration of Optical System and Lens Barrel

Figure 3B:
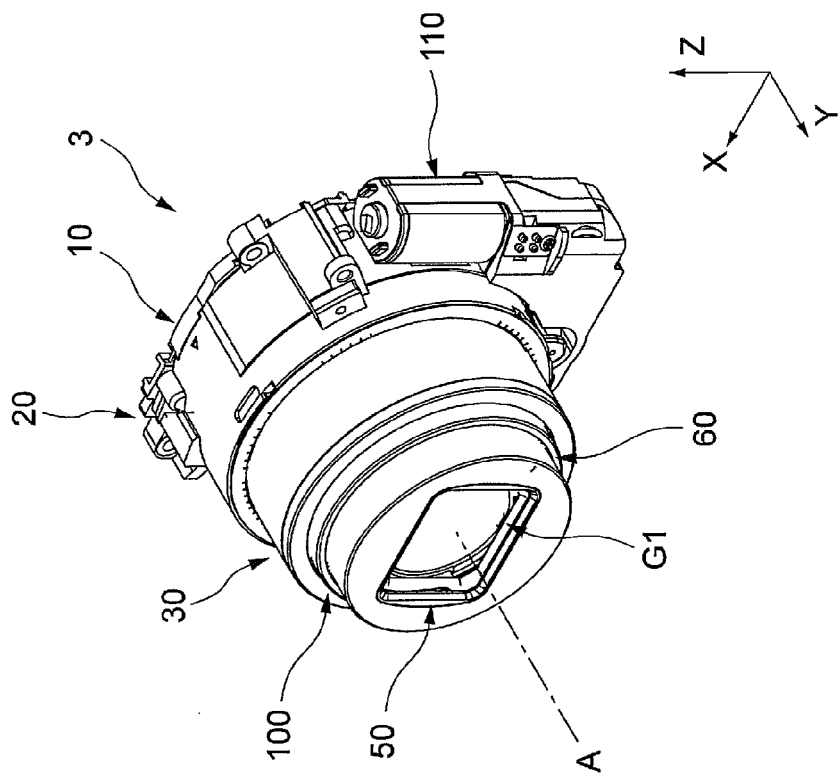
FIGS. 3A and 3B are simplified oblique views of a lens barrel.
Figure 3A:
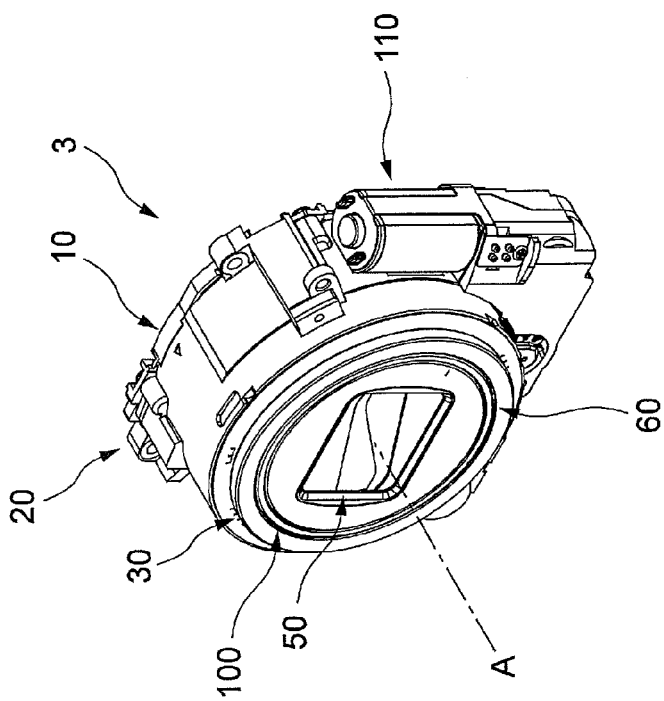
Figure 6:
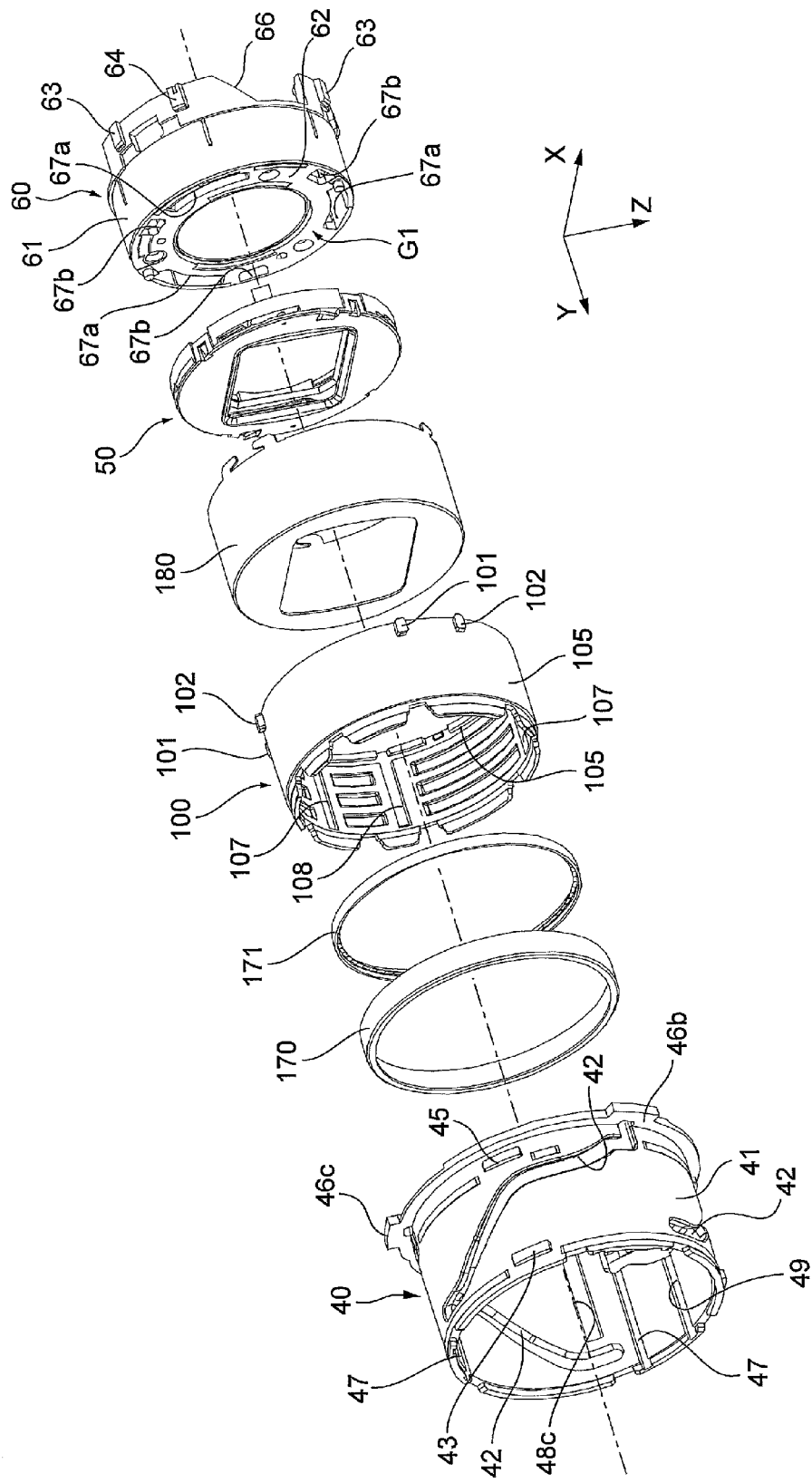
FIG. 6 is an exploded oblique view of a lens barrel.
Figure 7:
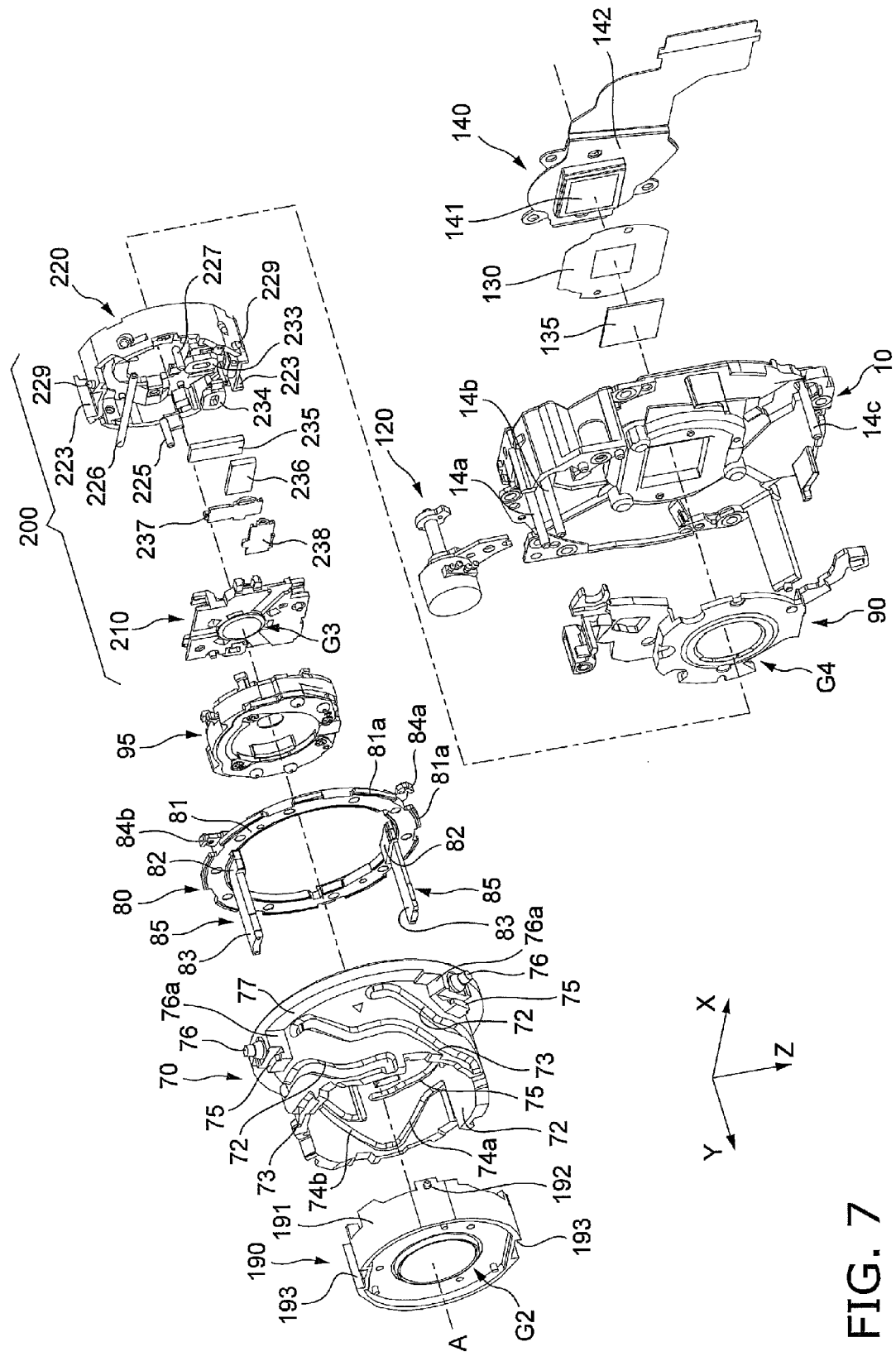
FIG. 7 is an exploded oblique view of a lens barrel.
Figure 8:
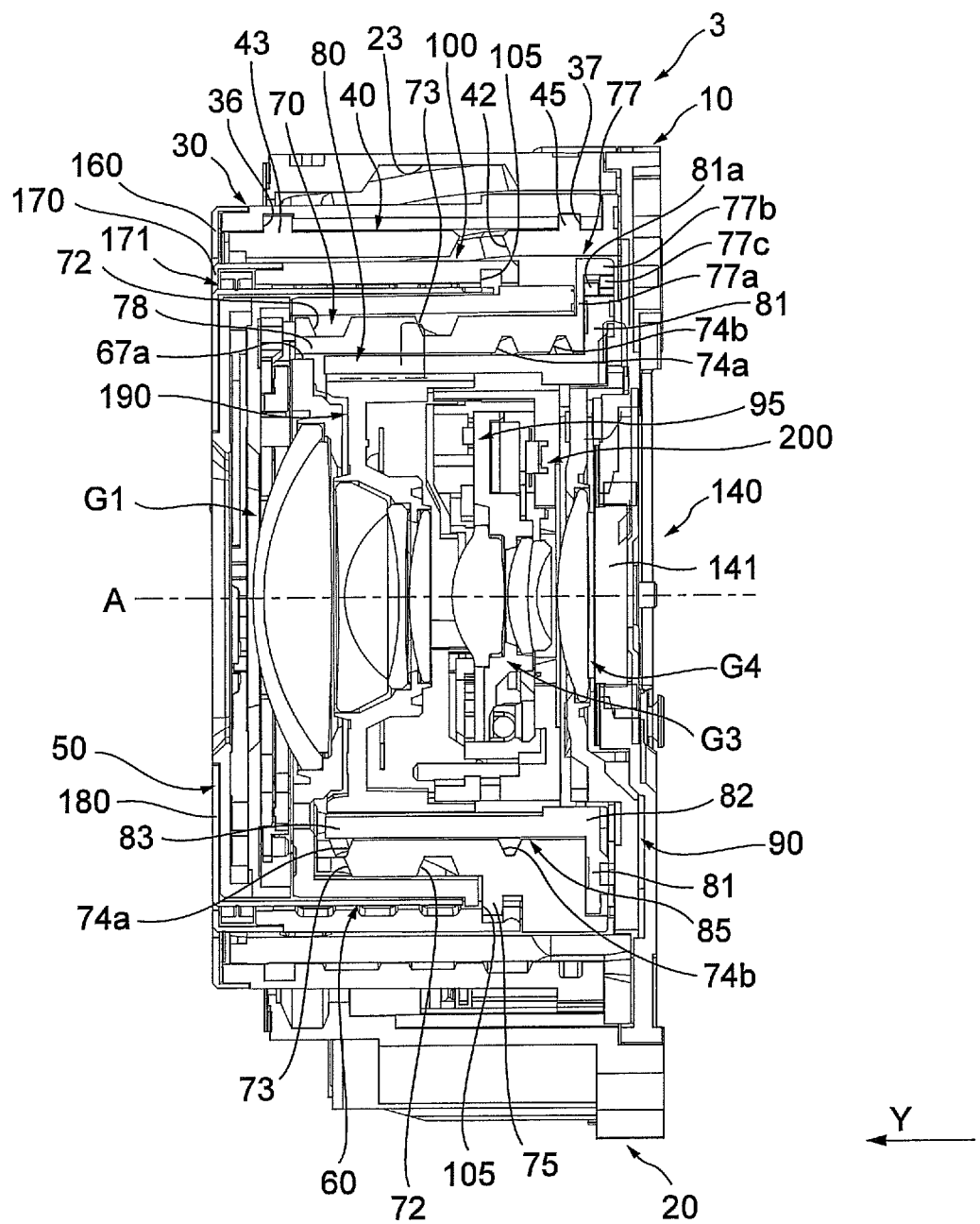
FIG. 8 is a simplified cross section of a lens barrel (retracted state)
Figure 9:
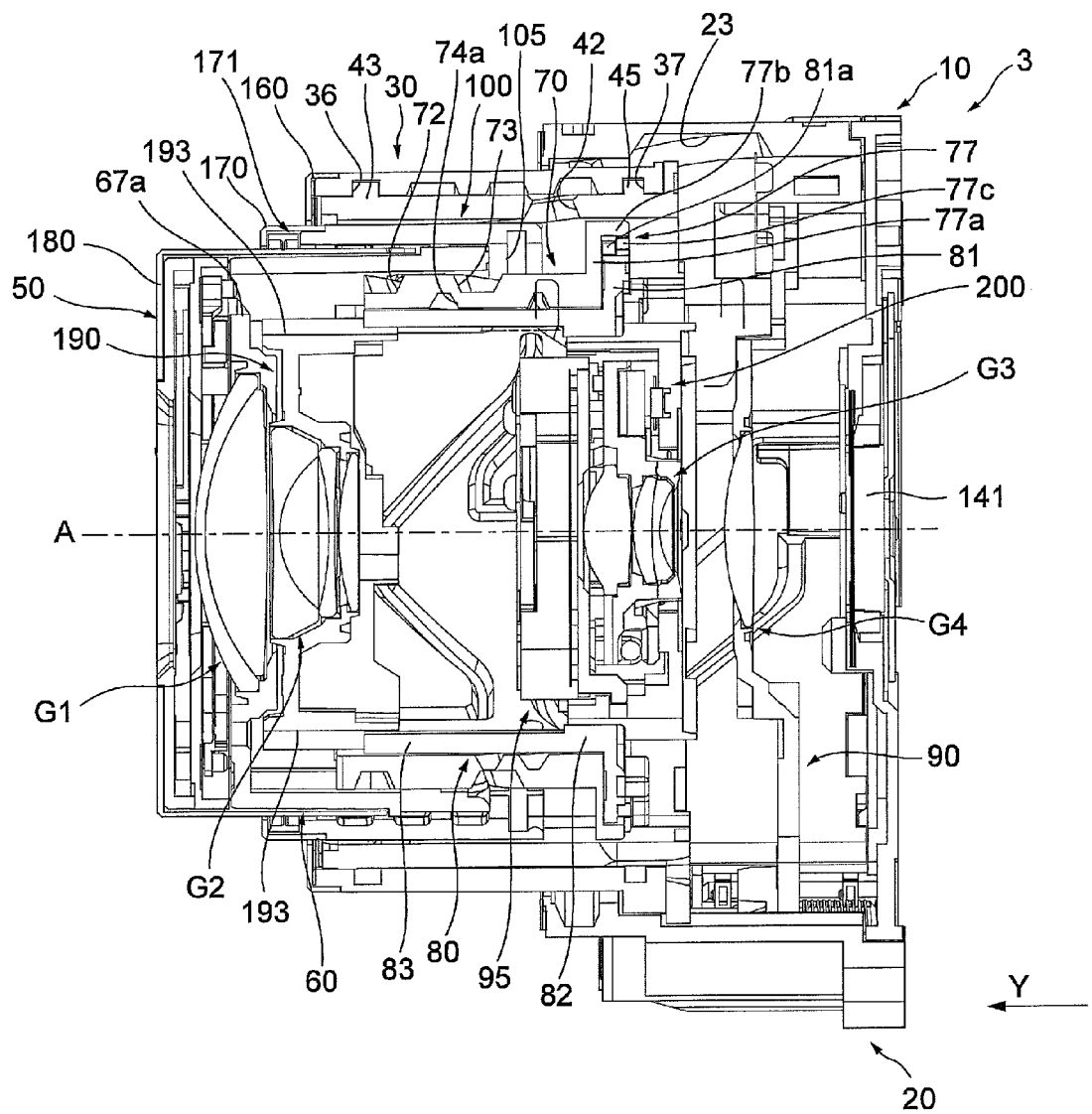
FIG. 9 is a simplified cross section of a lens barrel (wide angle state)
Figure 10:
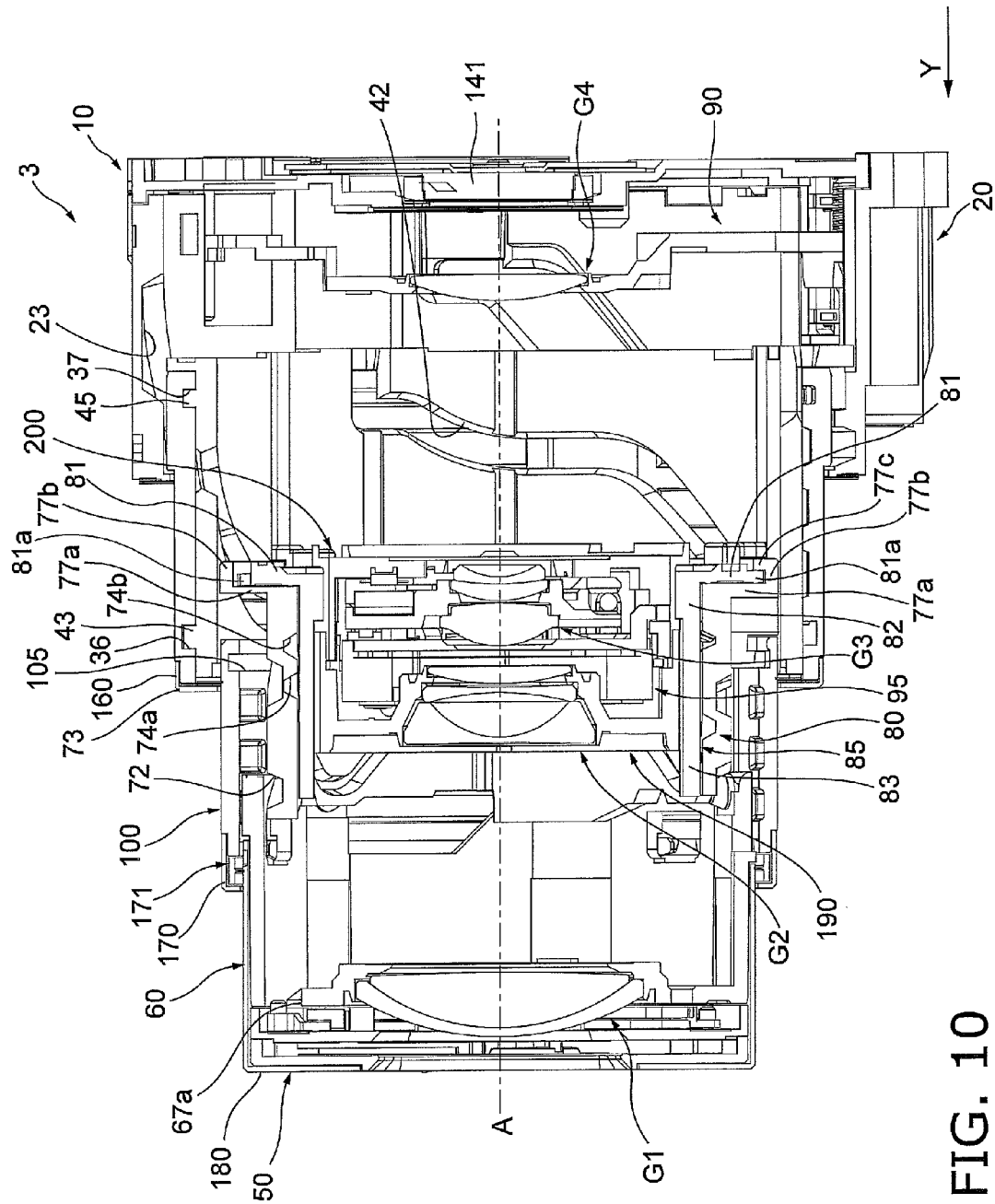
FIG. 10 is a simplified cross section of a lens barrel (telephoto state)

Referring now to FIGS. 3A to 10, the overall configuration of the lens barrel 3 will now be explained. FIGS. 3A and 3B are simplified oblique views of the lens barrel 3, and FIGS. 4 to 7 are exploded oblique views of the lens barrel 3. FIG. 3A is a simplified oblique view of the lens barrel 3 when the lens barrel 3 is in the retracted state, and FIG. 3B is a simplified oblique view of the lens barrel 3 when capturing an image. FIGS. 8 and 9 are simplified cross sectional views of the lens barrel 3. FIG. 8 is a cross sectional view in the retracted state, and FIG. 9 is a cross sectional view in the wide angle state. FIG. 10 is a cross sectional view in the telephoto state.

As shown in FIGS. 8 to 10, the imaging optical system O comprises a first lens group G1 (an example of a lens element), a second lens group G2 (an example of a first lens element), a third lens group G3 (an example of a second lens element) and a fourth lens group G4. The first lens group G1, for example, is a lens group with an overall positive power and takes in light from the subject. The second lens group G2, for example, is a lens group with an overall negative power.

The zoom ratio of the optical system O can be adjusted with the first lens group G1 and the second lens group G2. The third lens group G3, for example, is a lens group that is attributable to movement of the digital camera 1 for suppressing movement of the optical image with respect to the CCD image sensor 141. The fourth lens group G4, for example, is a lens group for adjusting the focus. The optical system O is movably supported by the lens barrel 3 in the Y-axis direction.

As shown in FIGS. 3A and 3B, the lens barrel 3 generally comprises the fixed frame 20 (an example of a first frame) fixed to the housing 2, a zoom motor 110 fixed to the fixed frame 20 and serving as a drive source, a master flange 10 (an example of a base member and/or a base plate) that holds the various frames between itself and the fixed frame 20, a drive frame 30 (an example of a fourth frame) to which the drive force of the zoom motor 110 is inputted, a camera cam frame 40 (an example of a third frame) supported by the fixed frame 20 and capable of moving in the Y-axis direction, a rotary cam frame 70 (an example of a cam frame and/or a second frame) that rotates along with the drive frame 30, a second rectilinear frame 80 that moves in the Y-axis direction with respect to the fixed frame 20 without rotating, and a shutter unit 95. The drive frame 30 and the rotary cam frame 70 are movable in the Y-axis direction and rotatable with respect to the fixed frame 20, but the other members move in the Y-axis direction with respect to the fixed frame 20 without rotating. The CCD image sensor 141 is attached to the master flange 10. A DC motor is one example of a zoom motor 110.

The lens barrel 3 further comprises a first lens frame 60 (an example of a lens frame) that supports the first lens group G1, a second lens frame 190 that supports the second lens group G2, a third lens frame 200 that supports the third lens group G3, and a fourth lens frame 90 that supports the fourth lens group G4.

3.1: Fixed Frame

Figure 4:
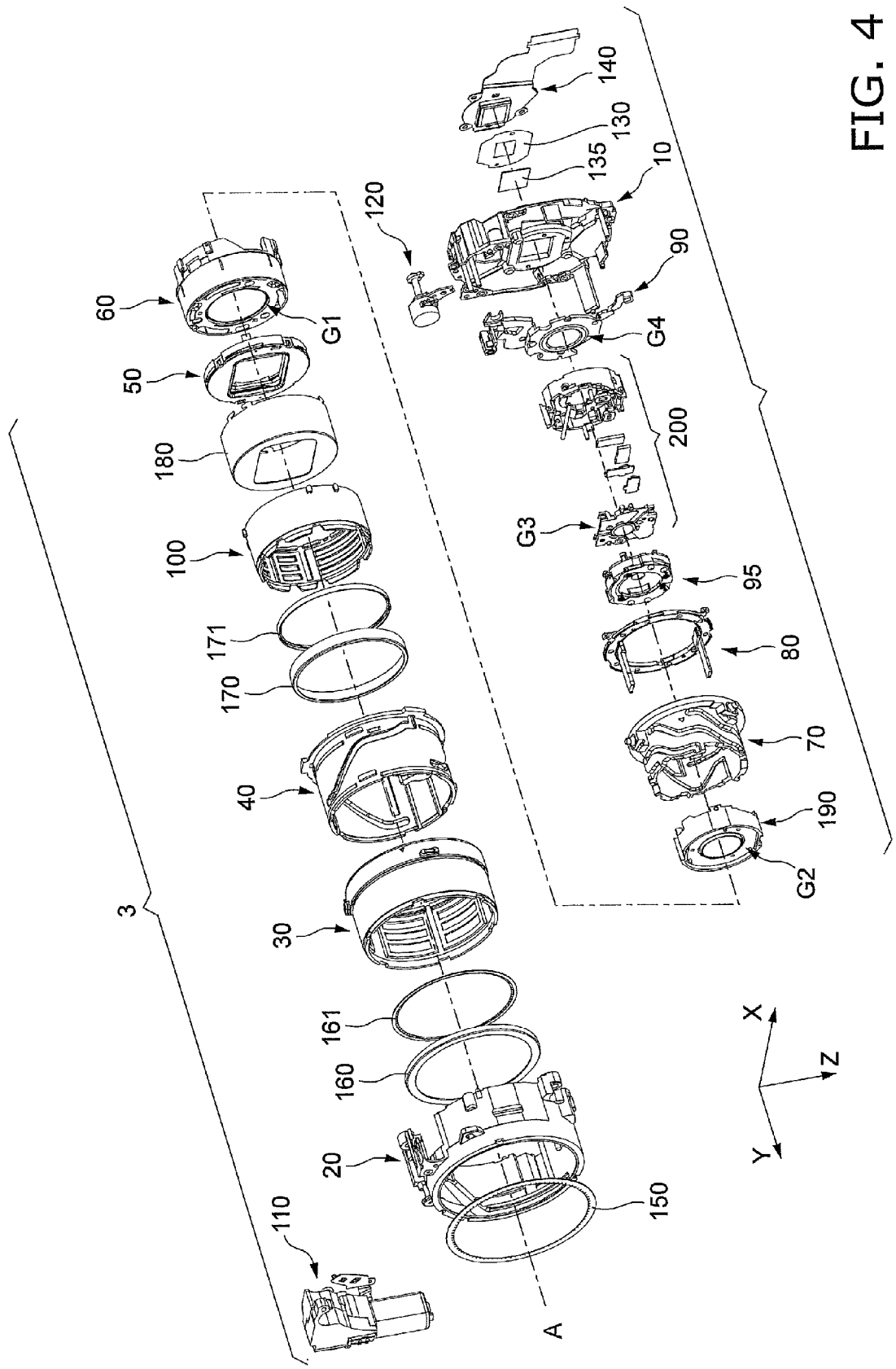
FIG. 4 is an exploded oblique view of a lens barrel.
Figure 5:
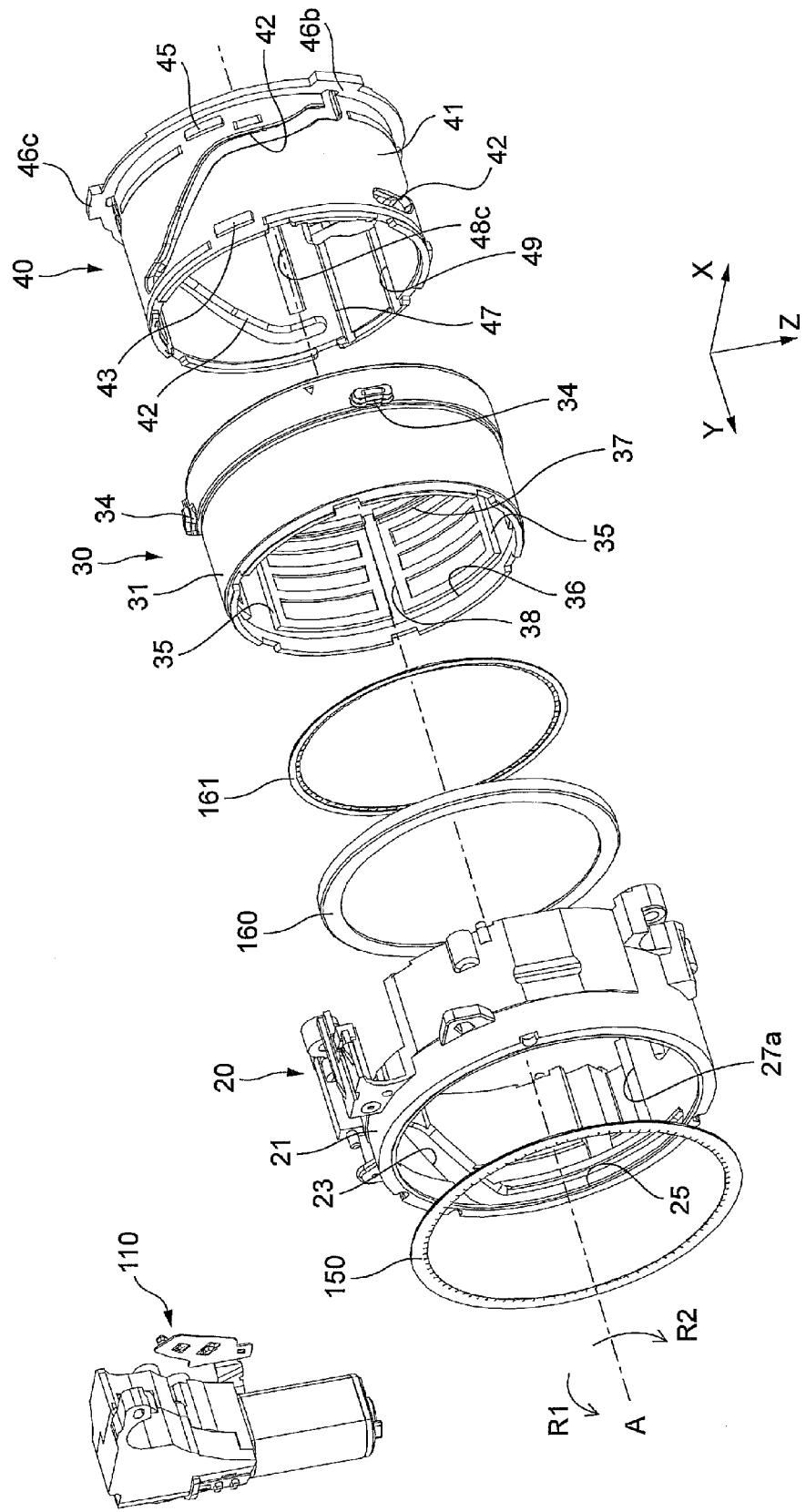
FIG. 5 is an exploded oblique view of a lens barrel.
Figure 11A:
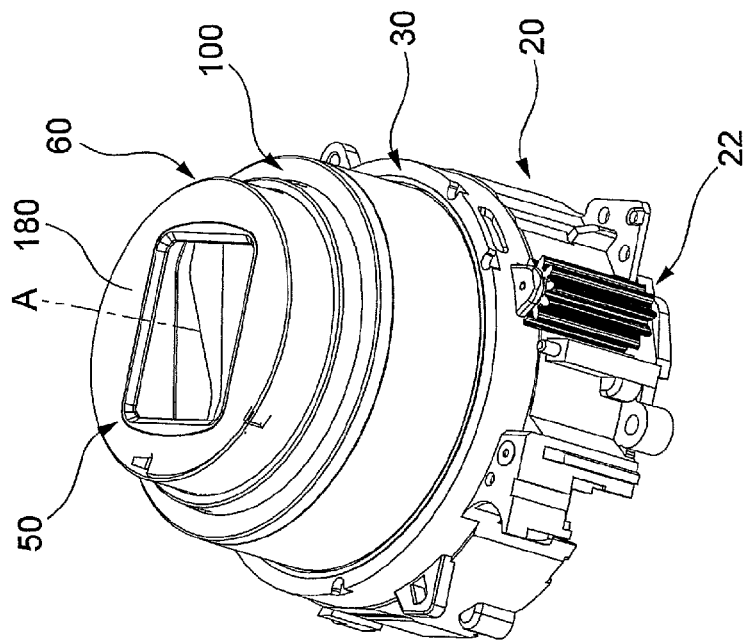
FIGS. 11A and 11B are oblique views of a lens barrel.
Figure 11B:
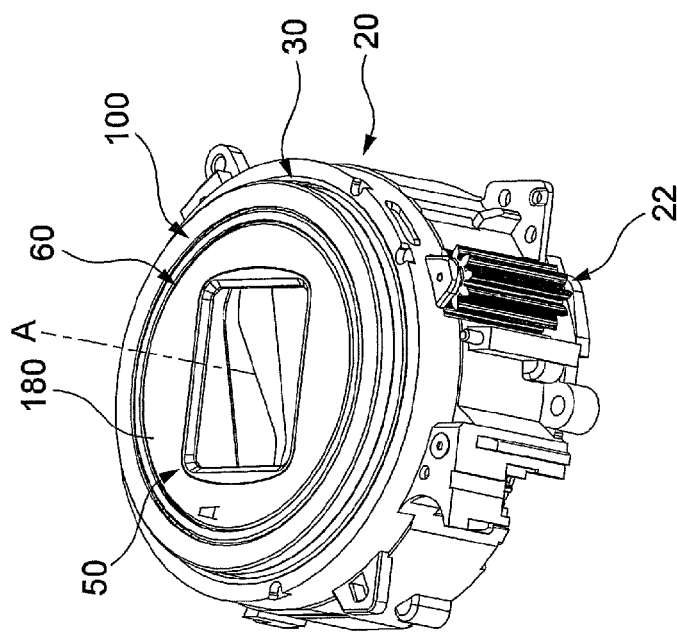

The fixed frame 20 rotatably supports the drive frame 30 around the optical axis A and movably supports the drive frame 30 in the Y-axis direction (the rectilinear direction). The fixed frame 20 constitutes the stationary-side member of the lens barrel 3 along with the master flange 10. The fixed frame 20 is fixed to the master flange 10 by screws. The fixed frame 20 generally comprises a substantially cylindrical fixed frame body 21 that constitutes the main part and a drive gear 22 (see FIG. 11) that is rotatably supported by the fixed frame body 21. As shown in FIGS. 4 and 5, a light blocking sheet 150 is arranged on the Y-axis direction positive side of the fixed frame 20.

The fixed frame body 21 is fixed to the master flange 10 and the drive frame 30 is disposed on the inner peripheral side of the fixed frame body 21. The drive gear 22 meshes with a gear (not shown) in the zoom motor 110. As a result, the drive gear 22 transmits a drive force from the zoom motor 110 to the drive frame 30.

Three inclination grooves 23, three rotation grooves 25, and three rectilinear grooves 27a, 27b, and 27c (an example of rectilinear grooves) are formed on the inner peripheral side of the fixed frame body 21. The inclination grooves 23 and the rotation grooves 25 are arranged to guide the drive frame 30. The rectilinear grooves 27a, 27b, and 27c are arranged to guide the camera cam frame 40 in the Y-axis direction. Rectilinear projections 46a, 46b, and 46c formed on the camera cam frame 40 (discussed below) (see FIG. 5) are inserted in the rectilinear grooves 27a, 27b, and 27c, respectively.

Cam pins 34 (discussed below) of the drive frame 30 are inserted in the inclination grooves 23. The cam pins 34 are disposed at a substantially constant pitch in the circumferential direction. The rotation grooves 25 are arranged to guide the cam pins 34 in the rotation direction. The rotation grooves 25 faun one guide groove with the inclination grooves 23. The inclination grooves 23 are used during retraction of the lens barrel 3, and the rotation grooves 25 are used during zooming of the lens barrel 3.

3.2: Drive Frame

The drive frame 30 rotatably supports the camera cam frame 40 around the optical axis A and moves integrally with the camera cam frame 40 in the Y-axis direction. The drive frame 30 is disposed on the inner peripheral side of the fixed frame 20. The rotary drive from the zoom motor 110 is inputted to the drive frame 30, and the drive force is transmitted through the drive frame 30 to other members.

The drive frame 30 has a substantially cylindrical drive frame body 31 (an example of a fourth frame body) that is disposed on the inner peripheral side of the fixed frame body 21, a gear 32 (see FIG. 12) formed on the outer peripheral side of the drive frame body 31 and the three cam pins 34 formed on the outer peripheral side of the drive frame body 31. The drive frame body 31 is disposed concentrically between the fixed frame 20 and the rotary cam frame 70 (discussed below). The drive frame body 31 is disposed on the inner peripheral side of the fixed frame 20 and on the outer peripheral side of the rotary cam frame 70. A cosmetic ring 160 is attached to the end of the drive frame body 31 on the Y-axis direction positive side. A light blocking ring 161 is sandwiched between the cosmetic ring 160 and the drive frame body 31.

The gear 32 meshes with the drive gear 22 of the fixed frame 20. Consequently, the drive force from the zoom motor 110 is transmitted through the drive gear 22 to the drive frame 30. The three cam pins 34 are disposed at a constant pitch with each other in the circumferential direction of the drive frame 30. The cam pins 34 are fitted into the inclination grooves 23 of the fixed frame 20. The drive frame 30 moves in the Y-axis direction while rotating around the optical axis A with respect to the fixed frame 20. When the cam pins 34 are guided by the rotation grooves 25, the drive frame 30 rotates without moving in the Y-axis direction with respect to the fixed frame 20.

A first rotary groove 36, a second rotary groove 37, three guide grooves 35 and three rectilinear grooves 38 are formed on the inner peripheral side of the drive frame body 31. The first rotary groove 36 is arranged to guide first rotary projections 43 (discussed below) of the camera cam frame 40 in the rotational direction. The second rotary groove 37 (see FIG. 5) is disposed on the Y-axis direction negative side of the first rotary groove 36. The second rotary groove 37 is arranged to guide second rotary projections 45 (discussed below) of the camera cam frame 40 in the rotational direction. The guide grooves 35 is arranged to guide the first rotary projections 43 to the first rotary groove 36. The guide grooves 35 is arranged to guide the second rotary projections 45 to the second rotary groove 37. The guide grooves 35 are linked to the first rotary groove 36 and the second rotary groove 37. The three guide grooves 35 are disposed at a constant pitch in the circumferential direction and extend in the Y-axis direction. The rectilinear grooves 38 (see FIG. 5) are arranged to guide cam pins 76 which are fixed to base portions 76a (discussed below) of the rotary cam frame 70; the ends of the cam pins 76 is inserted in the rectilinear grooves 38. The rectilinear grooves 38 are disposed between the guide grooves 35 in the circumferential direction. The three rectilinear grooves 38 are disposed at a constant pitch in the circumferential direction.

The drive frame 30 is driven around the optical axis A (the rotational directions R1 and R2) by the drive force of the zoom motor 110. For example, when changing the lens barrel 3 from the retracted state to the imaging state, the drive frame 30 is driven in the R1 direction by the zoom motor 110. As a result, the cam pins 34 move along the inclination grooves 23 of the fixed frame 20. Accordingly, the drive frame 30 then moves to the Y-axis direction positive side while rotating with respect to the fixed frame 20.

When the drive frame 30 is further driven in the R1 direction, the cam pins 34 reach the rotation grooves 25 and the cam pins 34 move in the rotational direction along the rotation grooves 25. Consequently, the drive frame 30 rotates without moving in the Y-axis direction with respect to the fixed frame 20. Specifically, the drive frame 30 rotates without moving in the Y-axis direction with respect to the fixed frame 20 when the rotational angle of the drive frame 30 reaches a specific angle.

In this embodiment, during retraction of the lens barrel 3, the drive frame 30 moves in the Y-axis direction while rotating with respect to the fixed frame 20. During zooming of the lens barrel 3, the drive frame 30 rotates without moving in the Y-axis direction with respect to the fixed frame 20.

When the lens barrel 3 changes from the imaging state to the retracted state, the drive frame 30 is driven in the R2 direction by the zoom motor 110. As a result, the cam pins 34 of the drive frame 30 move along the rotation grooves 25 and along the inclination grooves 23 upon reaching these inclination grooves 23. Consequently, the drive frame 30 moves to the Y-axis direction negative side while rotating with respect to the fixed frame 20. The drive frame 30 is stowed on the inner peripheral side of the fixed frame 20.

3.3: Camera Cam Frame

As shown in FIGS. 5, 13, 15, and 16, the camera cam frame 40 is arranged to limit the rotation of a first rectilinear frame 100 and the second rectilinear frame 80 with respect to the fixed frame 20. The camera cam frame 40 is disposed on the inner peripheral side of the drive frame 30 (see FIG. 13). The camera cam frame 40 has a substantially cylindrical camera cam frame body 41 (an example of a third frame body) that constitutes the main part, three cam through-grooves 42 (an example of through-grooves) formed in the camera cam frame body 41, three rectilinear projections 46a to 46c formed on the outer peripheral side of the camera cam frame body 41 and three flanges 44.

The camera cam frame body 41 is disposed concentrically between the fixed frame 20 and the rotary cam frame 70 (discussed below). The camera cam frame body 41 is disposed on the inner peripheral side of the fixed frame 20 and on the outer peripheral side of the rotary cam frame 70. The three cam through-grooves 42 are disposed at a constant pitch along the circumferential direction of the cam frame body 41. The cam pins 76 of the rotary cam frame 70 pass through the cam through-grooves 42 in the radial direction.

The three rectilinear projections 46a to 46c protrude outwardly in the radial direction from the end of the camera cam frame body 41 on the Y-axis direction negative side. The three rectilinear projections 46a to 46c are disposed at a substantially constant pitch with each other in the circumferential direction of the camera cam frame body 41. The rectilinear projections 46a to 46c are inserted in the rectilinear grooves 27a, 27b, and 27c of the fixed frame 20. The rectilinear projections 46a to 46c are guided by the rectilinear grooves 27a to 27c in the Y-axis direction. The rectilinear projections 46a to 46c and the rectilinear grooves 27a to 27c allow the camera cam frame 40 to move in the Y-axis direction with respect to the fixed frame 20 without rotating.

Figure 34:
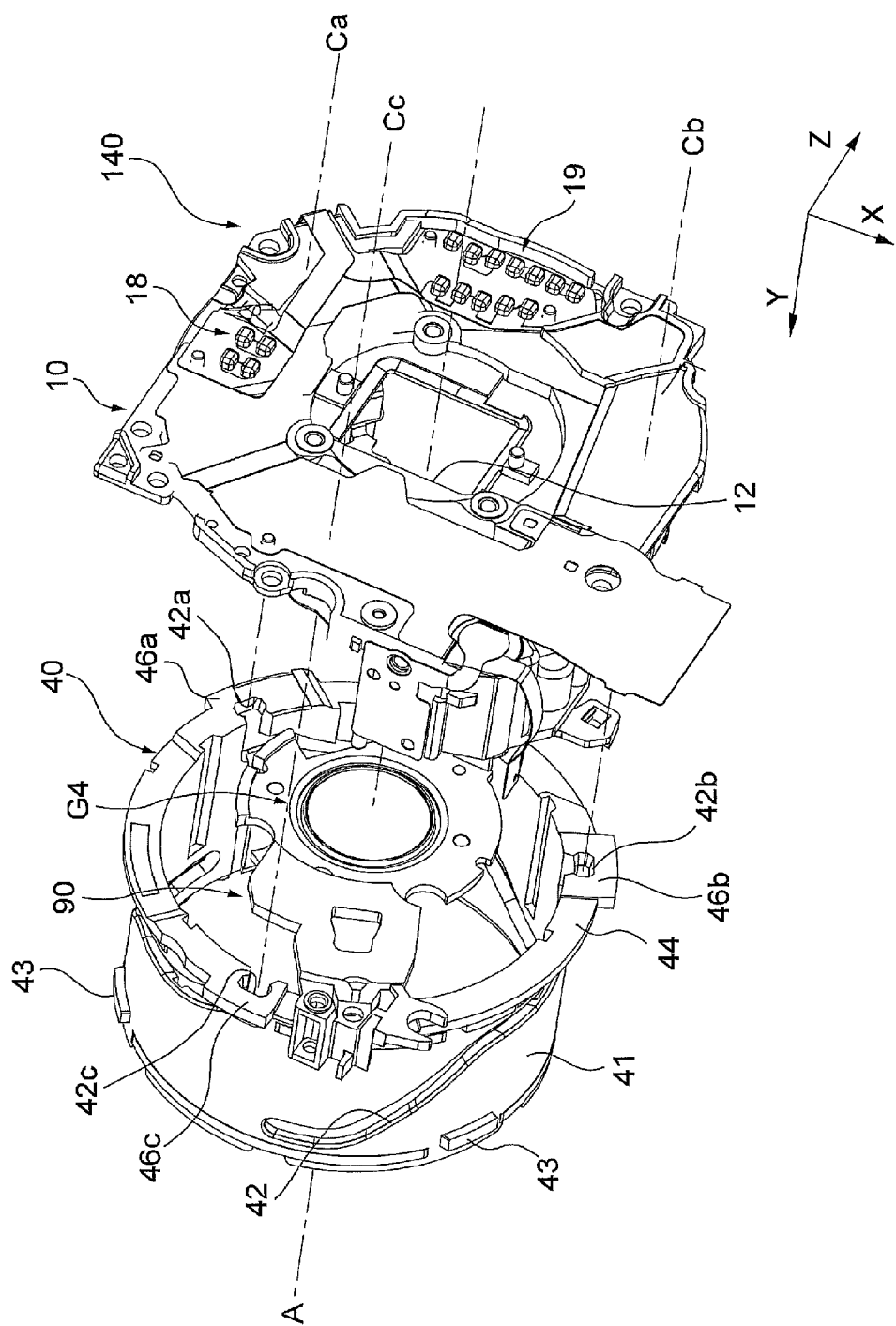
FIG. 34 is an exploded oblique view of a camera cam frame and an imaging element unit.

As shown in FIG. 34, connection terminals 18 and 19 are arranged on the face of the master flange 10 on the opposite side from the fixed frame 20. The connection terminals 18 and 19 protrude from the master flange 10. A flexible printed board (not shown) is electrically connected by solder or the like to the connection terminals 18 and 19. As shown in FIG. 34, the rectilinear projections 46a to 46c are disposed at different positions, i.e. positions where the rectilinear projections 46a to 46c do not overlap each other, from those of the connection terminals 18 and 19 when viewed along the Y-axis direction.

The flanges 44 are formed integrally with the t rectilinear projections 46a to 46c in the circumferential direction of the camera cam frame body 41 as a one-piece unitary member. The flanges 44, along with the rectilinear projections 46a to 46c, form an annular portion that protrudes outwardly in the radial direction from the camera cam frame body 41. The rectilinear projections 46a to 46c protrude farther outward in the radial direction than the flanges 44. The flanges 44 increase the overall strength of the camera cam frame 40. Also, the rectilinear projections 46a to 46c extend more towards the Y-axis direction negative side (image plane side) than the flanges 44 (see FIGS. 16A and 34).

Figure 15:
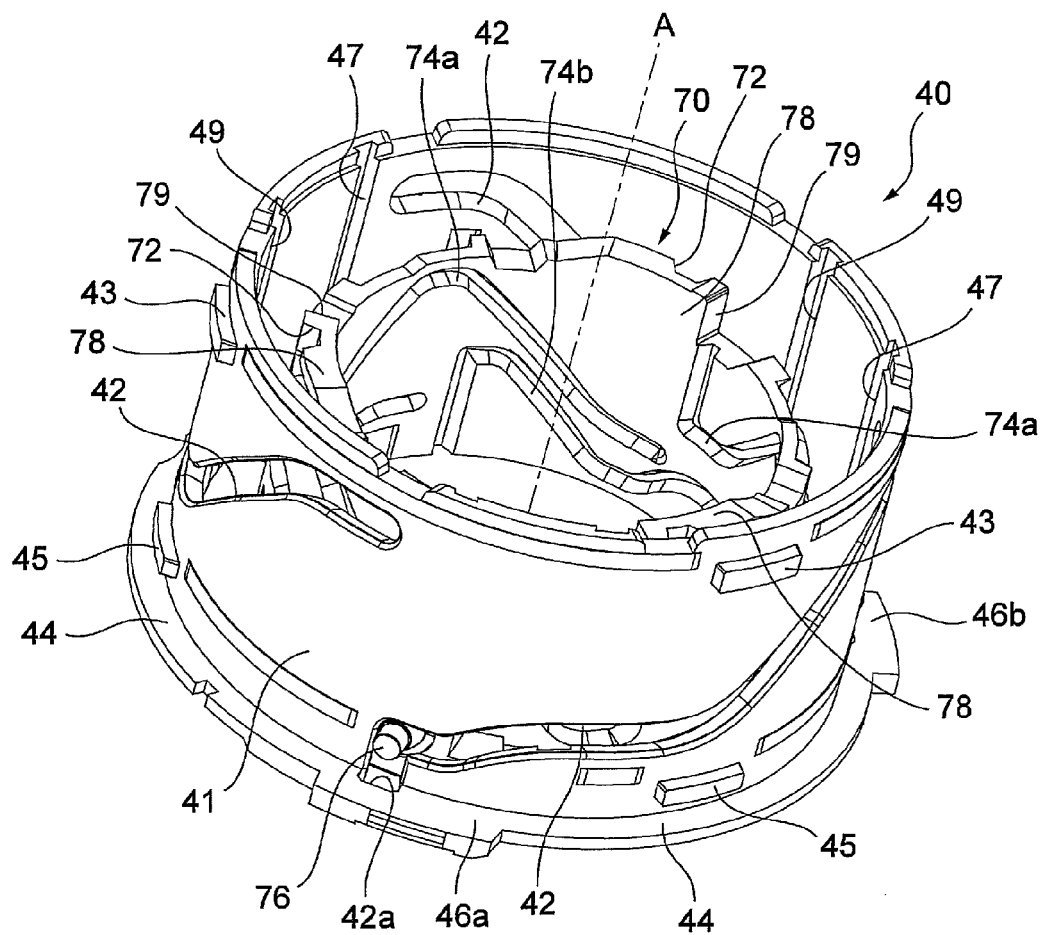
FIG. 15 is an oblique view of a camera cam frame and a rotary cam frame.
Figure 16A:
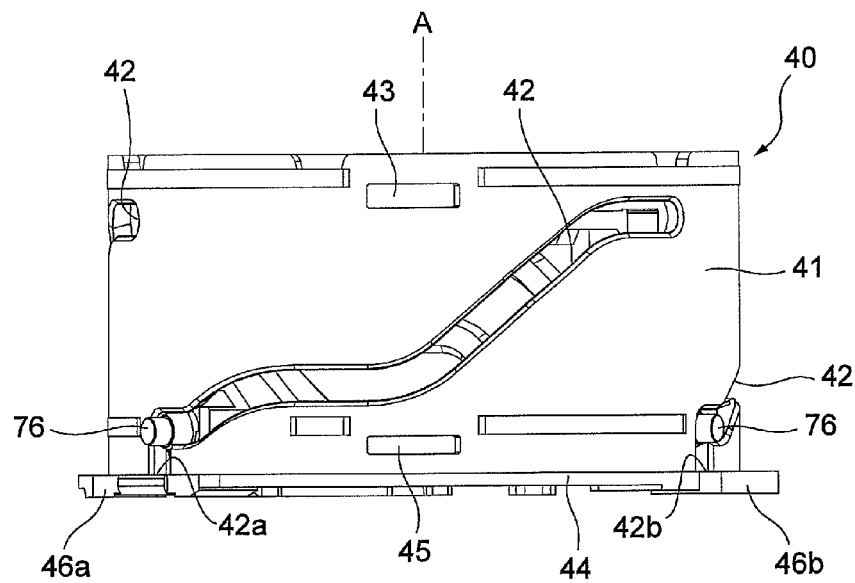
FIG. 16A is a side view of a camera cam frame and a rotary cam frame
Figure 16B:
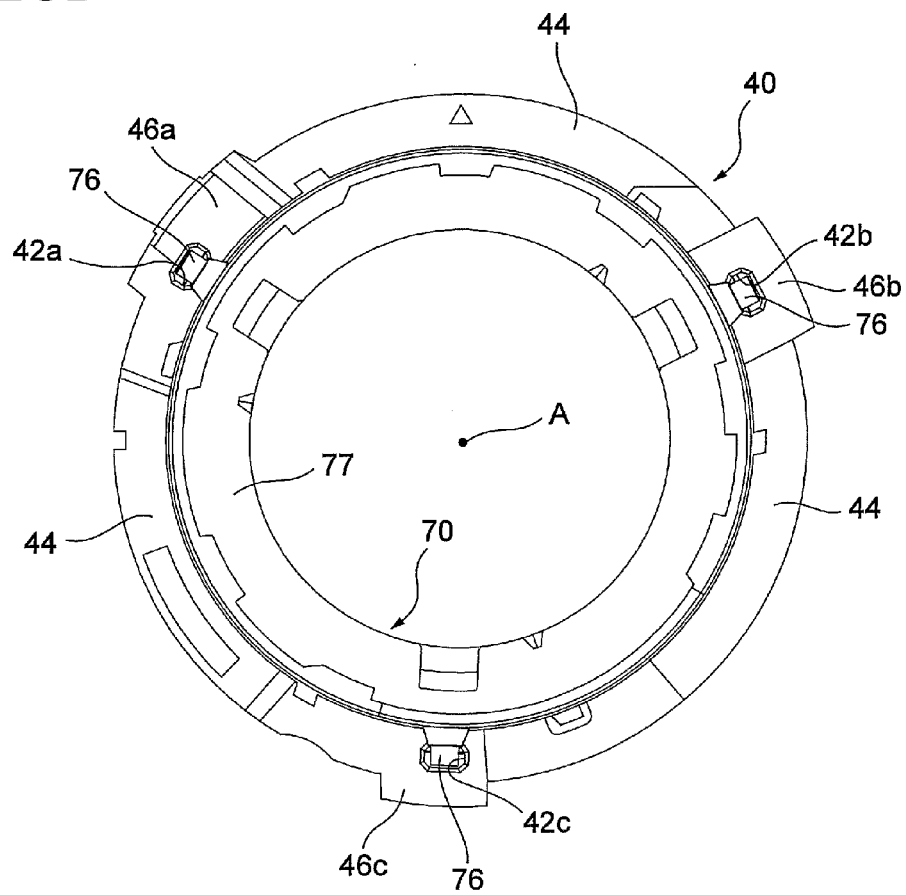
FIG. 16B is a plan view of a camera cam frame and a rotary cam frame.

Also, as shown in FIGS. 15 and 16B, the camera cam frame 40 has insertion openings 42a to 42c disposed at positions corresponding to the rectilinear projections 46a to 46c. The insertion openings 42a to 42c are communicate with the cam through-grooves 42 and spread outwardly in the radial direction beyond the cam pins 76. In addition, the size of the rectilinear projections 46a to 46c is greater than the size of the insertion openings 42a to 42c in the circumferential direction.

Three first rotary projections 43 and three second rotary projections 45 are formed on the outer peripheral side of the camera cam frame body 41. The first rotary projections 43 and the second rotary projections 45 are considered positioning projections. The first rotary projections 43 are guided by the first rotary groove 36 in the rotational direction. The second rotary projections 45 are guided by the second rotary groove 37 in the rotational direction. Accordingly, the camera cam frame 40 rotates with respect to the drive frame 30 as needed while moving integrally with the drive frame 30 in the Y-axis direction.

When the drive frame 30 rotates with respect to the fixed frame 20, the drive frame 30 moves in the Y-axis direction with respect to the fixed frame 20. During this time, the camera cam frame 40 moves in the Y-axis direction (see FIG. 13) along with the drive frame 30 without rotating and with respect to the fixed frame 20, i.e. while rotating with respect to the drive frame 30.

3.4: First Frame Body

Figure 17:
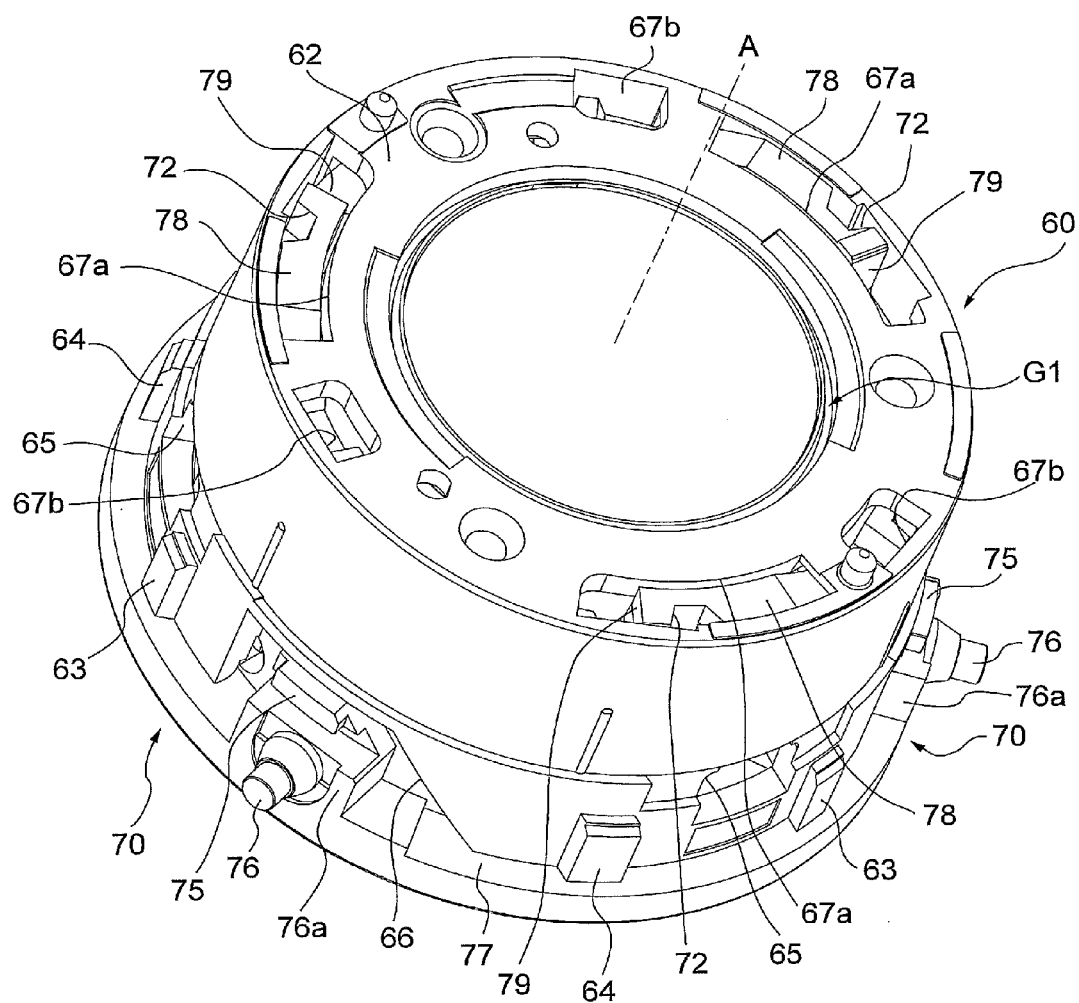
FIG. 17 is an oblique view of a first lens frame and a rotary cam frame.
Figure 18A:
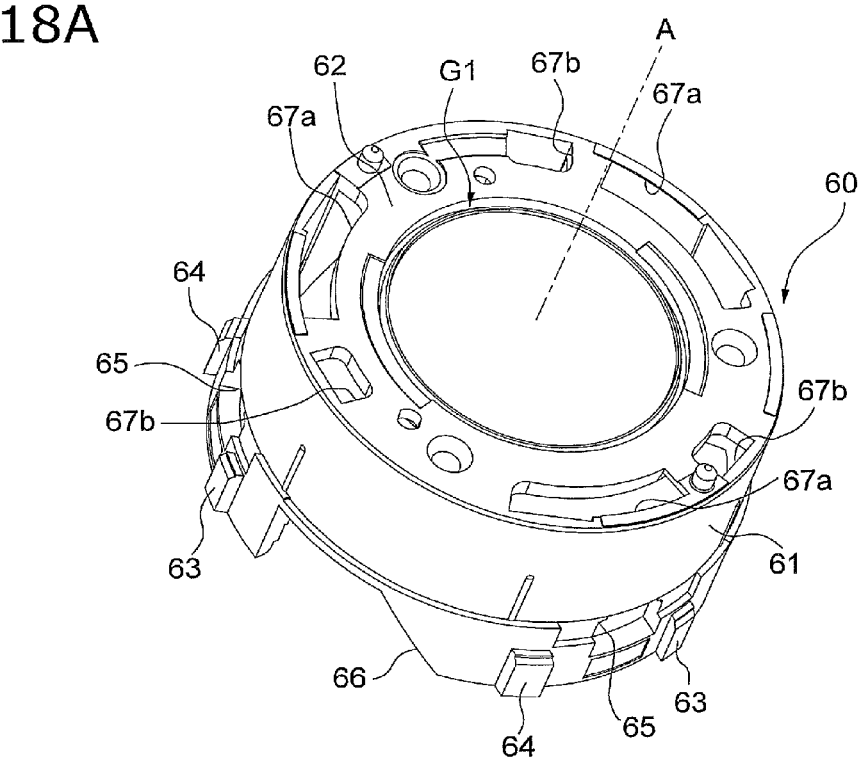
FIG. 18A is an oblique view of a first lens frame.
Figure 19:
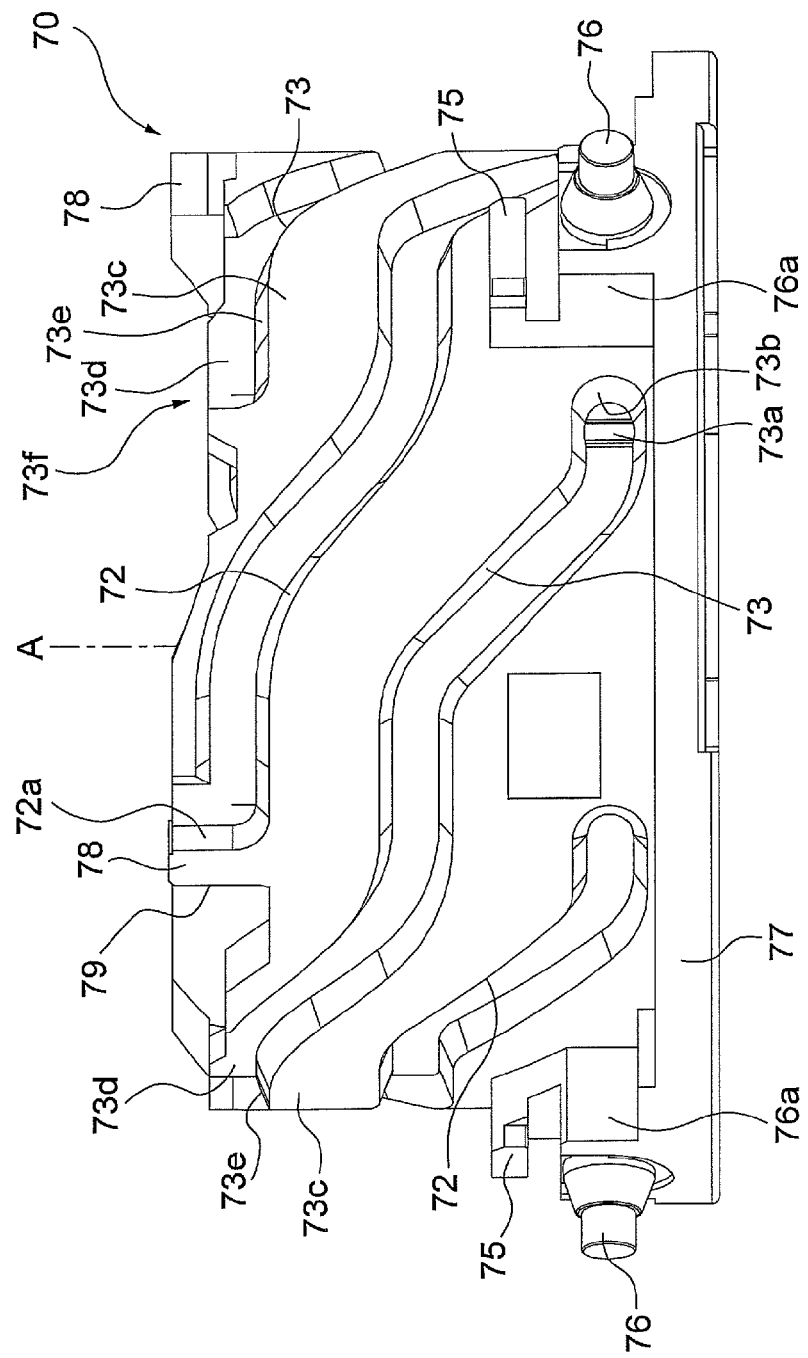
FIG. 19 is a side view of a rotary cam frame.
Figure 21:
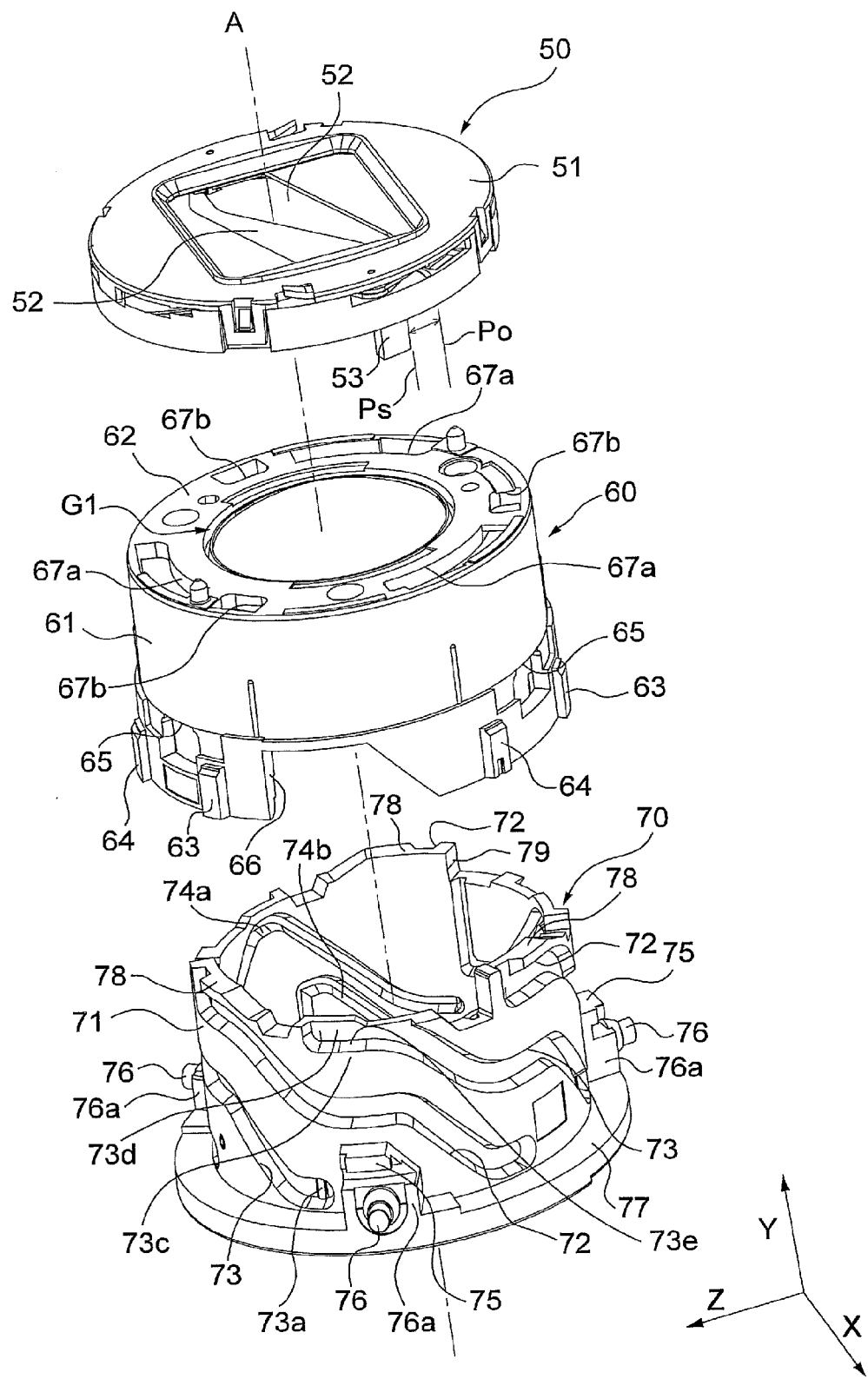
FIG. 21 is an exploded oblique view of a lens barrier, a first lens frame, and a rotary cam frame.

As shown in FIGS. 17, 18A, and 19, the first lens frame 60 (an example of a lens frame) supports the first lens group G1 and is disposed on the inner peripheral side of the camera cam frame 40. More specifically, the first lens frame 60 has a first lens frame body 61 (an example of a lens frame body) and a flange 62 to which the first lens group G1 (an example of a lens element) is fixed. The flange 62 is arranged at the end of the first lens frame body 61 on the Y-axis direction positive side. Three first openings 67a (an example of through-holes) and three second openings 67b are formed in the flange 62, and pass through the first lens frame body 61 in the Y-axis direction. As shown in FIG. 21, an opening lever 53 (discussed below) of a lens barrier 50 and projections 78 of the rotary cam frame 70 are inserted in the first openings 67a and movable in the rotational direction during retraction of the lens barrel 3. The lens barrier 50 is fixed on the Y-axis direction positive side of the first lens frame 60. As shown in FIG. 6, the lens barrier 50 and the first lens frame 60 are covered by a cosmetic ring 180. Three cut-outs 66 (an example of second cut-outs) are foamed at the end of the first lens frame body 61 on the Y-axis direction negative side. As shown in FIG. 17, the cut-outs 66 are formed to avoid the base portions 76a where the cam pins 76 of the rotary cam frame 70 are fixed during retraction of the lens barrel 3.

As shown in FIGS. 17, 18A, and 19, the three first rectilinear pins 63 and three second rectilinear pins 64 are arranged on the outer peripheral side of the first lens frame body 61. Three first cam pins 68 (an example of cam members) and three second cam pins 69 (an example of protruding members) are arranged on the inner peripheral side of the first lens frame body 61.

The second rectilinear pins 64 are guided by first rectilinear grooves 107 of the first rectilinear frame 100 (discussed below) in the Y-axis direction. The first rectilinear pins 63 are inserted in second rectilinear grooves 108 of the first rectilinear frame 100. Accordingly, the first lens frame 60 moves in the Y-axis direction with respect to the first rectilinear frame 100 without rotating. Specifically, rotation of the first lens frame 60 with respect to the fixed frame 20 is limited by the first rectilinear frame 100 via the camera cam frame 40. The first lens frame 60 is movably supported, without rotating, by the first rectilinear frame 100 and the camera cam frame 40 in the Y-axis direction and with respect to the fixed frame 20.

Figure 22B:
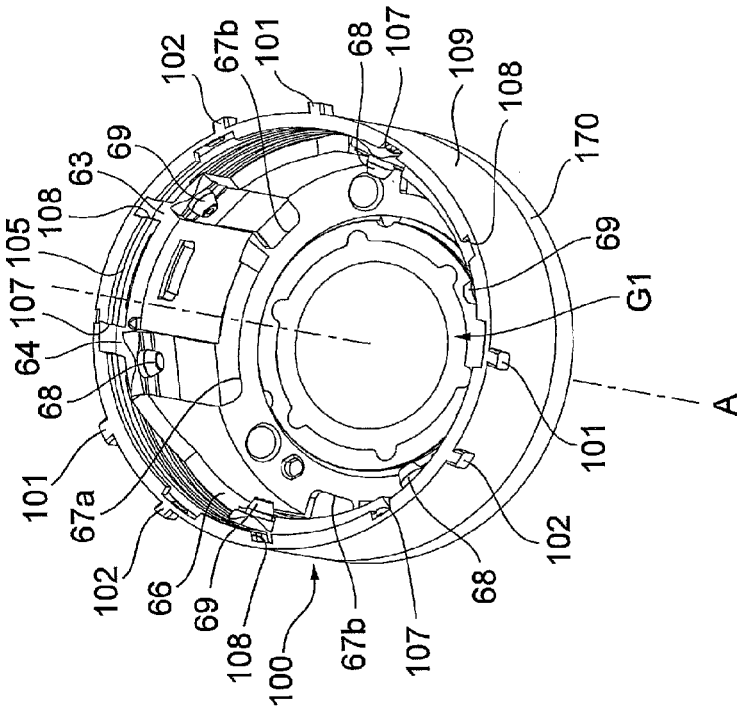
FIGS. 22A and 22B are oblique views of a first lens frame and a first rectilinear frame.
Figure 22A:
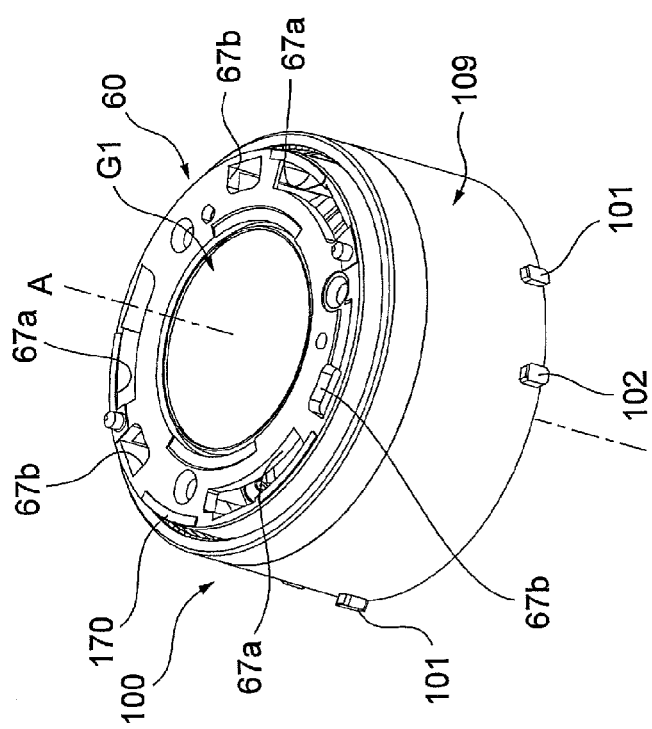
Figure 23:
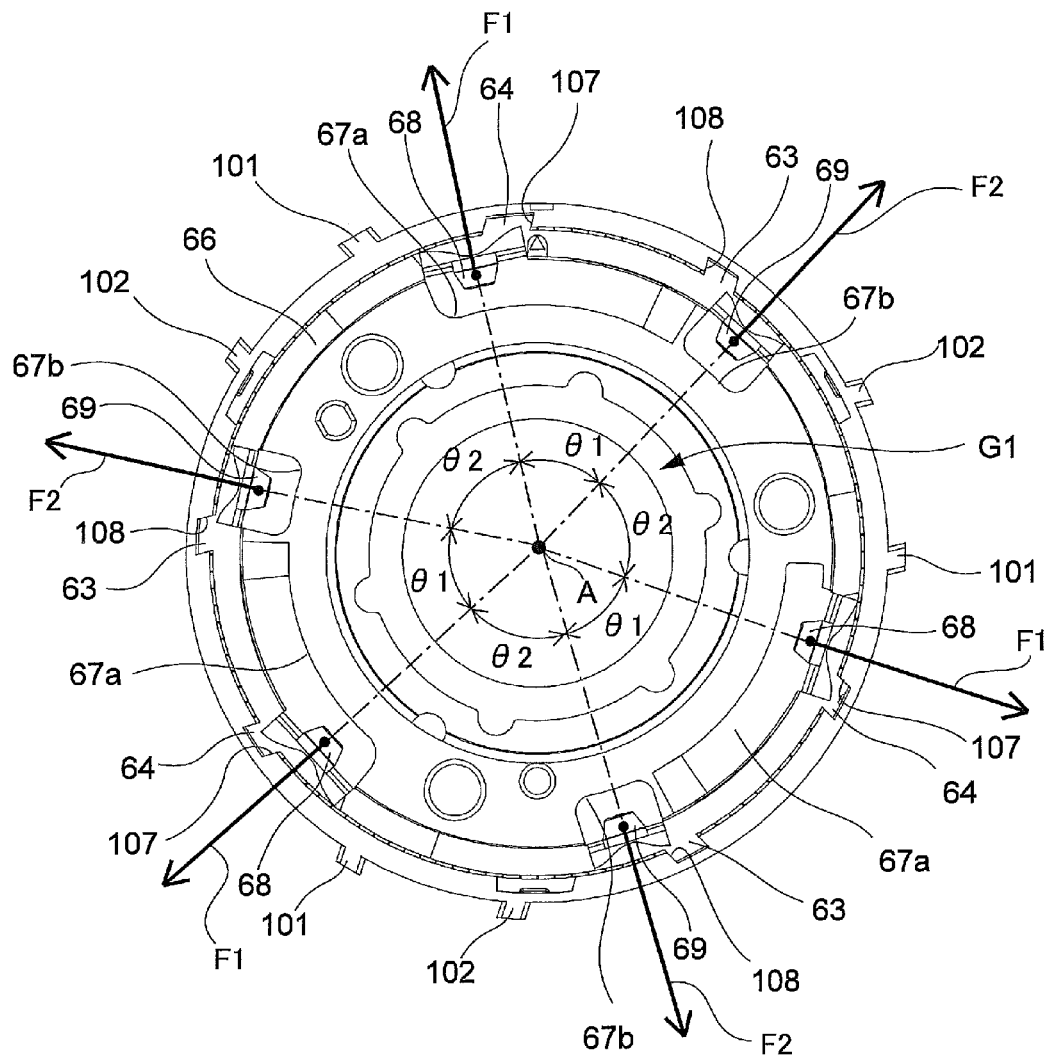
FIG. 23 is a plan view of a first lens frame and a first rectilinear groove.

As shown in FIGS. 22A, 22B and 23, the first cam pins 68 are positioning pins, and the second cam pins 69 are reinforcing pins. The first cam pins 68 are guided by first cam grooves 72 (discussed below) of the rotary cam frame 70. The second cam pins 69 are inserted, via a gap, into second cam grooves 73 (discussed below) of the rotary cam frame 70.

Accordingly, the first lens frame 60 is movably supported by the rotary cam frame 70 in the Y-axis direction while rotating with respect to the rotary cam frame 70.

3.4.1: Configuration of First Rectilinear Pins 63, Second Rectilinear Pins 64, First Cam Pins 68, and Second Cam Pins 69

The first rectilinear pins 63, the second rectilinear pins 64, the first cam pins 68 and the second cam pins 69 will now be described. As shown in FIGS. 22A, 22B, and 23, the first cam pins 68 are disposed approximately on the opposite side in the radial direction from the first rectilinear pins 63 with respect to the first lens frame body 61. The second cam pins 69 are disposed approximately on the opposite side in the radial direction from the second rectilinear pins 64 with respect to the first lens frame body 61. The adjacent first rectilinear pins 63 and second rectilinear pins 64 are disposed between the adjacent first cam pins 68 and second cam pins 69. The first rectilinear pins 63 and the second rectilinear pins 64 are integrally formed with the first lens frame body 61 as a one-piece unitary member. The first rectilinear pins 63 and the second rectilinear pins 64 protrude outwardly in the radial direction from the first lens frame body 61. The first cam pins 68 and the second cam pins 69 are also integrally formed with the first lens frame body 61 as a one-piece unitary member. However, the first cam pins 68 and the second cam pins 69 protrude inwardly in the radial direction from the first lens frame body 61.

The first cam grooves 72 and second cam grooves 73 of the rotary cam frame 70 have the same shape, but the first cam pins 68 and second cam pins 69 protrude from the first lens frame body 61 in different amounts. More specifically, as shown in FIGS. 24A and 24B, the first cam pins 68 and the second cam pins 69 have tapered portions 68a and 69a that have the same shape, but the lengths of the cylindrical portions 68a and 69b at the base are different. Accordingly, the first cam pins 68 protrude inwardly in the radial direction by a length T more than the second cam pins 69. Therefore, the first cam pins 68 come into contact with the first cam grooves 72, but a space S1 is ensured between the second cam pins 69 and the second cam grooves 73 in the rotational direction and in the radial direction, and basically, there is no contact between the second cam pins 69 and the second cam grooves 73. Since the space S1 is small, if the first lens frame body 61 or the rotary cam frame 70 deforms elastically, it is possible for the second cam pins 69 and the second cam grooves 73 to come into contact.

Also, as shown in FIGS. 24A and 24B, the first cam pins 68 and the first cam grooves 72 have a tapered shape. More specifically, when the lens barrel 3 is subjected to an external force such as an impact caused by a fall, the first cam pins 68 and the first cam grooves 72 have a tapered shape that allows at least part of the external force in the Y-axis direction exerted between the first lens frame 60 and the rotary cam frame 70 to be converted into a force that attempts to separate the first lens frame 60 from the rotary cam frame 70 in the radial direction. For example, if an external force in the Y-axis direction pushes the first cam pins 68 against the first cam grooves 72, the first cam pins 68 try to come out of the first cam grooves 72 along the tapered faces. At this point, as illustrated in FIG. 23, a force F1 that faces outwardly in the radial direction is exerted on the portion of the first lens frame body 61 around the first cam pins 68, and a force that faces inwardly in the radial direction is exerted on a portion of the cam frame body 71 where the first cam pins 68 are in contact. Accordingly, the portion of the first lens frame body 61 around the first cam pins 68 elastically deforms so as to move outwardly in the radial direction, and the portion of the cam frame body 71 around the first cam pins 68 elastically deforms so as to move inwardly in the radial direction.

Meanwhile, when the first lens frame body 61 and the cam frame body 71 undergo elastic deformation, the portion of the first lens frame body 61 around the second cam pins 69 elastically deforms so as to move inwardly in the radial direction, and the portion of the cam frame body 71 around the second cam pins 69 elastically deforms so as to move outwardly in the radial direction. As a result, the second cam pins 69 are pushed into the second cam grooves 73. Furthermore, the first lens frame 60 is elastically deformed by an external force in the Y-axis direction, and the second cam pins 69 are pushed against the second cam grooves 73 in the Y-axis direction.

However, the second cam pins 69 and the second cam grooves 73 have a tapered shape such that at least part of the external force exerted in the Y-axis direction between the first lens frame 60 and the rotary cam frame 70 can be converted into a force that attempts to separate the first lens frame 60 from the rotary cam frame 70 in the radial direction. For example, as discussed above, when the second cam pins 69 are pushed into the second cam grooves 73, a force F2 (see FIG. 23) generated by the tapered shape attempts to remove the second cam pins 69 from the second cam grooves 73. As a result, a force that faces outwardly in the radial direction is exerted on the portion around the second cam pins 69. In addition, a force that faces inwardly in the radial direction is exerted on the portion where the second cam pins 69 come into contact. Accordingly, there is a good balance between these forces and the force transmitted from the first cam pins 68, and there is less uneven deformation of the first lens frame 60 and the rotary cam frame 70.

Thus, positioning of the first lens frame 60 with respect to the camera cam frame 40 is performed solely by the first cam pins 68 and the first cam grooves 72. However, if the user should drop the digital camera 1, for example, then the impact can be absorbed by the second cam pins 69 in addition to the first cam pins 68. Accordingly, the impact of the drop can be distributed to the first cam pins 68 and the second cam pins 69, which prevents damage to the first cam pins 68 and the second cam pins 69. Furthermore, the second cam pins 69 and the second cam grooves 73 prevents the first cam pins 68 and the second cam pins 69 from coming out of the first cam grooves 72 and the second cam grooves 73 of the rotary cam frame 70 in the event that the lens barrel 3 is subjected to a large external force.

The first cam pins 68 and the second cam pins 69 are also characterized by their layout in the circumferential direction of the lens frame 60. More specifically, as shown in FIG. 23, the three first cam pins 68 are disposed at a constant pitch with each other in the circumferential direction, and the three second cam pins 69 are disposed at a constant pitch with each other in the circumferential direction of the lens frame 60. However, the first cam pins 68 are not disposed at a constant pitch with the second cam pins 69 in the circumferential direction of the lens frame 60.

The first cam pins 68 are disposed closer to the second cam pins 69 on the rotational direction R1 side than the second cam pins 69 on the rotational direction R2 side. The angle θ1 between the first cam pins 68 and the second cam pins 69 on the rotational direction R2 side is smaller than the angle θ2 between the first cam pins 68 and the second cam pins 69 on the rotational direction R1 side. The relationship between the angles θ1 and θ2 is also the same with the first rectilinear pins 63 and the second rectilinear pins 64.

Since the first cam pins 68 are not disposed at a constant pitch with the second cam pins 69 in the circumferential direction, this prevents the first lens frame 60 from being attached the wrong way to the rotary cam frame 70. For example, the distance between the centers of each pin is used to determine the pitch in the circumferential direction of the lens frame 60.

3.5: Rotary Cam Frame

Figure 12A:
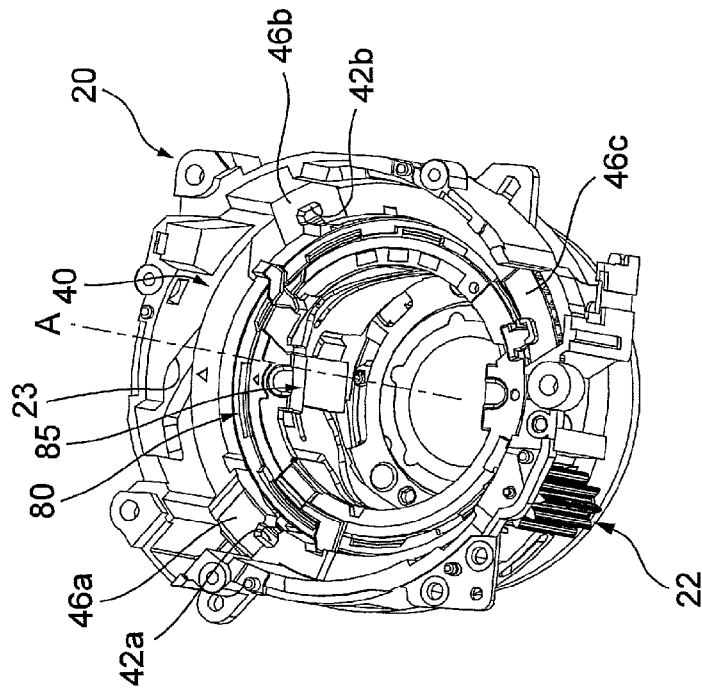
FIGS. 12A and 12B are oblique views of a lens barrel.
Figure 12B:
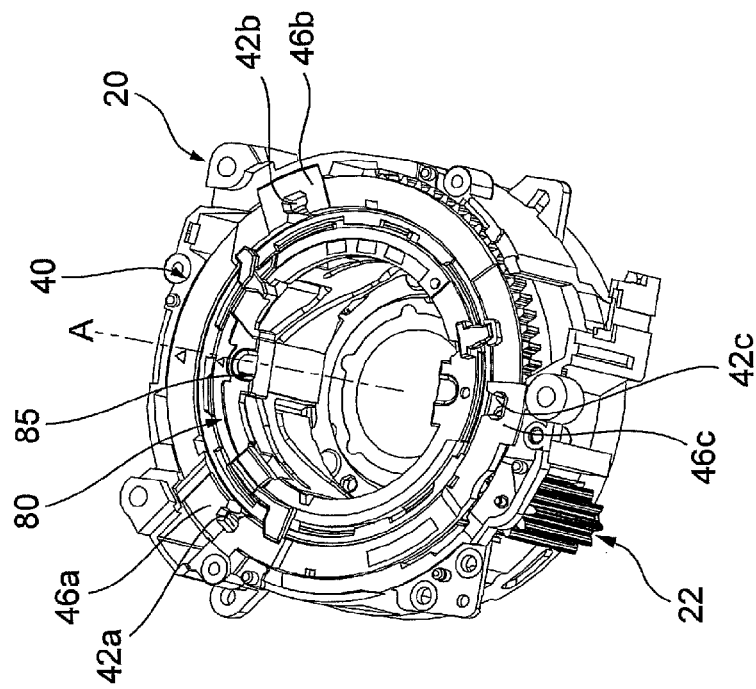
Figure 13B:
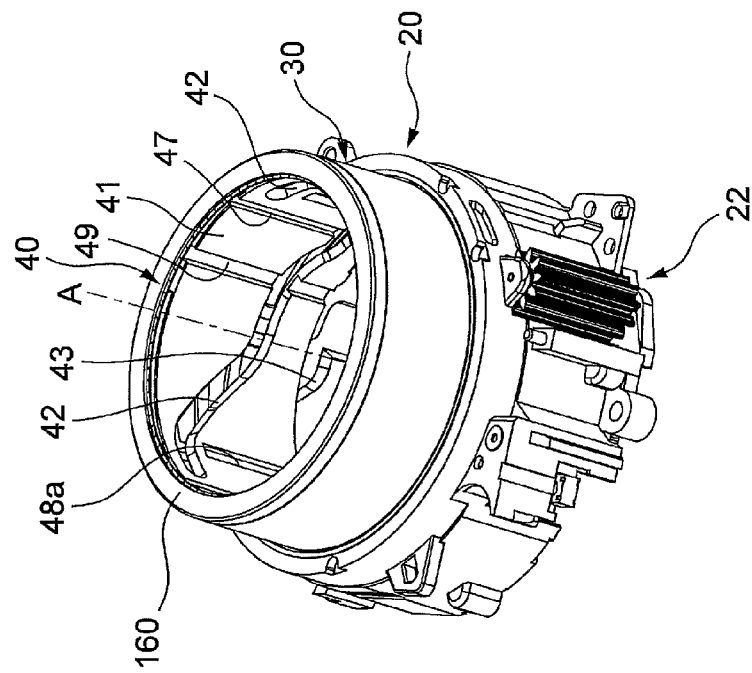
FIGS. 13A and 13B are oblique views of a lens barrel.
Figure 13A:
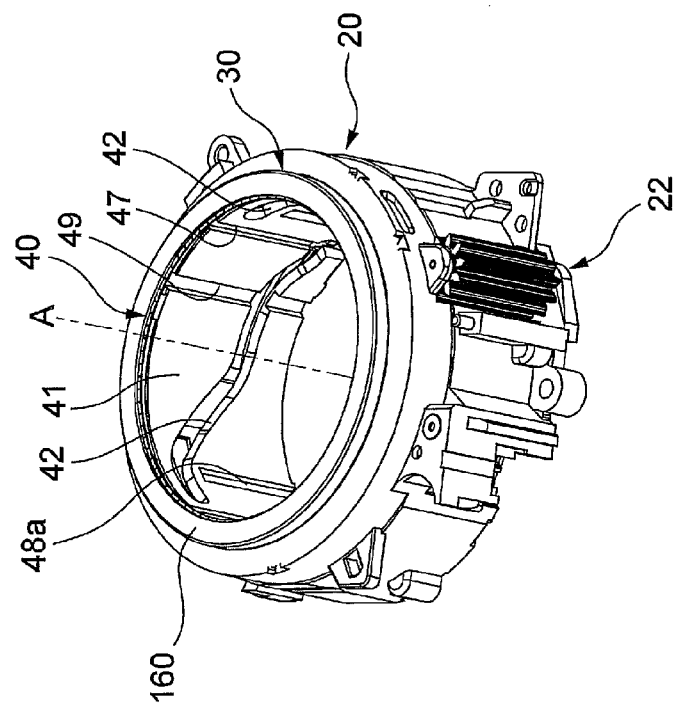
Figure 18B:
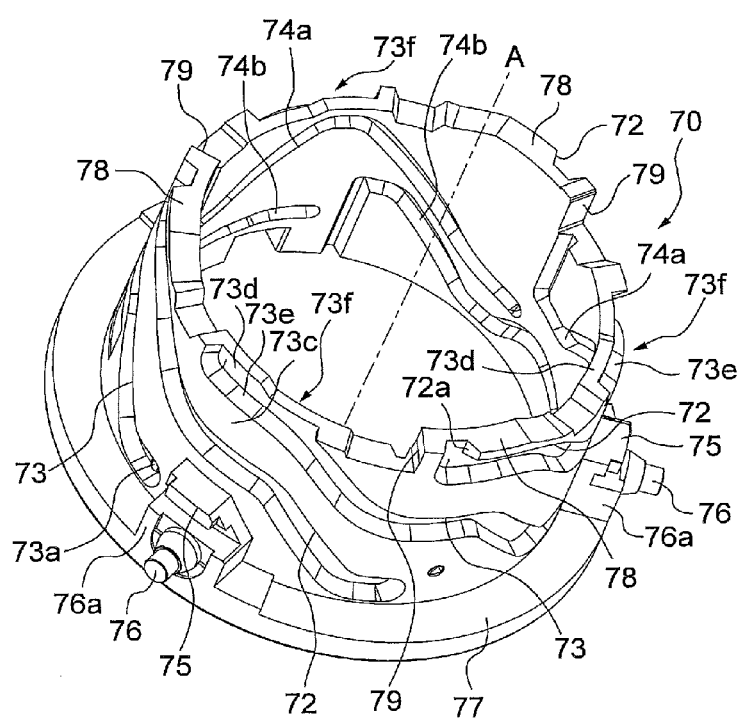
FIG. 18B is an oblique view of a rotary cam frame.

As shown in FIGS. 17, 18B, and 19, the rotary cam frame 70 is used to movably support the first lens frame 60, the second lens frame 190, the third lens frame 200 and the fourth lens frame 90 in the Y-axis direction. The rotary cam frame 70 is disposed on the inner peripheral side of the fixed frame 20 and on the inner peripheral side of the first lens frame 60. More specifically, as shown in FIGS. 6 and 12, the rotary cam frame 70 has the substantially cylindrical cam frame body 71 (an example of a second frame body), the three projections 78, three cut-outs 79 (an example of first cut-outs), the three cam pins 76 (an example of guide members) arranged on the outer peripheral side of the cam frame body 71, an annular flange 77 and three rotary projections 75. The three cam pins 76 are disposed at a constant pitch in the circumferential direction of the cam frame 70.

As shown in FIGS. 18B, 19, and 21, the projections 78 are disposed at the end of the cam frame body 71 on the Y-axis direction positive side and protrude from the cam frame body 71 on the Y-axis direction positive side. The cut-outs 79 are disposed between the three projections 78 and recessed towards the Y-axis direction negative side. It could also be said that the cut-outs 79 are formed by the projections 78. The projections 78 are arranged to be inserted in the first openings 67*a* of the first lens frame 60 during retraction.

One of the three projections 78 functions as a drive projection for pushing the opening lever 53 (discussed below) of the lens barrier 50 in the rotational direction. This particular projection 78 is disposed on the rotational direction R1 side of the opening lever 53. One of the cut-outs 79 is where the opening lever 53 is inserted in the Y-axis direction. This particular cut-out 79 is disposed on the rotational direction R2 side of the projection 78 and functions as a drive projection.

The flange 77 is arranged at the end of the cam frame body 71 on the Y-axis direction negative side. The flange 77 has a flange body 77*a*, a cylindrical part 77*b*, and a stopper 77*c* (see FIGS. 8 to 10). The flange body 77*a* protrudes outwardly in the radial direction from the cam frame body 71. The cylindrical part 77*b* is disposed on the outer peripheral part of the flange body 77*a* and protrudes from the flange body 77*a* towards the Y-axis direction negative side. The stopper 77*c* protrudes inwardly in the radial direction from the cylindrical part 77*b*. The stopper 77*c* is arranged to attach the second rectilinear frame 80 to the rotary cam frame 70. The stopper 77*c* is caught by a plurality of rotary projections 81*a* of the second rectilinear frame 80 (discussed below) (see FIG. 12B and FIGS. 8 to 10).

As shown in FIGS. 17, 18B, and 19, the rotary projections 75 protrude outwardly in the radial direction from the cam frame body 71 and are disposed at substantially the same position as the cam pins 76 in the circumferential direction. The rotary projections 75 are disposed at a constant pitch in the circumferential direction and inserted in a rotary groove 105 of the first rectilinear frame 100 (see FIG. 8). Since the rotary projections 75 are inserted in the rotary groove 105, the rotary cam frame 70 moves integrally with the first rectilinear frame 100 in the Y-axis direction. The rotary cam frame 70 and the first rectilinear frame 100 do not rotate with respect to the fixed frame 20, so the rotary cam frame 70 moves integrally with the first rectilinear frame 100 in the Y-axis direction without rotating and with respect to the first rectilinear frame 100.

Since the distal ends of the cam pins 76 are inserted in the straight grooves 38 of the drive frame 30 (see FIG. 14B), the rotary cam frame 70 is movable in the Y-axis direction with respect to the drive frame 30 while rotating integrally with the drive frame 30. Also, since the cam pins 76 pass through the cam through-grooves 42 of the camera cam frame 40, the rotary cam frame 70 rotates relative to the camera cam frame 40. At this point, the cam pins 76 move along the cam through-grooves 42; and as a result, the rotary cam frame 70 rotates along with the drive frame 30 while moving in the Y-axis direction with respect to the drive frame 30 according to the shape of the cam through-grooves 42.

With the above arrangement, the rotary cam frame 70 is capable of rotating integrally with the drive frame 30 and moving in the Y-axis direction with respect to the drive frame 30. Specifically, the rotary cam frame 70 is movable in the Y-axis direction while rotating with respect to the fixed frame 20. The amount of movement of the rotary cam frame 70 in the Y-axis direction is the sum of the amount of movement of the drive frame 30 in the Y-axis direction with respect to the fixed frame 20 and the amount of movement of the rotary cam frame 70 in the Y-axis direction with respect to the drive frame 30.

Also, since the first lens frame 60 is supported by the rotary cam frame 70, as discussed above, the amount of movement of the first lens frame 60 in the Y-axis direction with respect to the fixed frame 20 is such that the amount of movement of the first lens frame 60 in the Y-axis direction with respect to the rotary cam frame 70 is added to the amount of movement of the rotary cam frame 70 in the Y-axis direction. Accordingly, a good zoom ratio can be ensured while achieving a more compact lens barrel 3.

3.5.1: Constitution of First Cam Grooves 72 and Second Cam Grooves 73

As shown in FIGS. 19 and 20A, the three first cam grooves 72 (an example of cam grooves) and the three second cam grooves 73 (an example of auxiliary grooves) are formed on the outer peripheral side of the cam frame body 71. The first cam pins 68 are inserted in the first cam grooves 72 and the first cam grooves 72 movably support the first lens frame 60 with respect to the cam frame body 71. The second cam grooves 73 are used for reinforcement, and the second cam pins 69 are inserted in the second cam grooves 73. The three first cam grooves 72 are disposed at a constant pitch with each other in the circumferential direction, and the three second cam grooves 73 are disposed at a constant pitch with each other in the circumferential direction of the cam frame body 71. The shape of the second cam grooves 73 is substantially the same as that of the first cam grooves 72, but differs from the shape of the first cam grooves 72 on a point that stepped portions 73a are formed around the ends 73b of the second cam grooves 73.

The first cam grooves 72 are formed in the cam frame body 71 and the projections 78. More specifically, as shown in FIGS. 19 and 20A, lead-in grooves 72a of the first cam grooves 72 are formed in the projections 78. As shown in FIG. 20A, when the lens barrel 3 is in a telephoto state, a wide angle state, and a retracted state, the first cam pins 68 are positioned at a telephoto position Pt1, a wide angle position Pw1, and a retracted position Pr1, respectively, in the first cam grooves 72.

Meanwhile, as shown in FIG. 20A, when the lens barrel 3 is in the telephoto state, the wide angle state, and/or the retracted state, the second cam pins 69 are positioned at a telephoto position Pt2, a wide angle position Pw2, and a retracted position Pr2, respectively, in the second cam grooves 73. The cut-outs 79, formed by recesses in the end of the cam frame body 71 to the Y-axis direction negative side, are formed around the ends of the second cam grooves 73 on the Y-axis direction positive side (around the telephoto position Pt2). Accordingly, the second cam grooves 73 have auxiliary insertion openings 73f that are disposed between two adjacent projections 78 and opened on the side where the projections 78 protrude. Parts of the second cam grooves 73 are cut out by the cut-outs 79. It could be said that the auxiliary insertion openings 73f are formed as a result of this. Since the second cam grooves 73 extend in the circumferential direction around the auxiliary insertion openings 73f, the size of the auxiliary insertion openings 73f in the circumferential direction is larger than the width of the second cam grooves 73. Also, the size of the auxiliary insertion openings 73f is larger than the width of the lead-in grooves 72a of the first cam grooves 72 in the circumferential direction.

The stepped portions 73a are capable of coming into contact in the rotational direction with the distal ends of the second cam pins 69 guided by the second cam grooves 73. The height of the stepped portions 73a is set so that when the first lens frame 60 and the rotary cam frame 70 have rotated relative to each other, the distal ends of the second cam pins 69 will ride up over the stepped portions 73a. When the distal ends of the second cam pins 69 ride up over the stepped portions 73a, movement of the second cam pins 69 is limited between the stepped portions 73a and the ends 73b of the second cam grooves 73. Specifically, the first lens frame 60 and the rotary cam frame 70 essentially become an integral member. If a specific rotational force is exerted between the first lens frame 60 and the rotary cam frame 70, the second cam pins 69 rides up over the stepped portions 73a and relative rotation between the first lens frame 60 and the rotary cam frame 70 is permitted.

Thus, the first lens frame second cam pins 69 and the stepped portions 73a constitute a locking mechanism for the first lens frame 60 and the rotary cam frame 70.

The grooves between the stepped portions 73a and the ends 73b are used only during assembly and they are not used during the retraction or zooming operations of the lens barrel 3.

As shown in FIGS. 18, 19, 20A, 21, and 36, the rotary cam frame 70 has first contact portions 73c that form the edge of the second cam grooves 73 and second contact portions 73d that form the bottom of the second cam grooves 73. The first contact portions 73c are disposed opposite to the second cam pins 69 via an oblique gap K1 that forms a space obliquely along the Y-axis direction when the optical system O is in the telephoto state, i.e. the telephoto position Pt2 shown in FIG. 20A. See FIG. 36. The first contact portions 73c have a tapered shape that is complementary with the second cam pins 69 and inclined faces 73e that are opposite to the second cam pins 69. The second contact portions 73d form the bottom of the second cam grooves 73 and are disposed opposite to the second cam pins 69 via a radial gap K2 that forms a space in the radial direction of the cam frame.

3.5.2: Constitution of Third Cam Grooves 74a and Fourth Cam Grooves 74b

As shown in FIGS. 18B, 20B, and 21, three third cam grooves 74a and three fourth cam grooves 74b are formed on the inner peripheral side of the cam frame body 71. The three third cam grooves 74a are used to guide cam pins 192 (discussed below) of the second lens frame 190. The three third cam grooves 74a are disposed at a constant pitch in the circumferential direction. The fourth cam grooves 74b are used to guide cam pins 229 (discussed below) of a base frame 220 constituting the third lens frame 200. The fourth cam grooves 74b are disposed at a constant pitch with each other in the circumferential direction.

As shown in FIG. 20B, when the lens barrel 3 is in the telephoto state, the wide angle state, and the retracted state, the cam pins 192 are positioned at a telephoto position Pt3, a wide angle position Pw3, and a retracted position Pr3, respectively, in the first cam grooves 72. Also, when the lens barrel 3 is in the telephoto state, the wide angle state, and/or the retracted state, the cam pins 229 are positioned at a telephoto position Pt4, a wide angle position Pw4, and a retracted position Pr4, respectively.

With the above arrangement, the amount of movement of the second lens frame 190 with respect to the fixed frame 20 in the Y-axis direction is the sum of adding the amount of movement of the second lens frame 190 in the Y-axis direction to the amount of movement of the rotary cam frame 70 in the Y-axis direction.

Also, the amount of movement of the third lens frame 200 with respect to the fixed frame 20 in the Y-axis direction is the sum of adding the amount of movement of the third lens frame 200 in the Y-axis direction to the amount of movement of the rotary cam frame 70 in the Y-axis direction.

3.5.3: Constitution of Projections 78

Further, as shown in FIGS. 18B, 19, and 21, the three projections 78 extending in the Y-axis direction from the cam frame body 71 and the cut-outs 79 disposed between the three projections 78 are formed at the end of the cam frame body 71 on the Y-axis direction positive side. One of the three projections 78 functions as a drive projection for pushing the opening lever 53 (discussed below) of the lens barrier 50 in the rotational direction. This particular projection 78 is disposed on the rotational direction R1 side of the opening lever 53. One of the three cut-outs 79 is a portion where the opening lever 53 is inserted in the Y-axis direction. This particular cut-out 79 is disposed on the rotational direction R2 side of the projection 78 and functions as a drive projection.

As shown in FIGS. 6 and 21, the lens barrier 50 is a mechanism for protecting the first lens group G1 when the digital camera 1 is not in use (when the lens is retracted). The lens barrier 50 is fixed on the Y-axis direction positive side of the first lens frame 60. More specifically, the lens barrier 50 has a barrier mechanism 51, a pair of barrier blades 52 and the opening lever 53. The barrier mechanism 51 supports the pair of barrier blades 52 which is capable of opening and shutting.

The opening and shutting of the pair of barrier blades 52 is switched by the opening lever 53. More specifically, the opening lever 53 is supported by the barrier mechanism 51 to be movable in the rotational direction. For example, the opening lever 53 is movable in the rotational direction between an open position Po and a shut position Ps. See FIG. 21. The opening lever 53 is disposed on the rotational direction R2 side of the projections 78 of the rotary cam frame 70. The opening lever 53 is driven by the projections 78.

When the opening lever 53 is not under any load, the barrier blades 52 are kept open (with the opening lever 53 in the open position Po) by a spring (not shown) of the barrier mechanism 51. When the opening lever 53 is pushed to the rotational direction R2 side, the opening lever 53 moves to the shut position Ps. The pair of barrier blades 52 is shut. When the opening lever 53 is held in the shut position Ps, the pair of barrier blades 52 is also held shut.

3.7: First Rectilinear Frame

As shown in FIGS. 6, 22A, 22B, 23, and 25A, the first rectilinear frame 100 has a first rectilinear frame body 109, three first projections 101, three second projections 102, three first rectilinear grooves 107, three second rectilinear grooves 108 and a rotary groove 105. The first rectilinear frame 100 is disposed concentrically between the camera cam frame 40 and the first lens frame 60.

The first rectilinear frame body 109 is a substantially cylindrical member, and a cosmetic ring 170 is fixed to the end of the first rectilinear frame body 109 on the Y-axis direction positive side. The first projections 101 and the second projections 102 are arranged on the outer peripheral part of the first rectilinear frame body 109 and protrude outwardly in the radial direction from the first rectilinear frame body 109. The first projections 101 and the second projections 102 are disposed at the end of the first rectilinear frame body 109 on the Y-axis direction negative side. The three first projections 101 are disposed at a constant pitch with each other in the circumferential direction, and the three second projections 102 are disposed at a constant pitch with each other in the circumferential direction. The first projections 101 are inserted in third rectilinear grooves 49 of the camera cam frame 40, and the second projections 102 are inserted in first rectilinear grooves 47 of the camera cam frame 40. The first projections 101, the second projections 102, the third rectilinear grooves 49 and the first rectilinear grooves 47 allow the first rectilinear frame 100 to move in the Y-axis direction with respect to the camera cam frame 40 without rotating.

The first rectilinear grooves 107 and the second rectilinear grooves 108 extend in the Y-axis direction and are formed on the inner peripheral face of the first rectilinear frame body 109. The second rectilinear pins 64 of the first lens frame 60 are inserted in the first rectilinear grooves 107, and the first rectilinear pins 63 of the first lens frame 60 are inserted in the second rectilinear grooves 108. The first rectilinear grooves 107, the second rectilinear grooves 108, the first rectilinear pins 63 and the second rectilinear pins 64 allow the first lens frame 60 to move in the Y-axis direction with respect to the first rectilinear frame 100 without rotating.

The rotary groove 105 is an annular groove arranged on the inner peripheral face of the first rectilinear frame 100. The rotary groove 105 accepts insertion of the rotary projections 75 of the rotary cam frame 70. The rotary groove 105 and the rotary projections 75 allow the rotary cam frame 70 to move integrally in the Y-axis direction and to rotate with respect to the first rectilinear frame 100.

Figure 37:
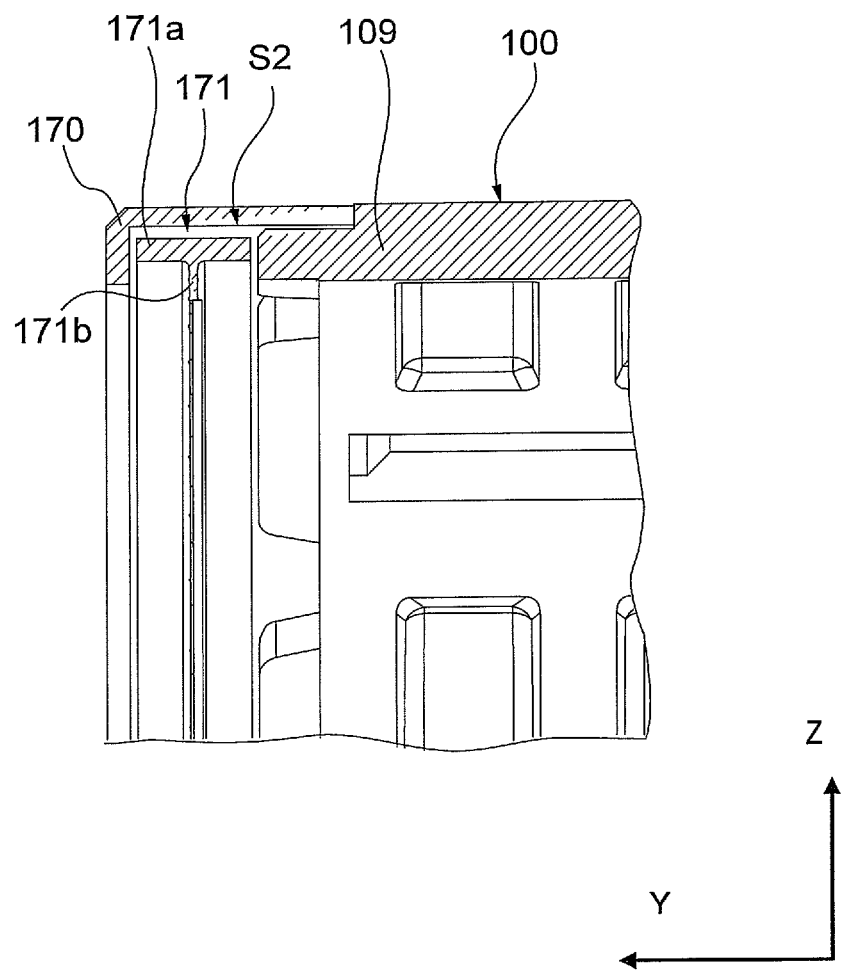
FIG. 37 is a cross section of the area around a light blocking ring.
Figures 38A, 38B:
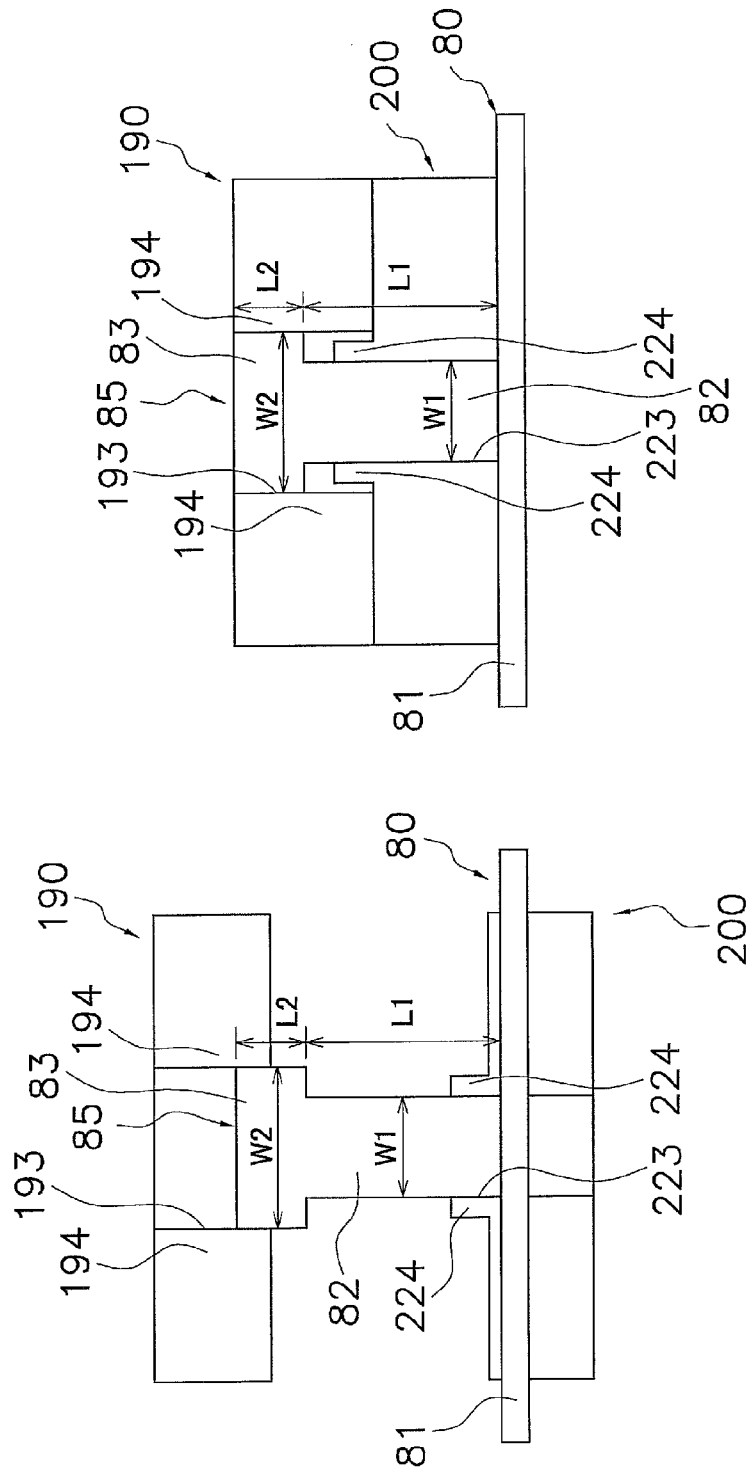
FIGS. 38A and 38B are side views of a second lens frame, a second rectilinear frame, and a third lens frame in another embodiment.

Also, as shown in FIG. 37, a space S2 is maintained between the cosmetic ring 170 and the first rectilinear frame body 109 in the Y-axis direction, and a light blocking ring 171 is disposed in this space S2. The light blocking ring 171 has a cylindrical part 171a and a sliding portion 171b that protrudes inwardly in the radial direction from the cylindrical part 171a.

The cylindrical part 171a is formed thicker than the sliding portion 171b. The sliding portion 171b is arranged to slide with the cosmetic ring 180 and disposed in the center of the cylindrical part 171a in the Y-axis direction. Since the sliding portion 171b is disposed in the center of the cylindrical part 171a, even if the sliding portion 171b deforms in the Y-axis direction, the cosmetic ring 170 and the first rectilinear frame body 109 will not come into contact.

A gap is maintained between the cylindrical part 171a and the cosmetic ring 170 in the radial direction. The length of the cylindrical part 171a in the Y-axis direction is shorter than the distance between the cosmetic ring 170 and the first rectilinear frame body 109 in the Y-axis direction. Therefore, the light blocking ring 171 can freely move between the cosmetic ring 170 and the first rectilinear frame body 109. This eliminates the need to fix the light blocking ring 171 to the first rectilinear frame body 109 or the cosmetic ring 170, so bonding space is reduced and the bonding step can also be cut back.

3.8: Second Rectilinear Frame

Figure 26:
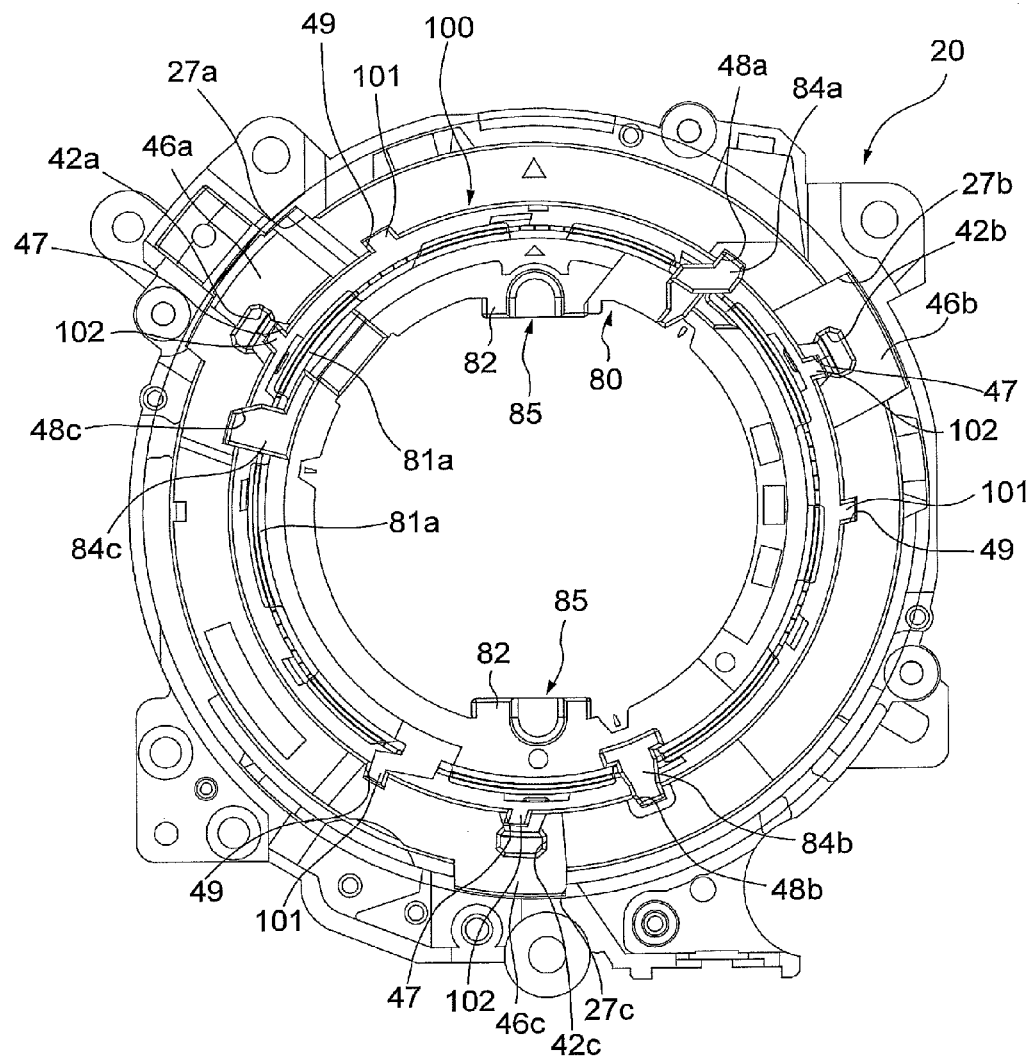
FIG. 26 is a plan view of a fixed frame, a camera cam frame, a first rectilinear frame, and a second rectilinear frame.

As shown in FIGS. 25 to 27, the second rectilinear frame 80 is a member for preventing the second lens frame 190 and the third lens frame 200 from rotating with respect to the fixed frame 20. The second rectilinear frame 80 is disposed on the inner peripheral side of the drive frame 30. More specifically, the second rectilinear frame 80 has an annular second rectilinear frame body 81, a plurality of rotary projections 81a (see FIGS. 7 to 10), three rectilinear pins 84a, 84b, and 84c formed on the outer peripheral part of the second rectilinear frame body 81 and a pair of support plates 85 (an example of a first support portion and second support portion) extending towards the Y-axis direction positive side from the inner peripheral part of the second rectilinear frame body 81.

The second rectilinear frame body 81 is housed in the flange 77 of the rotary cam frame 70 and attached to the flange 77 to be movable integrally in the Y-axis direction with respect to the flange 77. More specifically, the plurality of rotary projections 81a is inserted in the circumferential direction between the flange body 77a and the stopper 77c of the flange 77. As a result, the second rectilinear frame 80 is rotatable with respect to the rotary cam frame 70 and moves integrally with the rotary cam frame 70 in the Y-axis direction. Also, the inside diameter of the second rectilinear frame body 81 is set to be large enough for the base frame 220 to pass through.

The rectilinear pins 84 to 84c are guided by fourth rectilinear grooves 48a to 48c formed on the inner peripheral side of the camera cam frame 40. Accordingly, the second rectilinear frame 80 is movably supported by the camera cam frame 40 in the Y-axis direction without rotating and with respect to the camera cam frame 40. As discussed above, the camera cam frame 40 does not rotate with respect to the fixed frame 20. Specifically, the camera cam frame 40 allows the second rectilinear frame 80 to move in the Y-axis direction without rotating and with respect to the fixed frame 20. Since the rotary cam frame 70 rotates along with the drive frame 30 with respect to the fixed frame 20, the second rectilinear frame 80 moves integrally with the rotary cam frame 70 in the Y-axis direction while rotating with respect to the rotary cam frame 70.

The pair of support plates 85 are a plate-like portion protruding towards the Y-axis direction positive side from the inner peripheral part of the second rectilinear frame body 81 (more precisely, the inner peripheral edge of the second rectilinear frame body 81). The pair of support plates 85 movably supports the base frame 220 of the third lens frame 200 and the second lens frame 190e in the Y-axis direction. Each of the support plates 85 are disposed opposite to each other with the optical axis A therein between. The second lens frame 190 and the base frame 220 are sandwiched in between the pair of support plates 85. The pair of support plates 85 also protrude inwardly in the radial direction from the inner peripheral edge of the second rectilinear frame body 81 (see FIG. 26).

The pair of support plates 85 is inserted in rectilinear guide grooves 193 (an example of a first rectilinear guide groove and second rectilinear guide groove) of the second lens frame 190 and rectilinear guide grooves 223 (an example of a third rectilinear guide groove and fourth rectilinear guide groove) of the base frame 220. More precisely, the support plates 85 have first plates 82 (an example of a first portion and second portion) that are inserted in the rectilinear guide grooves 223 and second plates 83 (an example of a third portion and fourth portion) that are inserted in the rectilinear guide grooves 193. The first plates 82 are the base portions of the support plates 85 and extend toward the Y-axis direction positive side from the second rectilinear frame body 81. The second plates 83 extend toward the Y-axis direction positive side from the ends of the first plates 82.

The width of the second plates 83 is different from the width of the first plates 82 in the circumferential direction. More specifically, as shown in FIG. 27, the width W1 of the first plates 82 is greater than the width W2 of the second plates 83 in the circumferential direction. The length L2 of the second plate 83 in the Y-axis direction is greater than the length L1 of the first plate 82 in the Y-axis direction. Further, the thickness of the second plates 83 (the size in the radial direction) is greater than the thickness of the first plates 82 (the size in the radial direction).

Figures 27A, 27B:
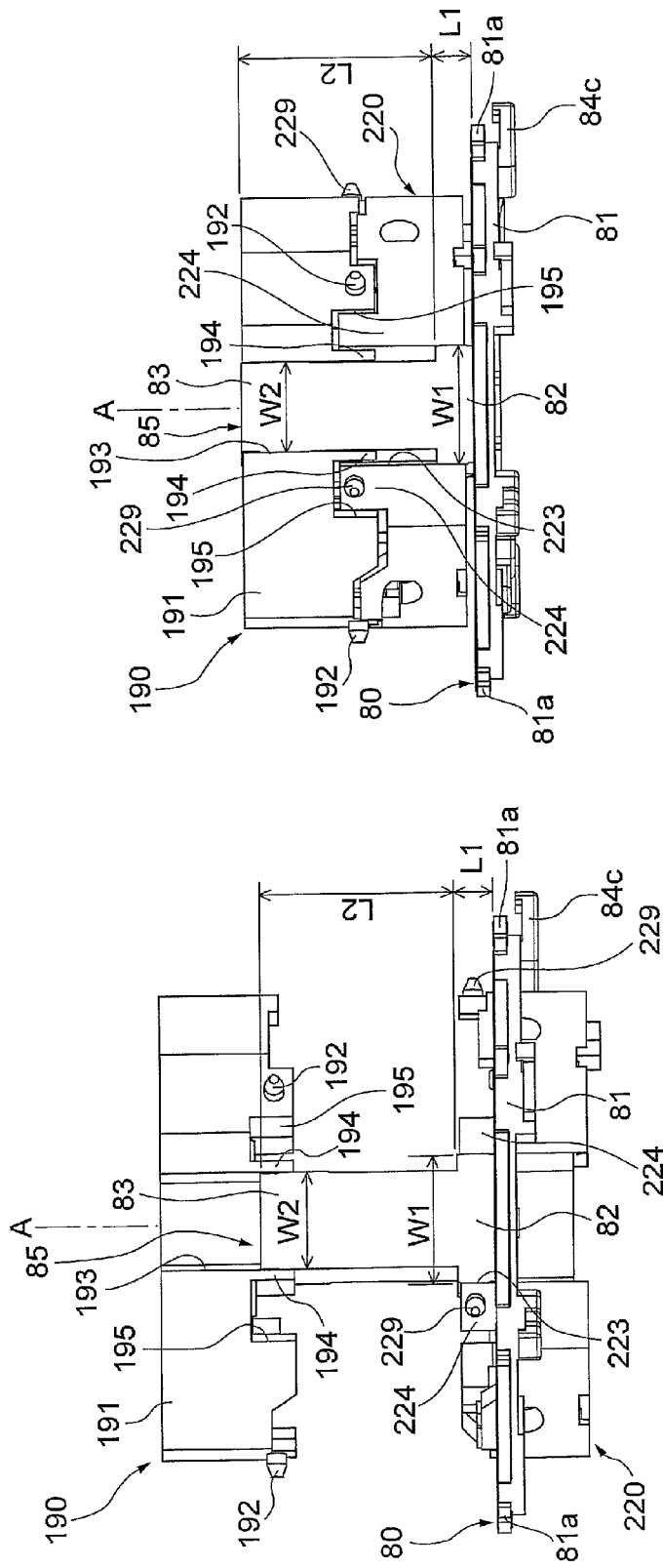
FIGS. 27A and 27B are side views of a second lens frame, a second rectilinear frame, and a third lens frame.

Also, part of the second lens frame 190 can be inserted in the rectilinear guide grooves 223 in a state in which the second lens frame 190 and the third lens frame 200 are closest in the optical axis direction. More specifically, the second lens frame 190 has a pair of guide portions 194 (an example of a first sliding portion and second sliding portion) disposed on both sides of the second plates 83 in the circumferential direction. The pair of guide portions 194 forms the rectilinear guide grooves 193 and are arranged on the respective rectilinear guide grooves 193. The third lens frame 200 has a pair of guide portions 224 (an example of a third sliding portion and fourth sliding portion) disposed on both sides of the first plates 82 in the circumferential direction. The pair of guide portions 224 is disposed to form the rectilinear guide groove 223. As shown in FIG. 27, the guide portions 194 are inserted in the rectilinear guide grooves 223 in a state in which the second lens frame 190 and the third lens frame 200 are closest in the optical axis direction. At this point, the guide portions 224 are inserted in a pair of concave portions 195 formed to the side of the pair of guide portions 194. As shown in FIGS. 27A and 27B, the cam pins 229 are arranged on the guide portions 224, and the cam pins 192 are disposed at the side of the concave portions 195. As shown in FIG. 27B, the cam pins 192 and the cam pins 229 are disposed at substantially the same positions in the Y-axis direction in a state in which the second lens frame 190 and the third lens frame 200 are closest in the optical axis direction, i.e. a state in which the cam pins 192 and the cam pins 229 are disposed at the retracted position Pr3 and the retracted position Pr4. (See FIG. 20B).

With this constitution, the second lens frame 190 and the base frame 220 are guided by the support plates 85 of the second rectilinear frame 80 in the Y-axis direction. Since the rotation of the second rectilinear frame 80 with respect to the camera cam frame 40 is limited by the three rectilinear pins 84a to 84c, the second lens frame 190 and the third lens frame 200 are movable in the Y-axis direction without rotating with respect to the camera cam frame 40 and the fixed frame 20.

3.9: Second Lens Frame

The second lens frame 190 is arranged to support the second lens group G2 movably in the Y-axis direction, and is disposed on the inner peripheral side of the second rectilinear frame 80. More specifically, as shown in FIG. 7, the second lens frame 190 has a second lens frame body 191 that supports the second lens group G2, three cam pins 192 arranged on the outer peripheral side of the second lens frame body 191 and a pair of rectilinear guide grooves 193 formed on the outer peripheral part of the second lens frame body 191. The cam pins 192 are fitted into the third cam grooves 74a of the rotary cam frame 70.

The rectilinear guide grooves 193 extend in the Y-axis direction and are disposed at positions corresponding to the support plates 85 of the second rectilinear frame 80. The pair of rectilinear guide grooves 193 is disposed sandwiching the second lens group G2. One of the rectilinear guide grooves 193 is disposed on the opposite side of the second lens group G2 from the other rectilinear guide groove 193.

The width of the rectilinear guide grooves 193 in the circumferential direction is substantially the same as the width W2 of the second plates 83 of the support plates 85. As mentioned above, the rectilinear guide grooves 193 are formed by the pair of guide portions 194. The pair of guide portions 194 is disposed spaced apart in the circumferential direction. The rectilinear guide grooves 193 are formed between the pair of guide portions 194. The second plates 83 is sandwiched in between the pair of guide portions 194 in the circumferential direction. The pair of guide portions 194 is slidable with the second plates 83.

Also, the concave portions 195 are formed on both sides of the pair of guide portions 194. The guide portions 224 (discussed below) of the third lens frame 200 can be inserted in the concave portions 195 in a state in which the second lens frame 190 and the base frame 220 are closest in the Y-axis direction.

With the above constitution, the second lens frame 190 is movable in the Y-axis direction according to the shape of the third cam grooves 74a without rotating with respect to the fixed frame 20.

3.10: Third Lens Frame

The third lens frame 200 constitutes a shake compensation device for suppressing movement of the optical image with respect to the CCD image sensor 141 caused by movement of the housing 2. The third lens frame 200 is disposed on the inner peripheral side of the second rectilinear frame 80. The third lens frame 200 is movable as a whole in the Y-axis direction with respect to the fixed frame 20 and movably supports the third lens group G3 in a plane perpendicular to the optical axis. More specifically, as shown in FIGS. 7, 28A, 28B, 29A, and 29B, the third lens frame 200 has the base frame 220 and a correcting lens frame 210 that supports the third lens group G3.

The base frame 220 has a base frame body 221, three cam pins 229 arranged on the outer peripheral part of the base frame body 221, a pair of rectilinear guide grooves 223, a rotary shaft 222, a limiting shaft 225, a first support shaft 226 and a second support shaft 227. The cam pins 229 are fitted into the fourth cam grooves 74b of the rotary cam frame 70.

The rectilinear guide grooves 223 extend in the Y-axis direction and are disposed at positions corresponding to the support plates 85 of the second rectilinear frame 80. The pair of rectilinear guide grooves 223 is disposed sandwiching the second lens group G2. One of the rectilinear guide grooves 223 is disposed on the opposite side of the second lens group G2 from the other rectilinear guide groove 223.

The width of the rectilinear guide grooves 223 in the circumferential direction is substantially the same as the width W1 of the first plates 82 of the support plates 85. As mentioned above, the rectilinear guide grooves 223 are formed by the pair of guide portions 224. The pair of guide portions 224 is disposed spaced apart in the circumferential direction, and the rectilinear guide grooves 223 are formed between the pair of guide portions 224. The first plates 82 is sandwich in between the pair of guide portions 224 in the circumferential direction, and the pair of guide portions 224 is slidable with the first plates 82. One of the three cam pins 229 is arranged on the guide portions 224 (see FIG. 27A).

The rotary shaft 222, the limiting shaft 225, the first support shaft 226, and the second support shaft 227 are fixed to the base frame body 221. The rotary shaft 222 rotatably supports the correcting lens frame 210 around a rotational axis B. The limiting shaft 225 protrudes from the base frame 220 and limits the range of movement of the correcting lens frame 210 in a direction perpendicular to the optical axis and with respect to the base frame 220.

The first support shaft 226 and the second support shaft 227 movably support the correcting lens frame 210 in a plane perpendicular to the optical axis A. Both ends of the first support shaft 226 are fixed to the base frame body 221. The second support shaft 227 is shorter than the first support shaft 226. One end of the second support shaft 227 is fixed to the base frame body 221.

The correcting lens frame 210 is movably supported by the base frame 220 in the pitch direction (an example of a first direction; the X axis direction) and the yaw direction (an example of a second direction; the Z-axis direction). More specifically, the correcting lens frame 210 has a support frame body 211, a pair of guide portions 212, a limiter 215, a pair of first guide members 216 and a second guide member 217.

The pair of guide portions 212 protrudes from the base frame body 221 to the X-axis direction positive side and is disposed spaced apart in the Z-axis direction. The rotary shaft 222 is inserted between the pair of guide portions 212. The guide portions 212 and the rotary shaft 222 allow the correcting lens frame 210 to move in the X-axis direction and to rotate around a center line B with respect to the base frame 220.

The limiter 215 is disposed on the opposite side of the support frame body 211 from the guide portions 212 and protrudes from the support frame body 211 towards the X-axis direction negative side. The limiter 215 is an annular member, and the limiting shaft 225 is inserted in the limiter 215. The limiter 215 and the limiting shaft 225 determine the movable range of the correcting lens frame 210 with respect to the base frame 220.

As shown in FIGS. 29A and 29B, the pair of first guide members 216 slides with the first support shaft 226 and accepts insertion of the first support shaft 226. The first guide members 216 and the first support shaft 226 limit the movement of the correcting lens frame 210 in the Y-axis direction with respect to the base frame 220.

The second guide member 217 slides with the second support shaft 227, and the second support shaft 227 is inserted in the second guide member 217. The second guide member 217 and the second support shaft 227 limit the movement of the correcting lens frame 210 in the Y-axis direction with respect to the base frame 220.

Also, a pitch direction drive coil 233, a yaw direction drive coil 234, a pitch direction position sensor 231 and a yaw direction position sensor 232 are arranged on the base frame 220.

Furthermore, a pitch yoke 237, a yaw yoke 238, a pitch magnet 235 and a yaw magnet 236 are arranged on the correcting lens frame 210. The pitch yoke 237 is fixed to the base frame 220, and the pitch magnet 235 is fixed to the pitch yoke 237. The yaw yoke 238 is fixed to the base frame 220, and the yaw magnet 236 is fixed to the yaw yoke 238.

The pitch yoke 237 and the pitch magnet 235 are disposed opposite to the pitch direction drive coil 233 in the Y-axis direction. The yaw magnet 236 and the yaw yoke 238 are disposed opposite to the yaw direction drive coil 234 in the Y-axis direction. The pitch direction drive coil 233, along with the pitch magnet 235 and the pitch yoke 237, constitutes a first drive unit 241 that produces a drive force in the pitch direction. The yaw direction drive coil 234, along with the yaw magnet 236 and the yaw yoke 238, constitutes a second drive unit 242 that produces a drive force in the yaw direction.

Figures 28A, 28B:
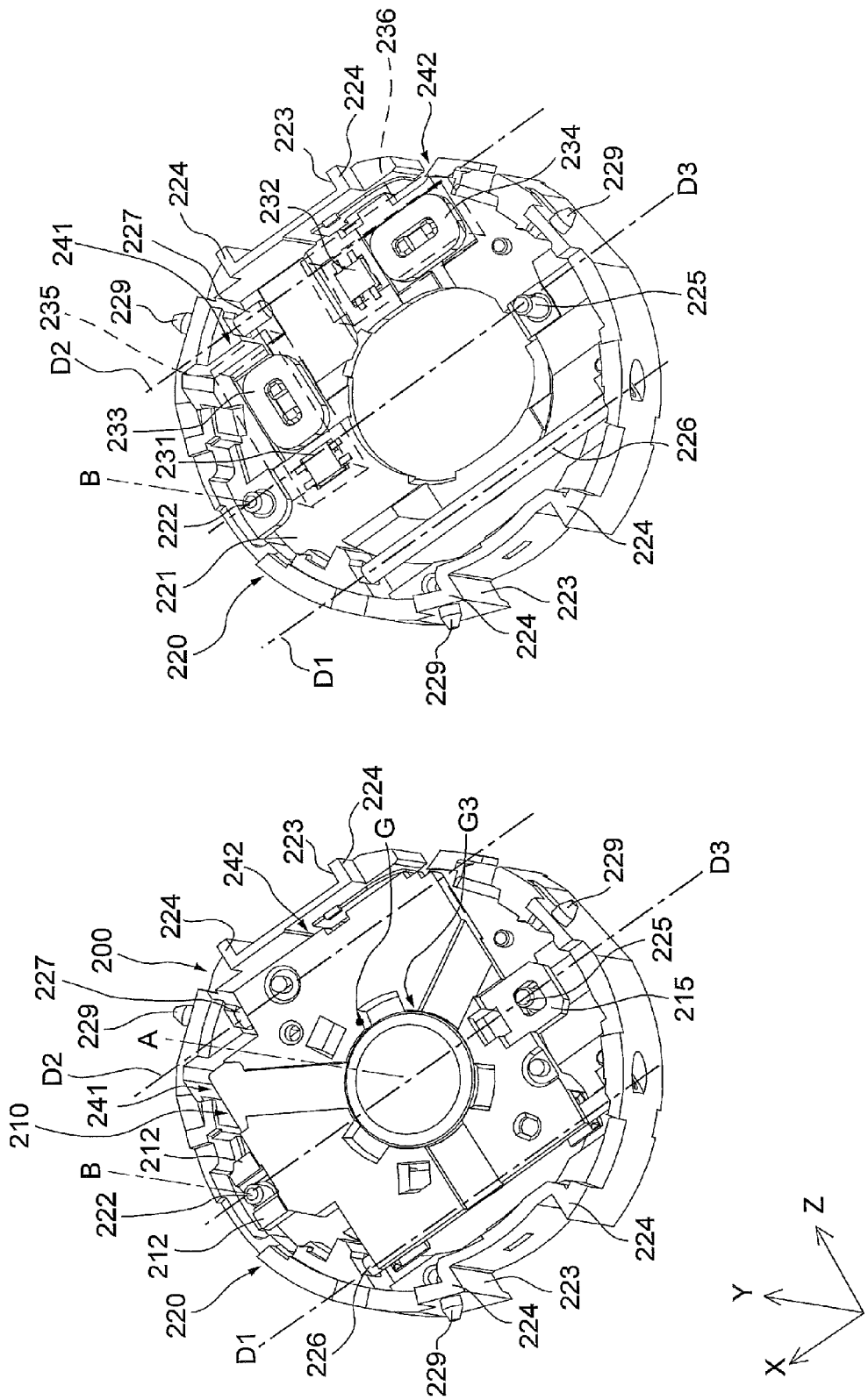
FIG. 28A is an oblique view of a third lens frame.
FIG. 28B is an oblique view of a third lens frame in which the correcting lens frame is omitted.

The features of how the various components are disposed will now be explained. As shown in FIG. 28B, the first support shaft 226 has a first center line D1, and the first center line D1 is disposed parallel to the X-axis. The second support shaft 227 has a second center line D2, and the second center line D2 is disposed parallel to the X-axis. When viewed from a direction parallel to the Y-axis direction, the rotary shaft 222 and the limiting shaft 225 are disposed between the first center line D1 and the second center line D2. When viewed from a direction parallel to the optical axis, the rotary shaft 222 and the limiting shaft 225 are disposed between the first center line of the first support shaft 226 and the second center line of the second support shaft 227. When viewed from a direction parallel to the Y-axis direction, a reference line segment D3 intersects the center of the rotary shaft 222 and the center of the limiting shaft 225 and is perpendicular to the Y-axis direction is parallel to the first center line D1 and the second center line D2. When viewed from a direction parallel to the optical axis, the reference line segment D3 does not overlap the first center line D1 or the second center line D2.

Figure 30:
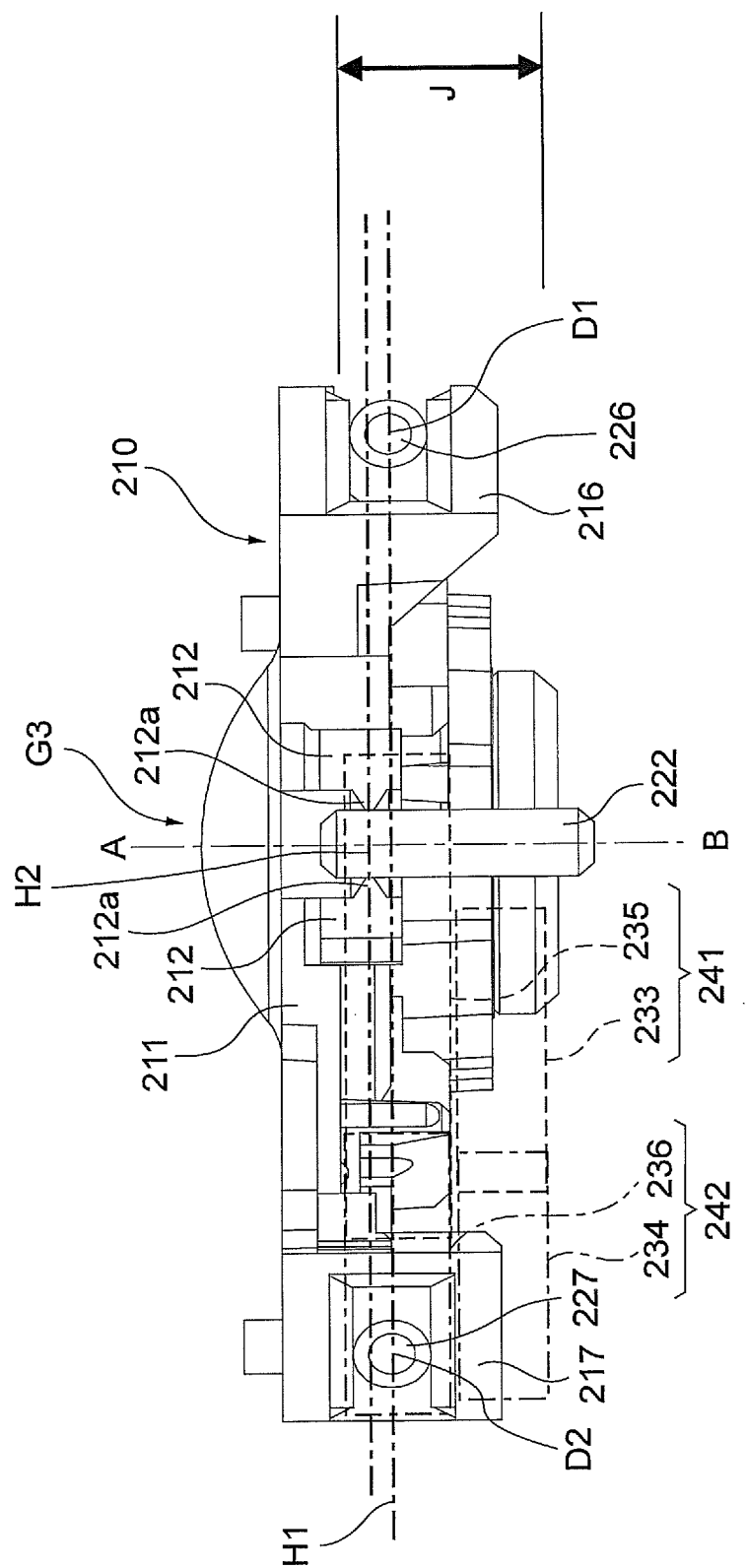
FIG. 30 is a side view of a correcting lens frame.

The rotary shaft 222, the limiting shaft 225, the first support shaft 226 and the second support shaft 227 are disposed at mutually different positions, i.e. positions that do not overlap each other, when viewed from a direction parallel to the Y-axis direction. The rotary shaft 222, the limiting shaft 225, the first support shaft 226 and the second support shaft 227 are disposed at different positions, i.e. positions that do not overlap each other, from those of the first drive unit 241 and the second drive unit 242. As shown in FIG. 30, the result of this configuration is that the first support shaft 226 and the second support shaft 227 positioned within a region J where the first drive unit 241 and the second drive unit 242 are disposed. The region J extends in the direction of the optical axis. Furthermore, a plane H1 that includes the first center line D1 and the second center line D2 is disposed near a sliding position H2 between the rotary shaft 222 and the sliding portions 212a of the guide portions 212. Because of the above, the overall size of the third lens frame 200 in the Y-axis direction can be smaller, i.e. the shake compensation device can be made thinner.

As shown in FIG. 28A, the combined center of gravity G of the third lens group G3, the correcting lens frame 210 and the portion driven by the first drive unit 241 and the second drive unit 242 is disposed between the first center line of the first support shaft 226 and the second center line of the second support shaft 227 when viewed from a direction parallel to the optical axis. The "portion driven by the first drive unit 241 and the second drive unit 242" referred to herein above means the assembly made up of the third lens group G3, the correcting lens frame 210, the pitch magnet 235, the yaw magnet 236, the pitch yoke 237 and the yaw yoke 238. This layout stabilizes the third lens group G3 when being driven.

3.11: Fourth Lens Frame

As shown in FIG. 7, the fourth lens frame 90 is arranged to support the fourth lens group G4 movably in the Y-axis direction, and is supported movably in the Y-axis direction by three shafts 14a, 14b, and 14c formed on the master flange 10. The fourth lens frame 90 is driven by a focus motor 120 fixed to the master flange 10. When the fourth lens frame 90 is driven by the focus motor 120, the fourth lens frame 90 moves in the Y-axis direction with respect to the master flange 10. This allows the focus to be adjusted in the optical system O.

3.11: Shutter Unit

The shutter unit 95 is a mechanism for adjusting the exposure state. The shutter unit 95 is disposed between the second lens frame 190 and the third lens frame 200. The shutter unit 95 is fixed to the base frame 220 of the third lens frame 200 and is movable along with the third lens frame 200 in the Y-axis direction with respect to the fixed frame 20.

3.12: Imaging Element Unit

As shown in FIGS. 31 to 33C, an imaging element unit 140 has the master flange 10, an IR absorbent glass 135 (an example of an optical element), the CCD image sensor 141, a light blocking sheet 130, a CCD sheet metal 142 (an example of a plate), a CCD cover glass 143 and the connection terminals 18 and 19.

The master flange 10 is fixed to the fixed frame 20 and disposed on the Y-axis direction negative side of the fixed frame 20. A rectangular opening 12 is formed in the master flange 10. An optical image formed by the optical system O passes through the opening 12 and is formed on the light receiving face of the CCD image sensor 141.

The IR absorbent glass 135 is a rectangular sheet-form member that is smaller than the opening 12 and disposed within the opening 12. The IR absorbent glass 135 is subjected to light that passes through the opening 12 and onto infrared absorption processing (an example of optical processing). The CCD image sensor 141 converts light that has been transmitted by the IR absorbent glass 135 into an electrical signal.

The light blocking sheet 130 is a sheet-form member that is sandwiched between the CCD image sensor 141 and the IR absorbent glass 135. The light blocking sheet 130 has an annular bonded portion 131 (an example of a first light blocker) and an expanded part 132 (an example of a second light blocker) disposed to the outside of the bonded portion 131.

The bonded portion 131 is an annular member sandwiched between the IR absorbent glass 135 and the CCD image sensor 141 (more precisely, between the IR absorbent glass 135 and the CCD cover glass 143). The bonded portion 131 is adhesively fixed to the IR absorbent glass 135 and the CCD cover glass 143. An opening 131a in the bonded portion 131 is smaller than the contour of the IR absorbent glass 135 and the CCD cover glass 143.

The expanded part 132 is used to prevent dust from coming in and is formed larger than the contour of the opening 12. The expanded part 132 comes into contact with the master flange 10 and bends so as to come into contact with the master flange 10.

The master flange 10 has an inclined face 14 that is formed around the opening 12 and is inclined with respect to the light receiving face of the CCD image sensor 141. The entire surface of the expanded part 132 is in firm contact with the inclined face 14. The inclined face 14 is inclined so that there is a snug fit with the entire expanded part 132.

4: Operation of Digital Camera

The operation of the digital camera 1 will be described through reference to FIGS. 1 to 3.

4.1: When Power is Off

When the power switch 6 is switched to the off position, the lens barrel 3 is stopped in the retracted state, i.e. in the state shown in FIG. 8 in which the length of the lens barrel 3 in the Y-axis direction is shortest, so that the lens barrel 3 will fit within the external dimensions of the housing 2 in the Y-axis direction.

In this state, the lens barrier 50 of the lens barrel 3 is closed. More specifically, the opening lever 53 of the lens barrier 50 is pushed to the rotational direction R2 side by the projections 78 of the rotary cam frame 70. Accordingly, the barrier blades 52 of the lens barrier 50 are kept closed.

4.2: Operation When Power is On 4.2.1: Operation of Lens Barrel

When the power switch 6 is switched to the on position, power is supplied to the various components and the lens barrel 3 is driven from the retracted state to the imaging state. More specifically, the drive frame 30 is driven by the zoom motor 110 in the R1 direction by a specific angle with respect to the fixed frame 20. As a result, the drive frame 30 moves along the inclination grooves 23 to the Y-axis direction positive side with respect to the fixed frame 20 while rotating with respect to the fixed frame 20.

When the drive frame 30 moves in the Y-axis direction while rotating with respect to the fixed frame 20, the first rotary projections 43 and the second rotary projections 45 cause the camera cam frame 40 to move integrally with the drive frame 30 in the Y-axis direction. Here, since the rectilinear projections 46a to 46c of the camera cam frame 40 are guided in the Y-axis direction by the rectilinear grooves 27a to 27c of the fixed frame 20, the camera cam frame 40 moves integrally with the drive frame 30 in the Y-axis direction without rotating with respect to the fixed frame 20 (see FIGS. 13A and 13B).

Figure 14B:
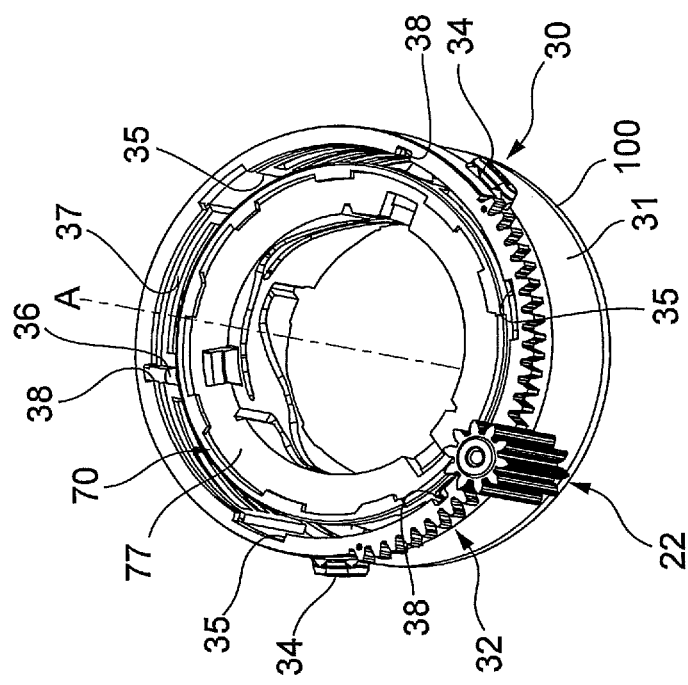
FIGS. 14A and 14B are oblique views of a drive frame.
Figure 14A:
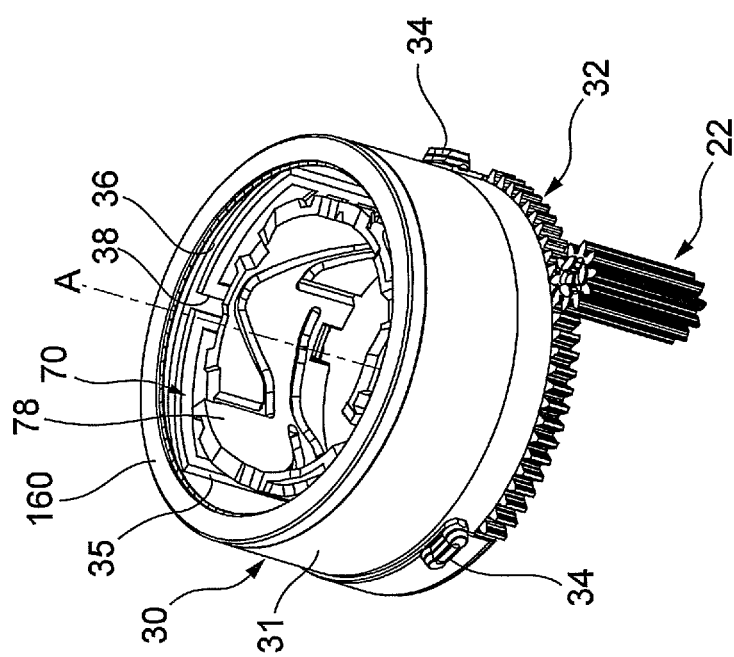

As shown in FIG. 14B, the distal ends of the cam pins 76 of the rotary cam frame 70 are fitted into the straight grooves 38 of the drive frame 30, and the rotary cam frame 70 rotates along with the drive frame 30 with respect to the fixed frame 20. As a result, the rotary cam frame 70 and the camera cam frame 40 rotate relative to each other. Since the cam pins 76 of the rotary cam frame 70 pass through the cam through-grooves 42 of the camera cam frame 40, the rotary cam frame 70 moves in the Y-axis direction while rotating with respect to the fixed frame 20 and the camera cam frame 40, according to the shape of the cam through-grooves 42.

The second rectilinear frame 80 is arranged to be rotatable with respect to the rotary cam frame 70 and movable integrally in the Y-axis direction. The second rectilinear frame 80 is arranged to be movable in the Y-axis direction with respect to the camera cam frame 40 without rotating. With this constitution, when the rotary cam frame 70 moves in the Y-axis direction while rotating with respect to the fixed frame 20 and the camera cam frame 40, the second rectilinear frame 80 moves integrally with the rotary cam frame 70 in the Y-axis direction with respect to the fixed frame 20 and the camera cam frame 40 without rotating with respect to the fixed frame 20 and the camera cam frame 40.

When the rotary cam frame 70 moves in the Y-axis direction while rotating with respect to the fixed frame 20, this is accompanied by movement of the first lens frame 60 in the Y-axis direction. More specifically, the rotary projections 75 of the rotary cam frame 70 are inserted in the rotary groove 105 of the first rectilinear frame 100, and the first projections 101 and second projections 102 of the first rectilinear frame 100 are inserted in the third rectilinear grooves 49 and the first rectilinear grooves 47 of the camera cam frame 40. With this arrangement, when the rotary cam frame 70 moves in the Y-axis direction while rotating with respect to the fixed frame 20, the first rectilinear frame 100 moves integrally with the rotary cam frame 70 in the Y-axis direction without rotating with respect to the camera cam frame 40 and the fixed frame 20.

Furthermore, when the rotary cam frame 70 rotates with respect to the fixed frame 20, the first cam pins 68 of the first lens frame 60 are guided in the Y-axis direction by the first cam grooves 72 of the rotary cam frame 70. Accordingly, the first lens frame 60 moves in the Y-axis direction with respect to the rotary cam frame 70 and the first rectilinear frame 100. Here, since the first rectilinear pins 63 and second rectilinear pins 64 of the first lens frame 60 are inserted respectively in the second rectilinear grooves 108 and first rectilinear grooves 107 of the first rectilinear frame 100, the first lens frame 60 moves in the Y-axis direction without rotating with respect to the first rectilinear frame 100. Therefore, the first lens frame 60 moves in the Y-axis direction without rotating with respect to the fixed frame 20 (while rotating with respect to the rotary cam frame 70). Since a gap is formed between the second cam pins 69 and the second cam grooves 73, the second cam pins 69 move through the second cam grooves 73 without touching the second cam grooves 73.

The cam pins 192 of the second lens frame 190 are fitted into the third cam grooves 74a of the rotary cam frame 70. The cam pins 229 of the third lens frame 200 are fitted into the fourth cam grooves 74b of the rotary cam frame 70. The rectilinear pins 84 of the second rectilinear frame 80 are fitted into the third rectilinear grooves 49 of the camera cam frame 40. Accordingly, the second rectilinear frame 80 is movable in the Y-axis direction without rotating with respect to the fixed frame 20 and the camera cam frame 40. With this arrangement, the second lens frame 190 and the third lens frame 200 rotate with respect to the rotary cam frame 70 without rotating with respect to the second rectilinear frame 80, the camera cam frame 40 and the fixed frame 20. Therefore, the second lens frame 190 moves in the Y-axis direction along the third cam grooves 74a, and the third lens frame 200 moves in the Y-axis direction along the fourth cam grooves 74b.

As discussed above, when a drive force is inputted to the drive frame 30 during retraction, the drive frame 30 moves in the Y-axis direction with respect to the fixed frame 20. This is accompanied by movement of the various members supported by the drive frame 30 in the Y-axis direction with respect to the fixed frame 20. When the drive frame 30 has rotated a specific angle, the rotation of the drive frame 30 stops and the first lens frame 60, the second lens frame 190 and the third lens frame 200 stop at the wide angle end. As a result of this operation, the lens barrel 3 is in the imaging state (as shown in FIG. 9) and imaging with the digital camera 1 is possible.

5.3: Zooming During Imaging 5.3.1: Operation on Telephoto Side

When the zoom adjusting lever 7 is moved to the telephoto side, the zoom motor 110 drives the drive frame 30 in the R1 direction with respect to the fixed frame 20 according to the rotational angle and operation duration of the zoom adjusting lever 7. As a result, the rotary cam frame 70 moves towards the Y-axis direction positive side with respect to the drive frame 30 while rotating along with the drive frame 30. Here, the drive frame 30 rotates with respect to the fixed frame 20, but does not move in the Y-axis direction with respect to the fixed frame 20.

Also, the first lens frame 60 mainly moves to the Y-axis direction positive side with respect to the rotary cam frame 70 while rotating with respect to the rotary cam frame 70 (without rotating with respect to the fixed frame 20 and the first rectilinear frame 100). Meanwhile, the second lens frame 190 mainly moves to the Y-axis direction negative side with respect to the rotary cam frame 70 while rotating with respect to the rotary cam frame 70 (without rotating with respect to the fixed frame 20). Furthermore, the third lens frame 200 mainly moves to the Y-axis direction positive side with respect to the rotary cam frame 70 while rotating with respect to the rotary cam frame 70 (without rotating with respect to the fixed frame 20). As a result of these operations, the zoom ratio of the optical system O gradually increases. When the lens barrel 3 reaches the telephoto end, the lens barrel 3 stops in the state shown in FIG. 10.

5.3.2: Operation on Wide Angle Side

When the zoom adjusting lever 7 is moved to the wide angle side, the drive frame 30 is driven by the zoom motor 110 in the R2 direction with respect to the fixed frame 20 according to the rotational angle and operation duration of the zoom adjusting lever 7. As a result, the rotary cam frame 70 moves to the Y-axis direction negative side with respect to the drive frame 30 while rotating along with the drive frame 30. The drive frame 30 here rotates with respect to the fixed frame 20, but does not move in the Y-axis direction.

The first lens frame 60 moves mainly to the Y-axis direction negative side with respect to the rotary cam frame 70 while rotating with respect to the rotary cam frame 70 (without rotating with respect to the fixed frame 20). Meanwhile, the second lens frame 190 moves mainly to the Y-axis direction positive side with respect to the rotary cam frame 70 while rotating with respect to the rotary cam frame 70 (without rotating with respect to the fixed frame 20). Furthermore, the third lens frame 200 moves mainly to the Y-axis direction negative side with respect to the rotary cam frame 70 while rotating with respect to the rotary cam frame 70 (without rotating with respect to the fixed frame 20). As a result of these operations, the zoom ratio of the optical system O gradually decreases. When the lens barrel 3 reaches the wide angle end, the lens barrel 3 stops in the state shown in FIG. 9.

6: Features

The features of the lens barrel 3 described above are compiled below.

6.1

With this lens barrel 3, when the first lens frame 60 is guided by the first cam pins 68 and the first cam grooves 72 in the Y-axis direction with respect to the rotary cam frame 70, the first lens frame 60 moves in the Y-axis direction while rotating with respect to the rotary cam frame 70. For example, in the retracted state, as shown in FIG. 17, the overall length of the first lens frame 60 and the rotary cam frame 70 is at its shortest, and the projections 78 of the rotary cam frame 70 are inserted in the first openings 67a of the first lens frame 60.

Accordingly, the gap in the optical axis direction between the rotary cam frame 70 and the first lens frame 60 can be reduced, the size of the lens barrel 3 in the Y-axis direction when stowed can be smaller and a more compact product can be obtained.

On the other hand, when the lens barrel 3 is subjected to a strong external force, there is possibility that the first lens frame 60 and the rotary cam frame 70 are damaged. However, since the second cam pins 69 of the first lens frame 60 are inserted via a gap into the second cam grooves 73 of the rotary cam frame 70, if the lens barrel 3 is subjected to an external force and the rotary cam frame 70 or the first lens frame 60 is elastically deformed, the second cam pins 69 will come into contact with the walls of the second cam grooves 73. As a result, the external force exerted on the lens barrel 3 can be distributed not only to the first cam pins 68 and the first cam grooves 72 but also to the second cam pins 69 and the second cam grooves 73, which prevents damage to the first cam pins 68, etc., or prevents the first cam pins 68 and second cam pins 69 from falling out of the first cam grooves 72 and second cam grooves 73 of the rotary cam frame 70.

In particular, since the ends of the second cam grooves 73 on the projections 78 side are disposed between two adjacent projections 78 in the circumferential direction, the size of the cut-out portions between the projections 78 is not limited by the second cam grooves 73. Accordingly, the size of the projections 78 can be made larger in the optical axis direction, and the overall length of the first lens frame 60 and the rotary cam frame 70 in the retracted state can be shortened.

Meanwhile, at the portions that are cut-out between the projections 78, the second cam grooves 73 are open on the protruding side. The second cam pins 69 are located at the cut-out portions of the second cam grooves 73 when the first lens frame 60 is all the way on the subject side (the telephoto position) with respect to the rotary cam frame 70. If a force on the Y-axis direction negative side should be exerted on the lens barrel 3 in this state, the second cam pins 69 and the second cam grooves 73 will come into contact, thereby preventing damage to the members or preventing the first cam pins 68 and the second cam pins 69 from falling out of the first cam grooves 72 and second cam grooves 73 of the rotary cam frame 70.

Thus, with lens barrel 3, damage to members of the lens barrel 3 and the falling out of the cam pins can be prevented while achieving an even smaller size.

With a constitution in which the first lens group G1 is disposed on the Y-axis direction positive side of the first lens frame body 61, the projections 78 may be disposed on the Y-axis direction negative side of the cam frame body 71. The effect obtained in this case is the same as that above.

6.2

As shown in FIG. 20A, for example, since the first contact portions 73c of the rotary cam frame 70 form the edges of the second cam grooves 73 and are disposed opposite to the second cam pins 69 via an oblique gap K1 that forms a space obliquely along the Y-axis direction, if the lens barrel 3 is subjected to a strong force and one or both of the first lens frame 60 and the rotary cam frame 70 undergo elastic deformation, the second cam pins 69 will come into contact with the first contact portions 73c. As a result, the impact in the Y-axis direction will be borne by the second cam pins 69 and the first contact portions 73c in addition to the first cam pins 68 and the first cam grooves 72. Accordingly, even if the lens barrel 3 is subjected to a strong force, the force can be dispersed to the first cam pins 68 and the second cam pins 69, preventing damage to the lens barrel 3.

In particular, since the overall length of the lens barrel 3 is greatest at the telephoto end, when a strong force is exerted on the lens barrel 3 when the lens barrel 3 is in the telephoto state, the impact to which the first cam pins 68 are subjected (and especially the force in the Y-axis direction) is also greater.

Nevertheless, as mentioned above, since the first contact portions 73c are disposed opposite the second cam pins 69 in the Y-axis direction when the lens is at the telephoto end, damage to the lens barrel 3 can be prevented in the telephoto state when the impact is expected to be greatest, at least during a fall.

6.3

As shown in FIG. 24, since the first cam pins 68 and the first cam grooves 72 have a tapered shape, when an external force is exerted in the Y-axis direction between the first lens frame 60 and the rotary cam frame 70, at least some of the external force is converted by the first cam pins 68 and the first cam grooves 72 into a force that attempts to separate the first lens frame 60 from the rotary cam frame 70 in the radial direction. As a result, at least one of the first lens frame 60 and the rotary cam frame 70 undergoes elastic deformation in the radial direction (see FIG. 23).

Meanwhile, since the second cam pins 69 and first contact portions 73c also have a tapered shape, when the elastic deformation of the first lens frame 60 and the rotary cam frame 70 presses the second cam pins 69 against the first contact portions 73c, at least part of this pressing force is converted into a force that attempts to separate the first lens frame 60 form the rotary cam frame 70 in the radial direction. That is, just as with the first cam pins 68 and the first cam grooves 72, one or both of the first lens frame 60 and the rotary cam frame 70 undergo elastic deformation in the radial direction.

Consequently, when the area around the first cam pins 68 of the first lens frame 60 attempts to deform elastically in the radial direction, the area around the second cam pins 69 of the first lens frame 60 attempts to deform elastically in the radial direction at the same time, and as a result a force acts in the radial direction substantially uniformly on the first lens frame 60 and the rotary cam frame 70. Accordingly, even if a strong force acts on the lens barrel 3, the first lens frame 60 and the rotary cam frame 70 will undergo less uneven deformation, and damage to the lens barrel 3 can be effectively prevented.

In particular, since the second cam pins 69 are disposed between two adjacent first cam pins 68 in the circumferential direction, the positions of the first cam pins 68 and the second cam pins 69 in the Y-axis direction are substantially the same, and elastic deformation of the first lens frame 60 and the rotary cam frame 70 in the radial direction can be made more uniform.

The second cam pins 69 are to be disposed at substantially the same positions as the first cam pins 68 in the Y-axis direction, but as long as the same effect is obtained, the second cam pins 69 may be offset slightly in the Y-axis direction from the first cam pins 68.

Since the second cam pins 69 and the second cam grooves 73 perform a complementary role with the first cam pins 68 and the first cam grooves 72, at least one each of the second cam pins 69 and the second cam grooves 73 is to be provided.

6.4

Furthermore, since the first lens frame 60 has the second contact portions 73d disposed opposite the second cam pins 69 via a radial gap that forms a space in the radial direction of the cam frame, even if one or both of the first lens frame 60 and the rotary cam frame 70 undergo elastic deformation in the radial direction due to impact from falling, displacement in the radial direction via the second cam pins 69 can be received by the second contact portions 73d. Accordingly, the first lens frame 60 and the rotary cam frame 70 will not be deformed as much in the radial direction, and damage to the lens barrel 3 can be prevented. When the lens barrel 3 is in the telephoto state, the second contact portions 73d are arranged at positions opposite the second cam pins 69 via the radial gap formed in the radial direction of the cam frame, so the same effect can be obtained when there is a fall with the lens barrel 3 in the telephoto state.

6.5

With this lens barrel 3, since the second cam pins 69 are inserted in the second cam grooves 73, even if the first lens frame body 61 and the cam frame body 71 are disposed close together in the radial direction, the second cam pins 69 will not interfere with the cam frame body 71 when the first lens frame 60 and the rotary cam frame 70 move relatively. In other words, with this configuration, an increase in the size of the lens barrel 3 due to the second cam pins 69 can be suppressed or prevented.

6.6

As shown in FIGS. 15 and 16B, since the cam pins 76 can be introduced into the cam through-grooves 42 via the insertion openings 42a to 42c of the camera cam frame 40, the fixed frame 20, the rotary cam frame 70, and the camera cam frame 40 are easier to assemble. Furthermore, since the insertion openings 42a to 42c are disposed at positions corresponding to the rectilinear projections 46a to 46c, a decrease in strength that would otherwise be caused by the insertion openings 42a to 42c can be prevented. That is, with this lens barrel 3, easy assembly can be ensured while preventing a decrease in strength. Also, because good strength is ensured, there is no need to increase the size of the camera cam frame 40 in the radial direction.

Also, the plurality of flanges 44 link the adjacent rectilinear projections 46a to 46c in the circumferential direction, and along with the rectilinear projections 46a to 46c form an annular portion protruding outward in the radial direction from the camera cam frame body 41. Therefore, compared to when just the rectilinear projections 46a to 46c are provided, the rectilinear projections 46a to 46c and the flanges 44 make the camera cam frame body 41 stronger, and the decrease in strength that would otherwise be caused by the insertion openings 42a to 42c can be prevented.

6.7

As shown in FIG. 34, when viewed in the Y-axis direction, the connection terminals 18 and 19 are disposed at different positions (positions that do not overlap) from those of the rectilinear projections 46a to 46c, so the connection terminals 18 and 19 do not overlap the rectilinear projections 46a to 46c in the optical axis direction. More specifically, if we look at imaginary lines Ca to Cc parallel to the Y-axis direction passing through the center of the insertion openings 42a to 42c, the connection terminals 18 and 19 are not disposed in the vicinity of the imaginary lines Ca to Cc of the master flange 10. This layout affords greater design latitude and allows a more compact lens barrel 3 than when the rectilinear projections 46a to 46c and the connection terminals 18 and 19 are disposed at the same positions.

In particular, the size reduction effect will be greater when the rectilinear projections 46a to 46c are thicker than the flanges 44 and they protrude farther to the Y-axis direction negative side (the master flange 10 side) than the flanges 44. Furthermore in this case, of the face of the master flange 10 on the camera cam frame 40 side, the portion corresponding to the rectilinear projections 46a to 46c when viewed in the Y-axis direction is preferably recessed to the Y-axis direction negative side. For example, the concave portions digital camera 17a and 17c shown in FIG. 31 correspond to this. When the lens barrel 3 has been retracted, part of the rectilinear protrusion 46a is stowed in the concave portion 17a, and part of the rectilinear protrusion 46c is stowed in the concave portion 17c. This configuration makes it even easier to reduce the size of the lens barrel 3.

6.8

As shown in FIG. 27, the support plates 85 protruding in the Y-axis direction from the second rectilinear frame body 81 are inserted in the rectilinear guide grooves 193 of the second lens frame 190 and the rectilinear guide grooves 223 of the third lens frame 200. Since the second lens frame 190 and the third lens frame 200 are thus supported by the pair of support plates 85, the region on the outer peripheral side of the second lens frame 190 and the third lens frame 200 can be utilized more effectively than when a cylindrical rectilinear frame is used. That is, a more compact lens barrel 3 can be obtained by using the second rectilinear frame 80 having the pair of support plates 85 so that the two lens frames are supported to be movable linearly.

In particular, since the width W1 of the first plates 82 in the circumferential direction is set larger than the width W2 of the second plates 83 in the circumferential direction, in a state in which the second lens frame 190 and the third lens frame 200 are closest in the optical axis direction, part of the second lens frame 190 (the pair of guide portions 194) can be inserted in the rectilinear guide grooves 223. With this configuration, a large movable range of the second lens frame 190 and the third lens frame 200 can be ensured while the overall length of the second lens frame 190 and the third lens frame 200 when stowed can be shortened, and greater design latitude is afforded for the optical system O while the size of the lens barrel 3 can be further reduced.

In addition to the relation between the widths W1 and W2, since the length L2 of the second plates 83 (which have a small width W2) in the optical axis direction is set longer than the length L1 of the first plates 82 (which have a large width W1), the movable range of the second lens frame 190 is less apt to be hindered by the wide first plates 82. The movable range of the third lens frame 200 guided by the wide first plates 82, however, is not limited by the second plates 83. That is, there is even greater latitude in the design of the optical system O.

Since the length L2 of the second plates 83 can be shortened, the overall length of the support plates 85 can be kept to the required minimum, and an even more compact lens barrel 3 can be obtained.

As shown in FIG. 39, another possible situation is when the width W2 of the second plates 83 in the circumferential direction is greater than the width W1 of the first plates 82 in the circumferential direction. In this case, part of the third lens frame 200 can be inserted in the rectilinear guide grooves 193 in a state in which the second lens frame 190 and the third lens frame 200 are closest in the optical axis direction. Furthermore, the length L1 of the first plates 82 (which have a small width W1) in the Y-axis direction is preferably greater than the length L2 of the second plates 83 (which have a large width W2) in the Y-axis direction. Again with this configuration, the same effect is obtained as with the above embodiment.

Also, the pair of support plates 85 have the same shape, but the shapes of the support plates 85 may instead be different. Similarly, the shapes of the rectilinear guide grooves 193 may be different from each other, and the shapes of the rectilinear guide grooves 223 may be different from each other.

6.9

Figure 31:
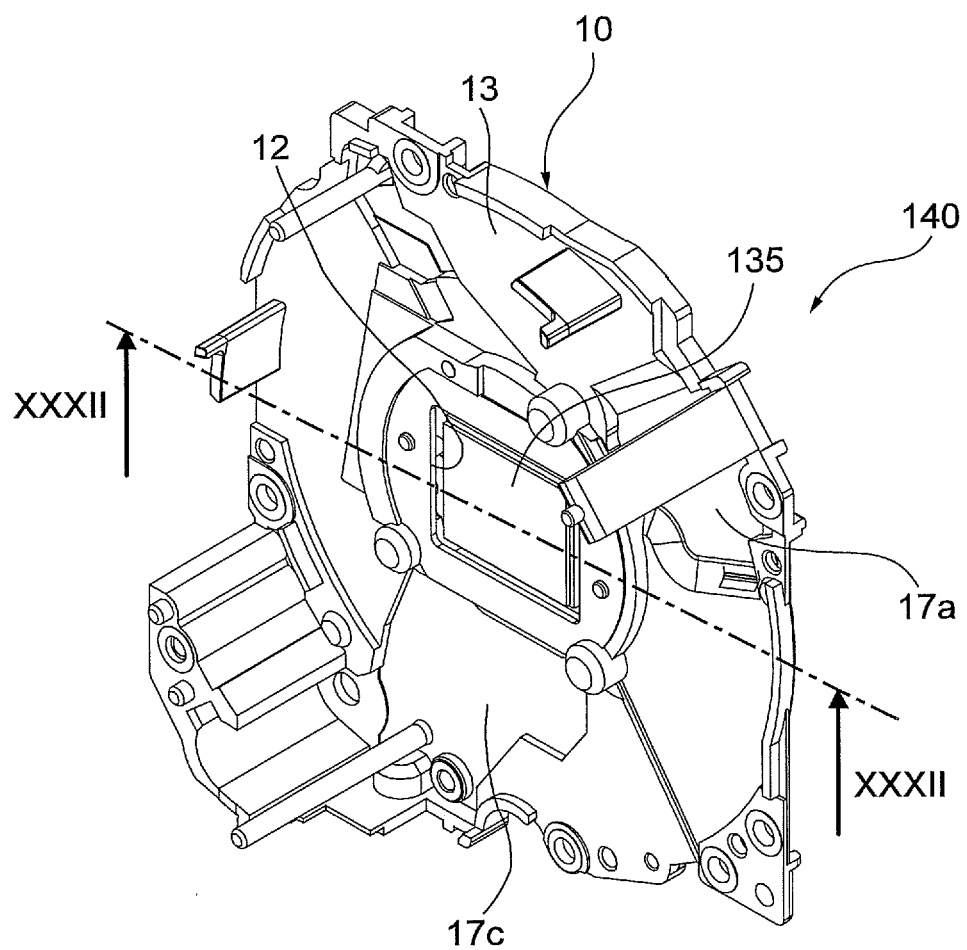
FIG. 31 is an oblique view of an imaging element unit.
Figure 32:
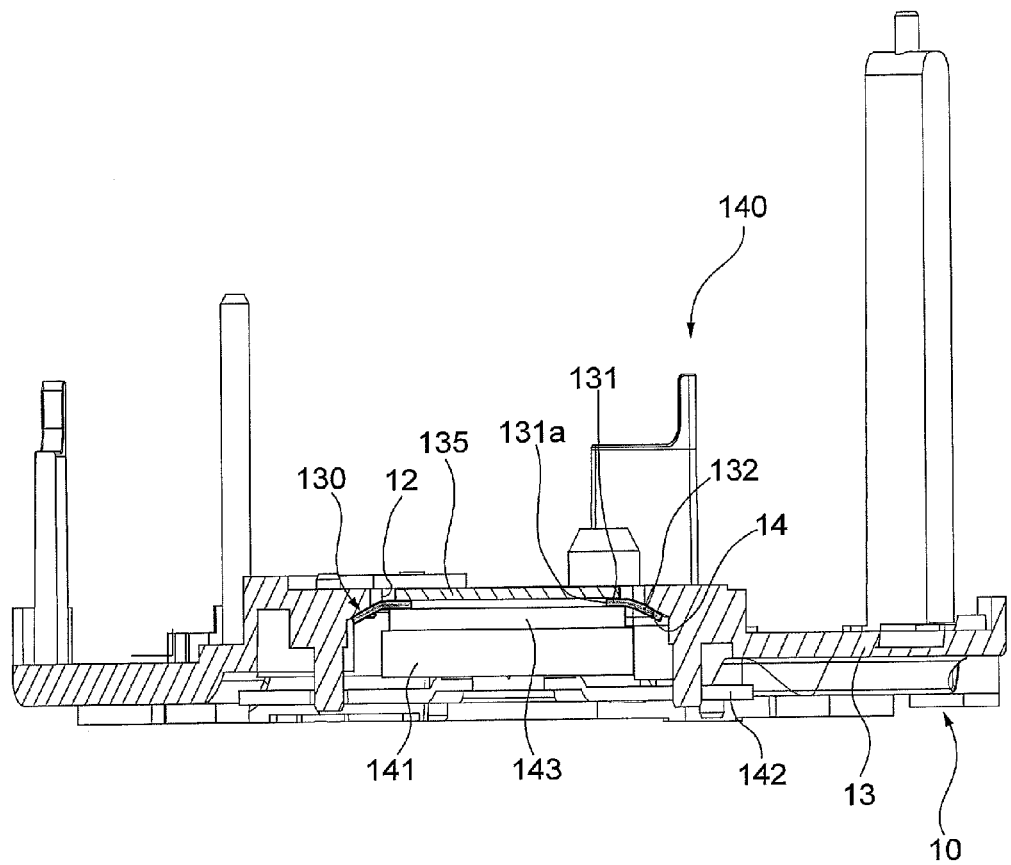
FIG. 32 is a cross section of an imaging element unit.
Figure 33B:
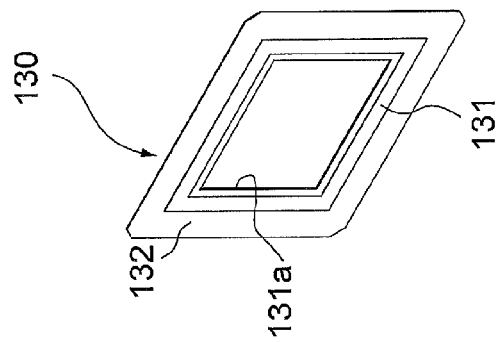
FIG. 33B is an oblique view of a light blocking sheet.
Figure 33A:
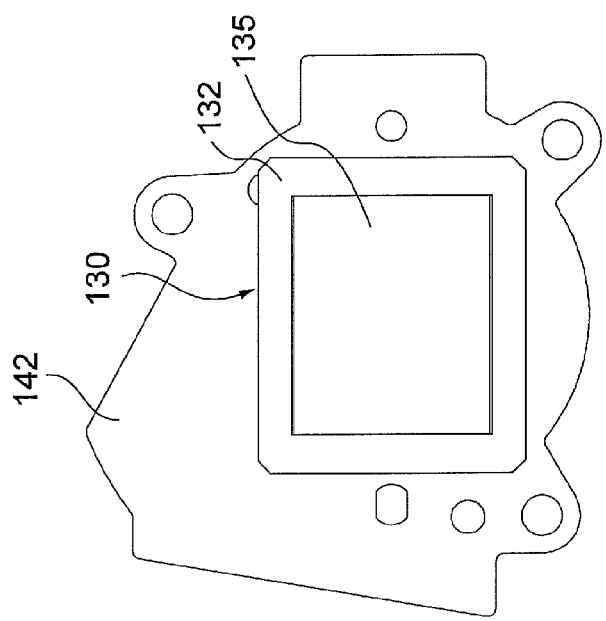
FIG. 33A is a plan view of the area around a CCD image sensor.
Figure 33C:
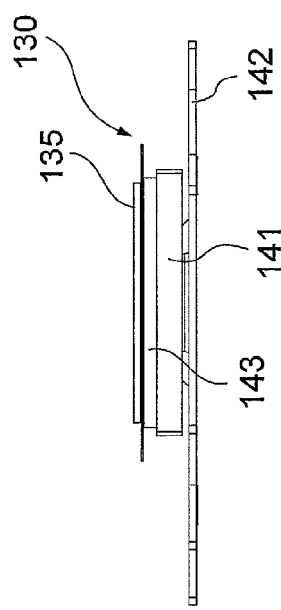
FIG. 33C is a side view of the area around a CCD image sensor 141.

As shown in FIGS. 31 and 32, with the imaging element unit 140, since the contour of the expanded part 132 of the light blocking sheet 130 is larger than the opening 12 of the master flange 10, the expanded part 132 helps block dust that has come in on the CCD image sensor 141 side of the master flange 10 (that is, the outside of the lens barrel 3) from flowing through the opening 12 to the opposite side.

In particular, since the expanded part 132 of the light blocking sheet 130 bends in a state of coming into contact with the master flange 10, the expanded part 132 can more effectively block the path over which dust flows to the opening 12 side. Also, with this configuration, even though the position of the light blocking sheet 130 with respect to the master flange 10 in the Y-axis direction may vary somewhat from product to product, this positional offset can be absorbed by the bending of the expanded part 132.

Also, the bonded portion 131 of the light blocking sheet 130 is adhesively fixed to the IR absorbent glass 135, and the IR absorbent glass 135 is disposed within the opening 12. Accordingly, the size of the imaging element unit 140 can be reduced by a length corresponding to the thickness of the IR absorbent glass 135, so a more compact lens barrel 3 can be obtained.

If dust-proofing is the only effect sought, then the IR absorbent glass 135 need not be disposed within the opening 12, and may be disposed more to the CCD image sensor 141 side than the edge of the opening 12 of the master flange 10.

Also, if only the minimum dust-proofing effect is sought, the expanded part 132 need not be bent, and furthermore the expanded part 132 need not come into contact with the master flange 10 in the Y-axis direction. That is, if the expanded part 132 with a large contour is disposed near the edge of the opening 12, the area around the expanded part 132 will have a labyrinth structure, so a dust-proofing effect can be anticipated.

6.10

As shown in FIG. 28, since the first support shaft 226 and the second support shaft 227 are disposed at different positions from those of the first drive unit 241 and the second drive unit 242 when viewed in the Y-axis direction, the third lens frame 200 (shake compensation device) can be made thinner than when the first support shaft 226 is disposed at the same position as the first drive unit 241, for example.

6.11

Figure 35:
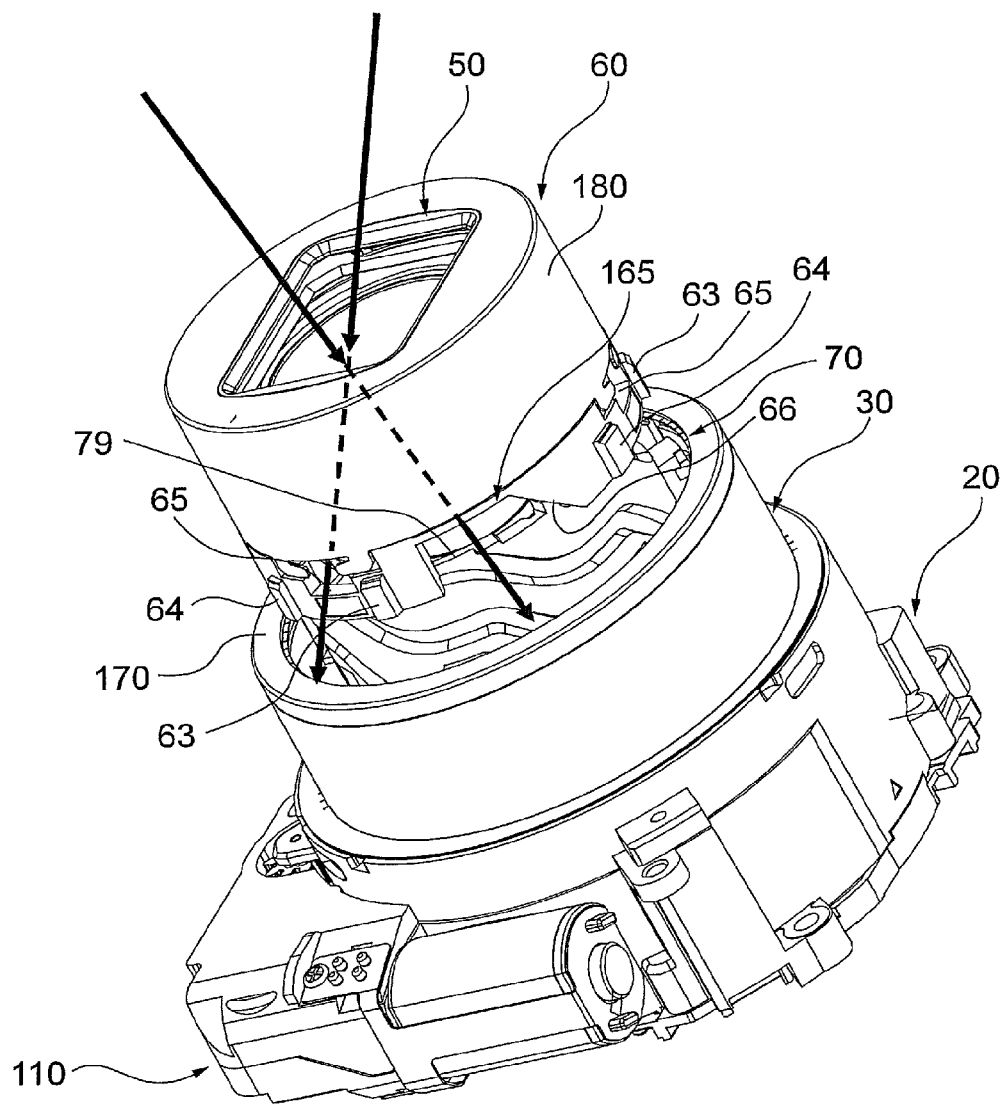
FIG. 35 is an oblique view of a lens barrel with the first rectilinear frame omitted.
Figure 36:
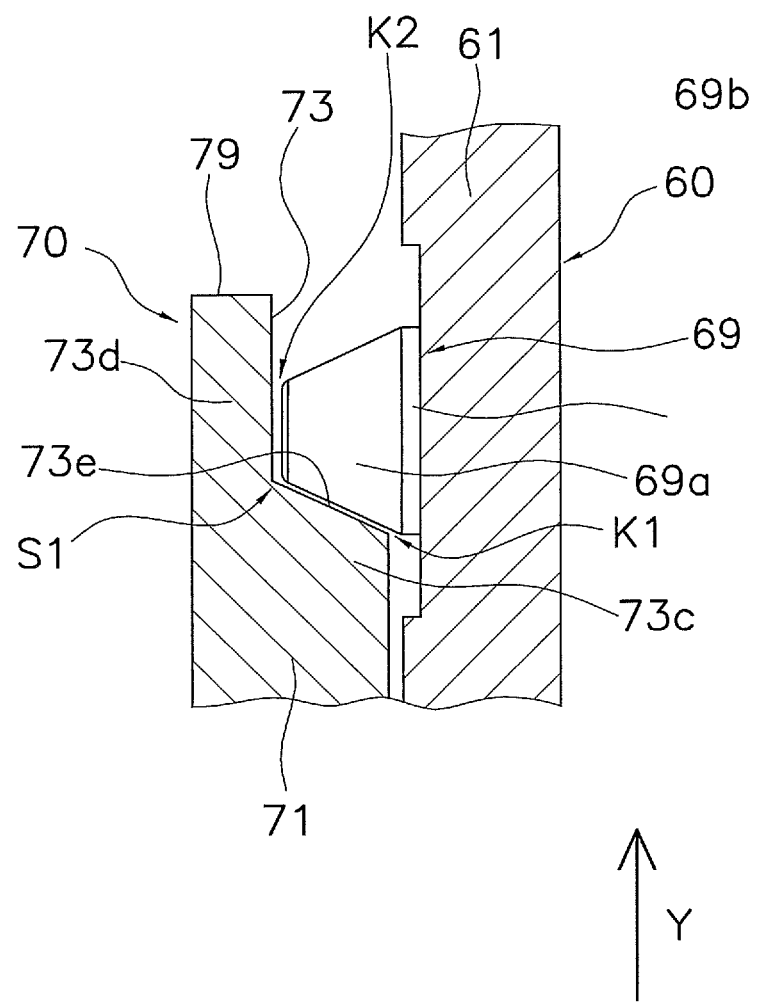
FIG. 36 is a cross section of the area around a second cam pin.

As shown in FIG. 35, unwanted light from an opening 65 in the first lens frame 60 or the cut-outs 79 in the rotary cam frame 70 may be incident on the outer peripheral side of the cam frame body 71. With this lens barrel 3, since the annular flange 77 is arranged at the end of the cam frame body 71 on the opposite side from the cut-outs 79, the flange 77 blocks at least part of the unwanted light that comes through the cut-outs 79 and the opening 65 and is incident on the outer peripheral side of the cam frame body 71, so the decrease in optical performance can be reduced.

In particular, the cut-outs 66 (an example of second cut-outs) in the first lens frame 60 are arranged to form windows 165 that pass through in the radial direction along with the cut-outs 79, so the light blocking effect of the flange 77 is enhanced.

7: Other Embodiments

Embodiments of the present invention are not limited to what was given above and various modifications and changes are possible without departing from the gist of the present invention.

7.1

The constitution of the optical system is not limited to what was given above. For instance, the various lens groups need not be made up of a single lens, and may instead be made up of a plurality of lenses.

7.2

Barring structural problems, the various cam grooves may be such that those grooves that do not pass through (grooves having a bottom) are through-grooves, and those grooves that do pass through are instead grooves that do not pass through.

Also, the various cam pins need not be formed integrally with the frame body, and may instead be separate entities.

7.3

As shown in FIG. 28, when viewed in the Y-axis direction, the first center line D1, the second center line D2, and the reference line segment D3 are disposed in parallel, but as long as the first center line D1, the second center line D2, and the reference line segment D3 do not intersect within the range of the base frame 220, one or more of the first center line D1, the second center line D2, and the reference line segment D3 may not be parallel with the other lines.

7.4

In the above embodiment, a digital still camera was given as an example of a device in which the lens barrel 3 was installed, but the device in which the lens barrel 3 is installed may be any device in which an optical image needs to be formed. Examples of devices in which the lens barrel 3 is installed include imaging devices capable of capturing only still pictures, imaging devices capable of capturing only moving pictures and imaging devices capable of capturing both still and moving pictures.

General Interpretation of Terms

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a lens barrel equipped with the cam frame structure, the shake compensation device and the imaging element unit. Accordingly, these terms, as utilized to describe the present invention should be interpreted relative to a lens barrel equipped with the cam frame structure, the shake compensation device and the imaging element unit.

The term "configured" as used herein to describe a component, section, or part of a device implies the existence of other unclaimed or unmentioned components, sections, members or parts of the device to carry out a desired function.

The terms of degree such as "substantially", "about" and "approximately" as used herein mean a reasonable amount of deviation of the modified term such that the end result is not significantly changed.

What is claimed is:

1. A lens barrel structure comprising:
a lens frame including a lens frame body configured to support a lens element of an optical system, at least three through-holes formed in the lens frame body in the direction of the optical axis of the optical system, and at least three cam members and at least one protruding member formed on and protruding from the lens frame body; and a cam frame including a cam frame body, at least three projection members extending from an end of the cam frame body in the direction of the optical axis and insertably disposed through the through-holes of the lens frame, at least three cam grooves formed in the cam frame body and the projection members, the cam grooves being configured to guide the cam members and movably support the lens frame with respect to the cam frame body, and at least one auxiliary groove formed along the circumferential direction of the cam frame body, the auxiliary groove being configured to guide the protruding member, the end of the auxiliary groove formed near the end of the cam frame body with the projection members is disposed between two adjacent projection members.

2. The lens barrel structure according to claim 1, wherein the cam frame further includes a first contact portion that forms an edge of the auxiliary groove, the first contact portion is disposed substantially opposite to the protruding member via an oblique gap formed in the direction of the optical axis.

3. The lens barrel structure according to claim 2, wherein the first contact portion is disposed substantially opposite to the protruding member when the optical system is in a telephoto state.

4. The lens barrel structure according to claim 2, wherein the protruding member is disposed on the subject side of the first contact portion when the optical system is in a telephoto state.

5. The lens barrel structure according to claim 1, wherein the cam members are tapered cam members and the cam grooves are tapered cam grooves that mate with the tapered cam members such that when an external force is applied to the lens frame and the cam frame along the direction of the optical axis the lens frame is separated from the cam frame in the radial direction of the lens barrel.

6. The lens barrel according to claim 1, wherein the protruding member is a tapered protruding member and the first contact portion is an oblique contact portion disposed substantially opposite to the tapered protruding member such that when an external force is applied to the lens frame and the cam frame in the direction of the optical axis the lens frame is separated from the cam frame in the radial direction of the lens frame.

7. The lens barrel structure according to claim 6, wherein the tapered protruding member is disposed between two adjacent cam members in the circumferential direction of the lens frame.

8. The lens barrel structure according to claim 6, wherein the oblique contact portion forms an edge of the auxiliary groove.

9. The lens barrel structure according to claim 6, wherein the auxiliary groove has an auxiliary insertion opening disposed between two adjacent projection members, the auxiliary insertion opening is opened towards and disposed on the same end of the cam frame as the projection members, the size of the auxiliary insertion opening in the circumferential direction of the cam frame is greater than the width of the auxiliary groove.

10. The lens barrel structure according to claim 1, wherein the cam frame further includes a second contact portion disposed opposite to the protruding member via a radial gap formed in the radial direction of the cam frame.

11. A lens barrel structure comprising:
a first frame configured to support an optical system, the first frame having at least three rectilinear grooves extending in the direction of the optical axis of the optical system;
a second frame having a second frame body disposed inside and substantially concentric with the first frame and at least three guide members protruding outwardly in the radial direction from the circumferential side of the second frame body; and
a third frame having a third frame body disposed between and substantially concentric with the first frame body and the second frame body, at least three rectilinear projections extending outwardly in the radial direction from the circumferential side of the third frame body and inserted into the rectilinear grooves, at least three through-grooves formed in the third frame body to guide the at least three guide members, the at least three guide members configured to protrude from the third frame, and at least three insertion openings communicating with the through-grooves at positions corresponding to positions of the at least three rectilinear projections on the circumferential side of the third frame body, the at least three insertion openings configured to introduce the at least three guide members into the at least three through-grooves, the circumference of the three insertion openings being larger than the circumference of the guide members.

12. The lens barrel structure according to claim 11, wherein the size of the at least three rectilinear projections are greater than the size of the insertion openings in the circumferential direction of the third frame body.

13. The lens barrel structure according to claim 11, wherein the third frame further has an annular portion that includes a plurality of flanges and the at least three rectilinear projections integrally formed as a one-piece unitary member, the annular portion extending outwardly in the radial direction from the circumferential side of the third frame body.

14. The lens barrel structure according to claim 13, wherein the at least three rectilinear projections extending outwardly in the radial direction more than the flanges.

15. The lens barrel structure according to claim 11, further comprising
a base member disposed to the rear side of the third frame along the direction of the optical axis; and
a connection terminal mounted on the opposite side of the base member from the first frame and disposed at a different position from the at least three rectilinear projections when viewed in a direction parallel to the optical axis.

16. The lens barrel structure according to claim 11, further comprising a fourth frame having a fourth frame body disposed between the first frame and the second frame body and at least three guide grooves extending in the direction of the optical axis and slidably coupled with ends of the guide members, the fourth frame is configured to be rotationally driven.

17. A lens barrel structure comprising:
a first lens support frame configured to support an optical system, the first lens support frame including a second lens frame body and first and second rectilinear guide grooves formed on opposing outer peripheral sides of the second lens frame body and extending in the direction of the optical axis of the optical system, the second lens frame body being configured to support a first lens element of the optical system between the first and second rectilinear guide grooves;

a second lens support frame including a second body portion and third and fourth rectilinear guide grooves formed on opposing outer peripheral sides of the second body portion and extending in the direction of the optical axis, the second body portion being configured to support a second lens element of the optical system between the third and fourth rectilinear guide grooves; and a support member including an annular portion a first support portion inserted into the first and third rectilinear guide grooves and a second support portion inserted into the second and fourth rectilinear guide grooves the first and second support portion extending from the annular portion in the direction of the optical axis, wherein the first support portion has a first portion inserted in the first rectilinear guide groove and a third portion inserted in the third rectilinear guide groove, the second support portion has a second portion inserted in the second rectilinear guide groove and a fourth portion inserted in the fourth rectilinear guide groove, the dimensions of the width of the first portion is different from the dimensions of the width of the third portion in the circumferential direction, and the dimensions of the width of the second portion is different from the dimensions of the width of the fourth portion in the circumferential direction.

18. The lens barrel structure according to claim 17, wherein the first portion extends from the end of the third portion in the direction of the optical axis, the third and fourth portions extend from the annular portion in the direction of the optical axis, and the second portion extends from the end of the fourth portion in the direction of the optical axis.

19. The lens barrel structure according to claim 18, wherein the width of the third portion is greater than the width of the first portion in the circumferential direction, and the width of the fourth portion is greater than the width of the second portion in the circumferential direction.

20. The lens barrel structure according to claim 19, wherein the length of the first portion is greater than the length of the third portion in the optical axis direction, and the length of the second portion is greater than the length of the fourth portion in the optical axis direction.

21. The lens barrel structure according to claim 19, wherein a part of the first lens support frame is inserted in the third rectilinear guide groove when the first lens support frame and the second lens support frame are positioned close together along the direction of the optical axis, and a part of the first lens support frame is inserted in the fourth rectilinear guide groove when the first lens support frame and the second lens support frame are positioned close together along the direction of the optical axis.

22. The lens barrel structure according to claim 18, wherein the width of the first portion is greater than the width of the third portion in the circumferential direction, and the width of the second portion is greater than the width of the fourth portion in the circumferential direction.

23. The lens barrel structure according to claim 22, wherein the length of the third portion is greater than the length of the first portion in the optical axis direction, and the length of the fourth portion is greater than the length of the second portion in the optical axis direction.

24. The lens barrel structure according to claim 22, wherein a part of the second lens support frame is inserted in the first rectilinear guide groove when the first lens support frame and the second lens support frame are positioned close together along the direction of the optical axis, and a part of the second lens support frame is inserted in the second rectilinear guide groove when the first lens support frame and the second lens support frame are positioned close together along the direction of the optical axis.

25. The lens barrel structure according to claim 17, wherein the first lens support frame further includes a pair of first sliding portions disposed on both sides of the first portion and forming the first rectilinear guide groove, and a pair of second sliding portions disposed on both sides of the second portion and forming the second rectilinear guide groove, and the second lens support frame further includes a pair of third sliding portions disposed on both sides of the third portion and forming the third rectilinear guide groove and a pair of fourth sliding portions disposed on both sides of the fourth portion and forming the fourth rectilinear guide groove.

26. A lens barrel structure comprising:

a first lens support frame configured to support an optical system, the first lens support frame including a second lens frame body and first and second rectilinear guide grooves formed on opposing outer peripheral sides of the second lens frame body and extending in the direction of the optical axis of the optical system, the second lens frame body being configured to support a first lens element of the optical system between the first and second rectilinear guide grooves;

a second lens support frame including a second body portion and third and fourth rectilinear guide grooves formed on opposing outer peripheral sides of the second body portion and extending in the direction of the optical axis the second body portion being configured to support a second lens element of the optical system between the third and fourth rectilinear guide grooves; and a support member including an annular portion, a first support portion inserted into the first and third rectilinear guide grooves and a second support portion inserted into the second and fourth rectilinear guide grooves, the first and second support portions extending from the annular portion in the direction of the optical axis, wherein the first support portion has a first portion inserted in the first rectilinear guide groove and a third portion inserted in the third rectilinear guide groove, the second support portion has a second portion inserted in the second rectilinear guide groove and a fourth portion inserted in the fourth rectilinear guide groove, the dimensions of the width of the first portion is different from the dimensions of the width of the third portion in the circumferential direction, and the dimensions of the width of the second portion is different from the dimensions of the width of the fourth portion in the circumferential direction, wherein the first support portion and the second support portion extend from the inner peripheral edge of the annular portion in the direction of the optical axis.

* * * * *